(12) United States Patent
Ghazinour Naini

(10) Patent No.: US 12,346,482 B2
(45) Date of Patent: Jul. 1, 2025

(54) PROGRAM PRODUCTS, METHODS, AND SYSTEMS FOR SIMULATING AND PREVENTING THE DISSEMINATION OF SENSITIVE INFORMATION

(71) Applicant: Research Foundation for SUNY, Albany, NY (US)

(72) Inventor: Kambiz Ghazinour Naini, Potsdam, NY (US)

(*) Notice: Subject to any disclaimer, the term of this patent is extended or adjusted under 35 U.S.C. 154(b) by 0 days.

(21) Appl. No.: 18/608,282

(22) Filed: Mar. 18, 2024

(65) Prior Publication Data
US 2024/0378320 A1    Nov. 14, 2024

Related U.S. Application Data

(63) Continuation of application No. 17/079,336, filed on Oct. 23, 2020, now Pat. No. 11,972,026.

(60) Provisional application No. 62/924,954, filed on Oct. 23, 2019.

(51) Int. Cl.
*H04L 29/06* (2006.01)
*G06F 21/57* (2013.01)
*G06F 21/62* (2013.01)

(52) U.S. Cl.
CPC ........ *G06F 21/6263* (2013.01); *G06F 21/577* (2013.01); *G06F 2221/031* (2013.01)

(58) Field of Classification Search
CPC .............. G06F 21/6263; G06F 21/577; G06F 2221/031; G06F 21/6245
See application file for complete search history.

(56) References Cited

U.S. PATENT DOCUMENTS

| | | | |
|---|---|---|---|
| 10,587,620 B2 * | 3/2020 | Larkina | H04L 63/1441 |
| 10,754,958 B1 | 8/2020 | Sidagni | |
| 2013/0225259 A1 * | 8/2013 | Kojo | A63F 13/795 463/22 |
| 2015/0082448 A1 * | 3/2015 | Elovici | G06Q 10/107 726/26 |

(Continued)

OTHER PUBLICATIONS

Kambiz Ghazinour et al., A Novel Approach to Social Media Privacy Education Through Simulated Role Reversal, The 11th International Conference on Emerging Ubiquitous Systems and Pervasive Networks, Nov. 2-5, 2020, Madeira, Portugal, Elsevier B.V., USA.

*Primary Examiner* — Shawnchoy Rahman
(74) *Attorney, Agent, or Firm* — Lee & Hayes, P.C.

(57) ABSTRACT

Program products, methods, and systems for simulating and/or preventing the dissemination of sensitive information over the internet are disclosed. Preventing dissemination of user-specific sensitive information over the internet may include analyzing content included in media posts, calculating a danger score for the media post, and determining if the calculated danger score exceeds a danger score threshold. Where the calculated danger score does not exceed the threshold, the media post has no or a low risk of disseminating sensitive information over the internet. However, if the calculated danger score does exceed the threshold, the user is alerted that the media post may undesirably disseminate sensitive information. The danger score may represent a sensitive information exposure risk for the media post is based on a variety of factors and/or characteristics of the media post and/or the user creating and attempting to disseminate the media post.

20 Claims, 46 Drawing Sheets

(56) References Cited

U.S. PATENT DOCUMENTS

| | | |
|---|---|---|
| 2016/0112432 A1* | 4/2016 | Hudack .................. G06F 21/316 |
| | | 726/7 |
| 2016/0381064 A1 | 12/2016 | Chan |
| 2017/0098086 A1 | 4/2017 | Hoernecke |
| 2018/0218157 A1 | 8/2018 | Price |
| 2019/0044978 A1 | 2/2019 | Barday |
| 2020/0151620 A1 | 5/2020 | Chao |
| 2020/0244760 A1* | 7/2020 | Levi ...................... G06F 21/577 |

* cited by examiner

PROGRAM PRODUCTS, METHODS, AND SYSTEMS FOR SIMULATING AND PREVENTING THE DISSEMINATION OF SENSITIVE INFORMATION

CROSS REFERENCE TO RELATED APPLICATIONS

This application is a continuation of, and claims priority to, U.S. patent application Ser. No. 17/079,336, filed on Oct. 23, 2020, which claims the benefit of U.S. Provisional Application No. 62/924,954, filed Oct. 23, 2019, all of which are hereby incorporated herein by reference.

BACKGROUND

The disclosure relates generally to online security and privacy, and more particularly, to program products, methods, and systems for simulating and/or preventing the dissemination of sensitive information over the internet.

Social media has become an increasingly central component in the lives of a significant number of individuals. The lifestyle of the average individual has become more public, and large amounts of personal data are now accessible online by both corporations and the public, whether the data owner is aware of this access or not. For many, this represents a great benefit and opportunity to broaden their social circles and maintain deep social connections across long distances, but it comes with equally great risks. Social media has increasingly represented the primary means of internet-based communication for a growing share of users. Today, digital crime, identity theft, and/or misuse of personal information make online security and privacy even more crucial.

However, adequate programs to prevent online security and privacy and/or programs to educate about security and privacy has not developed, particularly within the context of social networks. While many have been educated on potential dangers coming from a medium such as email, social networks as a threat vector are often not touched upon.

Leaving social media users to their own recognizance has not been an effective strategy; as a result, a considerable portion of social media users are unaware of how the actions they take and the information they share online can endanger their personal privacy. Between this and the increased incentives social networks provide for interacting with their network at a deeper level, such as making more information public for the purposes of their directed marketing, adversaries have a wealth of information to exploit. Simple information commonly shared publicly, such as birth dates and zip codes, can be used by adversaries to obtain sensitive information through various identity theft techniques, so it is crucial that this sensitive data is protected.

BRIEF DESCRIPTION

A first aspect of the disclosure provides a computer program product stored on a non-transitory computer-readable storage medium, which when executed by a computing system, simulates privacy issues relating to media posts. The computer program product includes: program code that enables a plurality of posters to create and disseminate content via media posts; program code that generates audience points that are given to each of the plurality of posters based on the disseminated content in the media posts; program code that tracks the audience points given to each of the plurality of posters based on the disseminated content in the media posts; program code that ranks each of the plurality of posters based on the generated audience points given to each of the plurality of posters; program code that creates a postings library of the media posts, including the content, created and disseminated by each of the plurality of posters; program code that provides each of the plurality of posters and at least one thief access to the postings library; program code that enables the at least one thief to collect sensitive information of at least one of the plurality of posters from the postings library and content disseminated by the at least one of the plurality of posters via the media posts; program code that builds a personal profile for a targeted poster of the plurality of posters based on the sensitive information collected by the at least one thief; and program code that enables the at least one thief, upon collecting a threshold of sensitive information used to build the personal profile of the targeted poster of the plurality of posters, to attempt to execute a theft action against the targeted poster.

A second aspect of the disclosure provides a computer program product stored on a non-transitory computer-readable storage medium, which when executed by a computing system, preventing the dissemination of sensitive information via media posts. The computer program product includes: program code that analyzes content included in a potential media post created by a poster; program code that calculates a danger score for the potential media post based on the analyzed content included in the potential media post; program code that determines if the calculated danger score for the potential media post exceeds a danger score threshold; program code that alerts the poster that the content included in the potential media post includes sensitive information specific to the poster in response to determining the calculated danger score for the potential media post exceeds the danger score threshold; and program code that disseminates the potential media post created by the poster in response to determining the calculated danger score for the potential media post does not exceed the danger score threshold.

A third aspect of the disclosure provides a method for preventing the dissemination of sensitive information via media posts. The method including: analyzing, with a computing system, content included in a potential media post created by a poster; calculating, with the computing system, a danger score for the potential media post based on the analyzed content included in the potential media post; determining, with the computing system, if the calculated danger score for the potential media post exceeds a danger score threshold; alerting, with the computing system, the poster that the content included in the potential media post includes sensitive information specific to the poster in response to determining the calculated danger score for the potential media post exceeds the danger score threshold; and disseminating, with the computing system, the potential media post created by the poster in response to determining the calculated danger score for the potential media post does not exceed the danger score threshold.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to online security and privacy, and more particularly, to program products, methods, and systems for simulating and/or preventing the dissemination of sensitive information over the internet.

These and other embodiments are discussed below with reference to FIGS. 1-35. However, those skilled in the art will readily appreciate that the detailed description given herein with respect to these Figures is for explanatory purposes only and should not be construed as limiting.

Various distinct embodiments and non-limiting examples relating to online security and privacy are discussed herein. More specifically, FIGS. 1-19 show various non-limiting examples of systems and methods that highlight online security and privacy issues using simulated social media posting scenarios, while FIGS. 20-35 relate to systems and methods used to prevent online security and privacy issues that arise in social media postings. It is understood that similarly numbered and/or named components may function in a substantially similar fashion. Redundant explanation of these components from figure-to-figure has been omitted for clarity.

Simulated Online Security and Privacy

Figure 1:
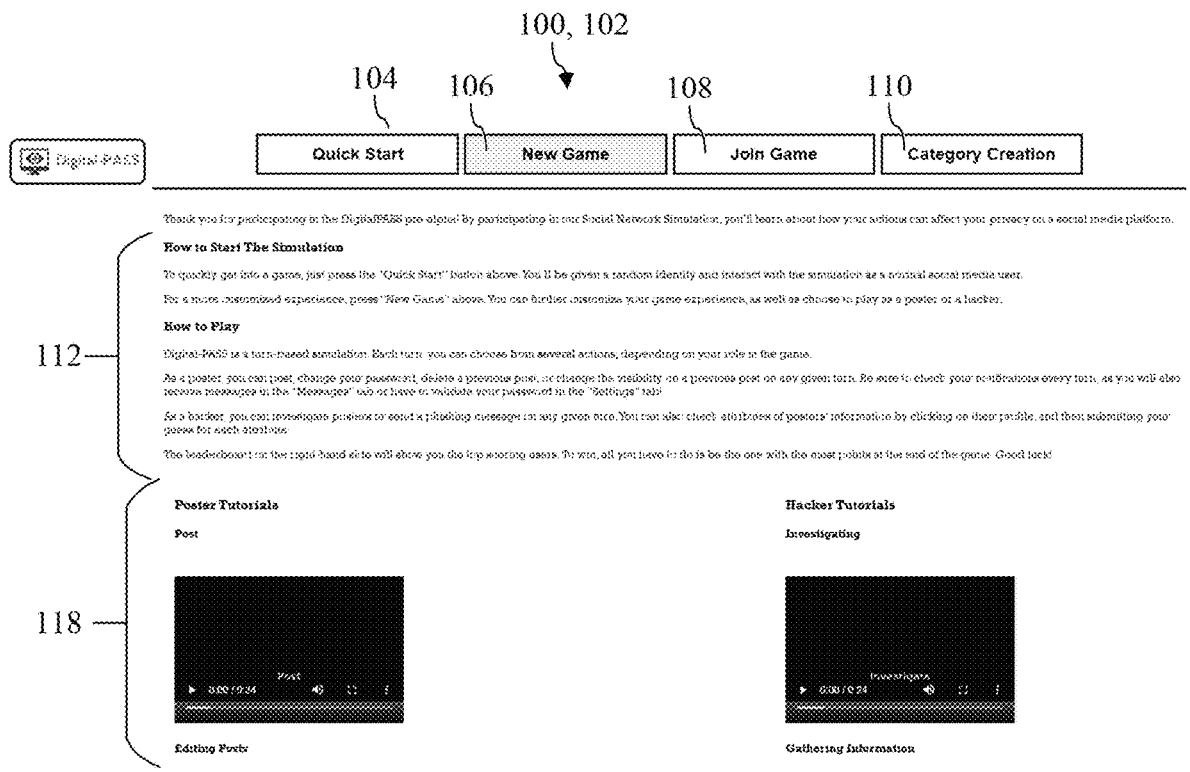
FIG. 1 shows an illustrative view of a home page for a simulation of online security and privacy issues using simulated social media posting scenarios, according to embodiments of the disclosure.

FIG. 1 shows a visual of a non-limiting example for simulating online security and privacy issues using social media posting scenarios. The visual shown in FIG. 1 may represent or display an example of an interactive program, app, and/or computer-based aid (hereafter, "program 100") that provides an interactive experience to at least one user during the simulation generated by program 100, as discussed herein. The visual of program 100 may be presented and/or viewed on a display, monitor, and/or graphic user interface (GUI) that is part of a computing system (see, FIG. 19). Computing system displaying and/or presenting the visual of program 100 may be any suitable computing device and/or system capable of storing, running, operating, and/or engaging program 100, which allows at least one user to interact with the simulation of program 100.

In the non-limiting example shown in FIG. 1, the visual of program 100 may depict a home screen 102 for the simulation. As shown, home screen 102 may include a plurality of buttons 104, 106, 108, 110, instructions or text 112, and/or a plurality of instructional videos 118. Each of the plurality of buttons 104, 106, 108, 110 may be interactive and/or may be engaged by a user interacting with program 100 to perform and/or engage distinct operations or tasks in program 100. For example, quick start button 104 may allow a user to start a game or simulation without additional input or changes to the simulation scenario. New game button 106 may allow a user to set simulation parameters relating to the simulation scenario before beginning a new simulation. Join game button 108 may allow a user to put in a distinct simulation session code and password, which in turn may allow the user to join a preestablished or previously formed simulation. Category creation button 110 allows a user to customize categories and/or subjects and associated inputs or simulation data to be implemented in a new simulation of program 100. Instructions 112 provide a brief summary of how to interact and/or play with the simulation generated by program 100. Instructional videos 118 provide video support, instructions, and/or additional visual information relating to the operation or interaction with the simulation generated by program 100.

As discussed herein, the at least one user may refer to a person or human interacting with simulation of program 100. Additionally, each of the at least one user may also be assigned or choose a role while interacting, using, and/or running the simulation. In non-limiting examples discussed herein, at least one user may be a posting user or "poster" who can create and disseminate media posts, or a "thief" who has access to the media posts and data repositories to create negative security and/or privacy issues for the poster(s).

Figure 2:
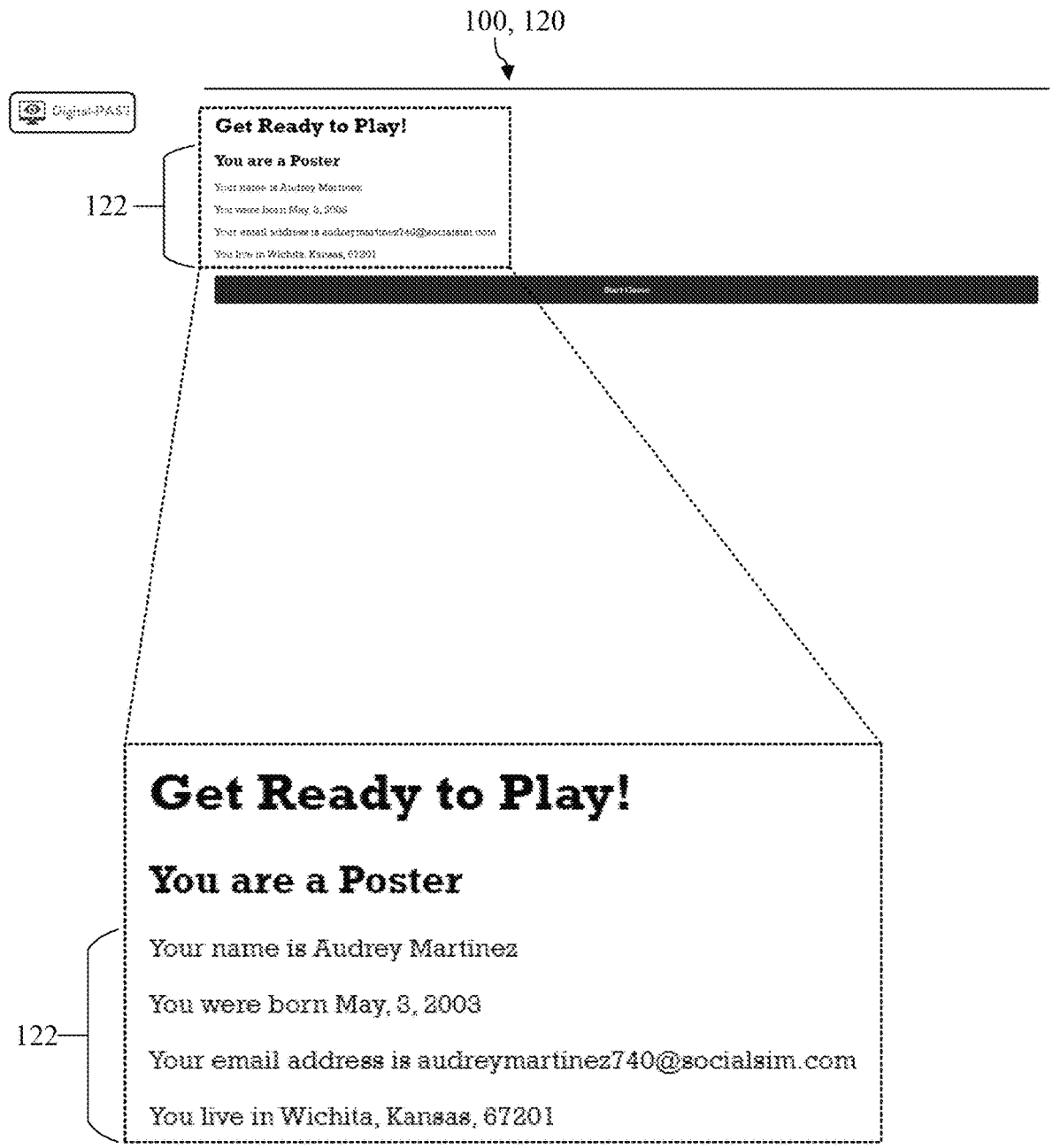
FIG. 2 shows an illustrative view of a preliminary information screen of the simulation of online security and privacy issues of FIG. 1 as engaged by a user-poster, according to embodiments of the disclosure.

Turning to FIG. 2, a visual of a non-limiting example of the simulation relating to online security and privacy issues using social media posting scenarios, as generated by program 100, is shown. The non-limiting example shown in FIG. 2 may represent a visual of program 100 after a user clicks or engages quick start button 104 on home screen 102 (see, FIG. 1). As shown, an engaging user of program 100 may be provided with a preliminary information screen 120. Preliminary information screen 120 may provide simulated, generated, and/or artificial information associated with and/or assigned to the user of program 100—referred to herein as assigned information 122. Assigned information 122 may include any suitable information relating to the fictitious character in which the user is associated with within and/or during operation of program 100. In the non-limiting example shown in FIG. 2, assigned information 122 may include the name of the fictitious character, the birth date of the fictitious character, the email address of the fictitious character, and the residents of the fictitious character. In other examples, assigned information 122 may include additional data or information typically associated with a user of social media app or platforms, including, but not limited to, job title, place of work, hometown, astrological signs, education data, and/or the like. Based on assigned information 122 relating to and/or the association with the fictitious character, as displayed on preliminary information screen 120, it is understood that the user may be assigned a poster role. As such, and for the discussion of the non-limiting example shown herein with respect to FIGS. 2-13, "user" and "poster" may be used interchangeably. As discussed herein, some of the data or information included in assigned information 122 may be considered sensitive information, which may be undesirably obtained, mined, and/or discovered by an unwanted party (e.g., thief), and subsequently used at the detriment of the user/poster in the simulation generated by program 100.

Although discussed herein as a single user, it is understood that program 100 may allow for a plurality of users to engage the simulation simultaneously. That is, a plurality of users may each join or interact with a single simulation of program 100, where each user is provided with and/or associated with a fictitious character and assigned information 122 when assuming the role of a poster. Alternatively, and as discussed herein, each user may be assigned to a fictitious character when assuming a thief role (see, FIG. 14). Additionally, each of the plurality of users that interact with a single simulation of program 100 may perform the actions within the simulation (e.g., creating and disseminating media posts, hacks) as those discussed herein.

Figure 3:
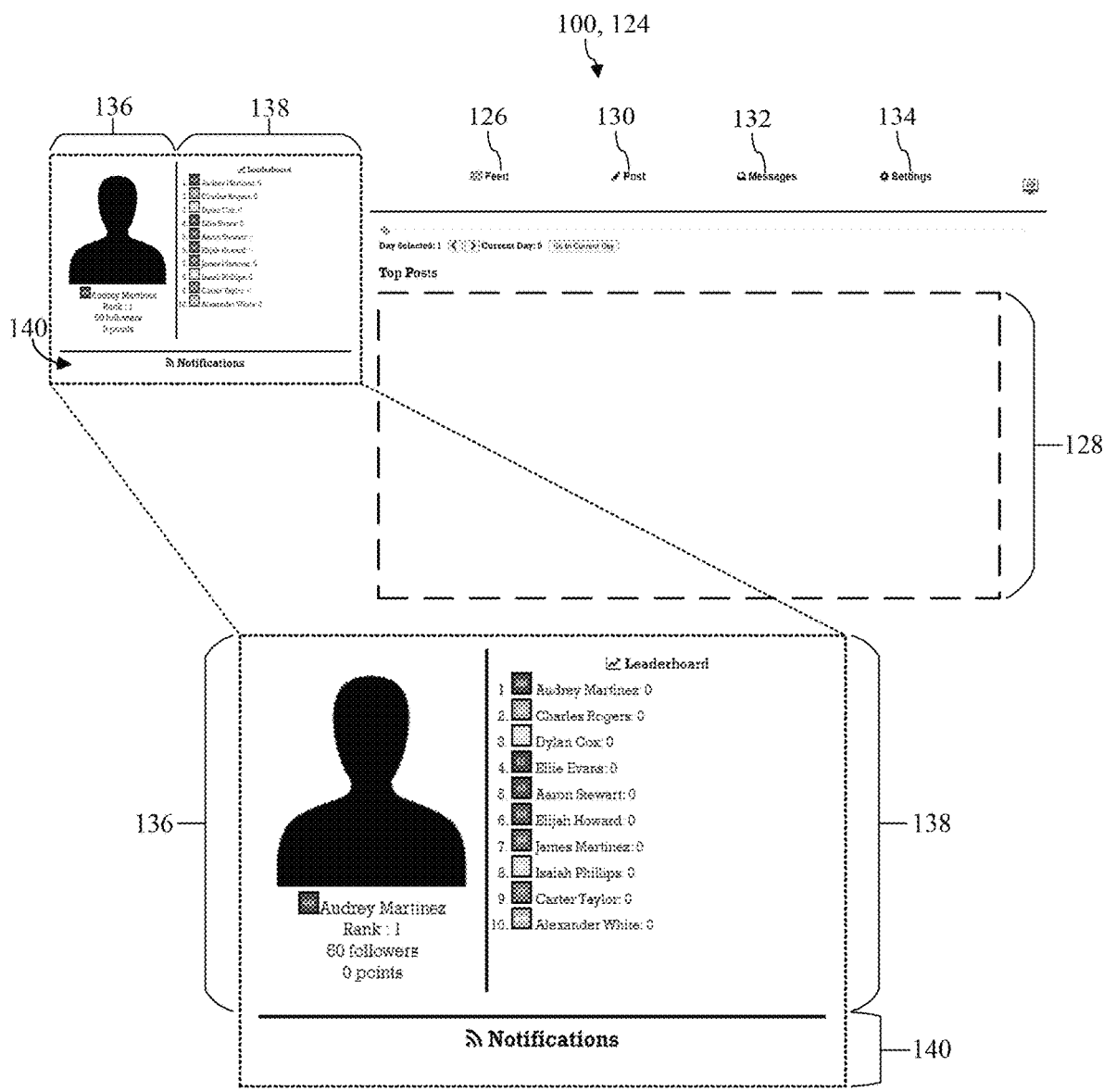
FIGS. 3-13 show illustrative views of a simulation screen of the simulation of online security and privacy issues of FIG. 1 as engaged by a user-poster, according to embodiments of the disclosure.

FIG. 3 depicts an actual simulation screen 124 as created or generated by program 100. That is, simulation screen 124 may be a non-limiting example of a visual representation of the interactive simulation in which the poster may interact with to simulate online privacy and security issues, as discussed herein. Simulation screen 124 may include a plurality of areas and/or sections that are interactive and/or updated during the simulation. For example, simulation screen 124 may include a feed page 126 including a posting library 128. Feed page 126, and more specifically posting library 128, may display the various posts made by the users/posters of program 100 during the simulation. That is, posting library 128 of feed page 126 may include a collection, composition, and/or compilation of all media posts disseminated by all posters/user of the simulation of program 100. Simulation screen 124 may also include a post Page 130. Post page 130, as shown herein, may provide the poster the ability to select and/or generate a post to be disseminated and/or displayed in posting library 128 of feed page 126. Message page 132 provides/includes an inbox for the poster to receive/respond to messages from other posters and/or third parties. Settings page 134 provides the poster the ability to change, alter, and/or interact with in simulation settings (e.g., confirm password) during the simulation generated by program 100.

Although discussed herein as distinct pages 126, 130, 132, 134, it is understood that simulation screen 124 of program 100 may be organized in any suitable manner to provide the user of the simulation with all of the described data and/or visual information. For example, simulation screen 124 may be organized in a grid to include each of the four distinct pages 126, 130, 132, 134 simultaneously to the user/poster.

In addition to displaying and/or providing the various pages, simulation screen 124 may also show user specific data 136 relating to the fictitious character associated with the user. In the non-limiting example shown in FIG. 3 user specific data 136 may include a picture of the fictitious character, the name of the fictitious character, the rank of the fictitious character within the simulation, the number of followers for the fictitious character, and the number of points earned by the fictitious character. User specific data 136 displayed in simulation screen 124 may include any other suitable data relating and/or specific to the fictitious character controlled by the user during the simulation generated by program 100.

Simulation screen 124 may also include a leaderboard 138. Leaderboard 138 may generate, display, and/or rank all fictitious characters engaging and/or interacting with the simulation generated by program 100. As discussed herein, leaderboard 138 may rank each of the fictitious characters based on their interaction with the simulation, for example, based on assigned or awarded audience points. In a non-limiting example ten (10) fictitious characters are shown on the leaderboard 138. However, it is understood that the simulation generated by program 100 may include more or less fictitious characters during the simulation. Each of the plurality of fictitious characters listed in leaderboard 138 may be controlled by a distinct user interacting with program 100, or alternatively, may be control by program 100 and/or artificial intelligence (AI) of program 100. As discussed herein, during the simulation, each user's/AI's fictitious character will be awarded audience points based on their interaction with the simulation. Leaderboard 138 may display the ranked fictitious characters based on their awarded audience points.

Additionally in the non-limiting example shown in FIG. 3 simulation screen 124 may include a notifications area 140. Notifications area 140 may provide visual cues, messages, and/or notifications to the user interacting with the simulation of program 100. As discussed herein, the visual cues, messages, or notifications provided to the user in notification area 140 on simulation screen 124 may include information or data specific to the user as they interact with the simulation generated by program 100 (e.g., awarded audience points, events).

Figure 4:
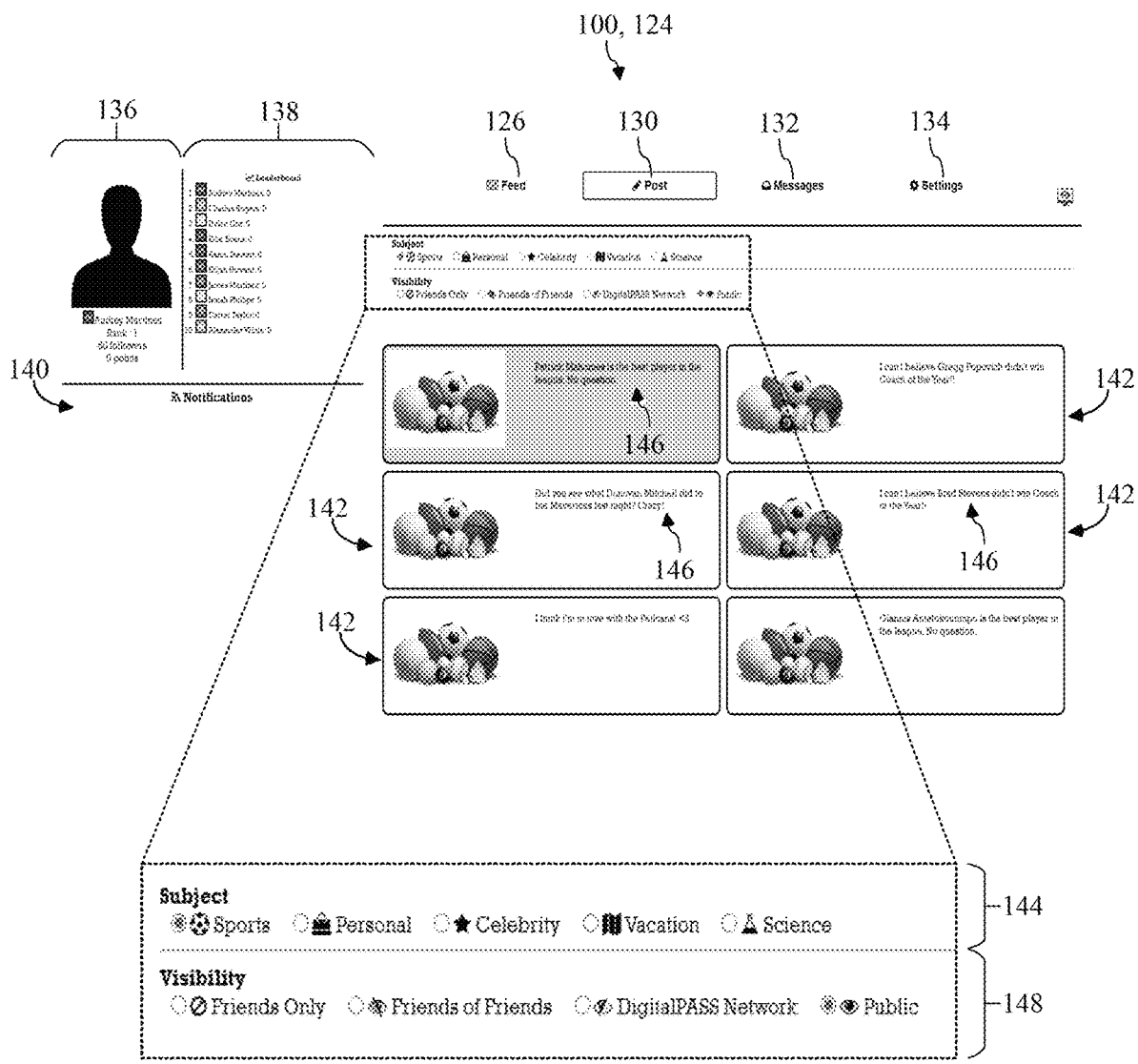

FIG. 4 shows an example of the user preparing to disseminate a social media post 142. That is, after a user/poster selects post page 130 the poster associated with the fictitious character is provided with a plurality of predetermined media posts 142 to select and subsequently be disseminated (e.g., made visible on feed page 126). As shown, the poster is provided the option to select media posts 142 from various subjects 144. More specifically in the simulation, various subjects 144 that may be selected by the poster may include a plurality of distinct, pre-determined media posts 142. Each distinct media post 142 may also include distinct content 146 (e.g., the message of the media post). As discussed herein, the content 146 in media posts 142 may, at least in part, positively or negatively affect the user's experience during the simulation including, but not limited to, the amount of points received/deducted, and/or the occurrence of security and privacy issues or events that affect the poster/the fictitious character associated with the poster.

In addition to the various categories or subjects 144 for media posts 142, the user of program 100 has the ability to select and/or determine the visibility characteristics 148 of each media post 142 that is to be disseminated during the simulation. Visibility characteristics 148 may determine and/or dictate who may view and/or receive disseminated media post 142 selected by the user of the simulation. As shown in FIG. 4, visibility characteristics 148 may include four distinct groups and/or audiences that will be capable of viewing and/or receiving media post 142. In this non-limiting example, the groups defined by visibility characteristics 148 include, friends only, friends of friends, network users (e.g., all users of a specific network), and the public; where friends only is the most restrictive/least visible group, and the public is the least restrictive/most visible group. As discussed herein, and similar to content 146 of media posts 142, visibility characteristics 148 of media posts 142 may, at least in part, positively or negatively affect the user's experience during the simulation including, but not limited to, the amount of audience points received/deducted, and/or the occurrence of security and privacy issues or events that affect the user/the fictitious character associated with the user/poster.

Figure 5:
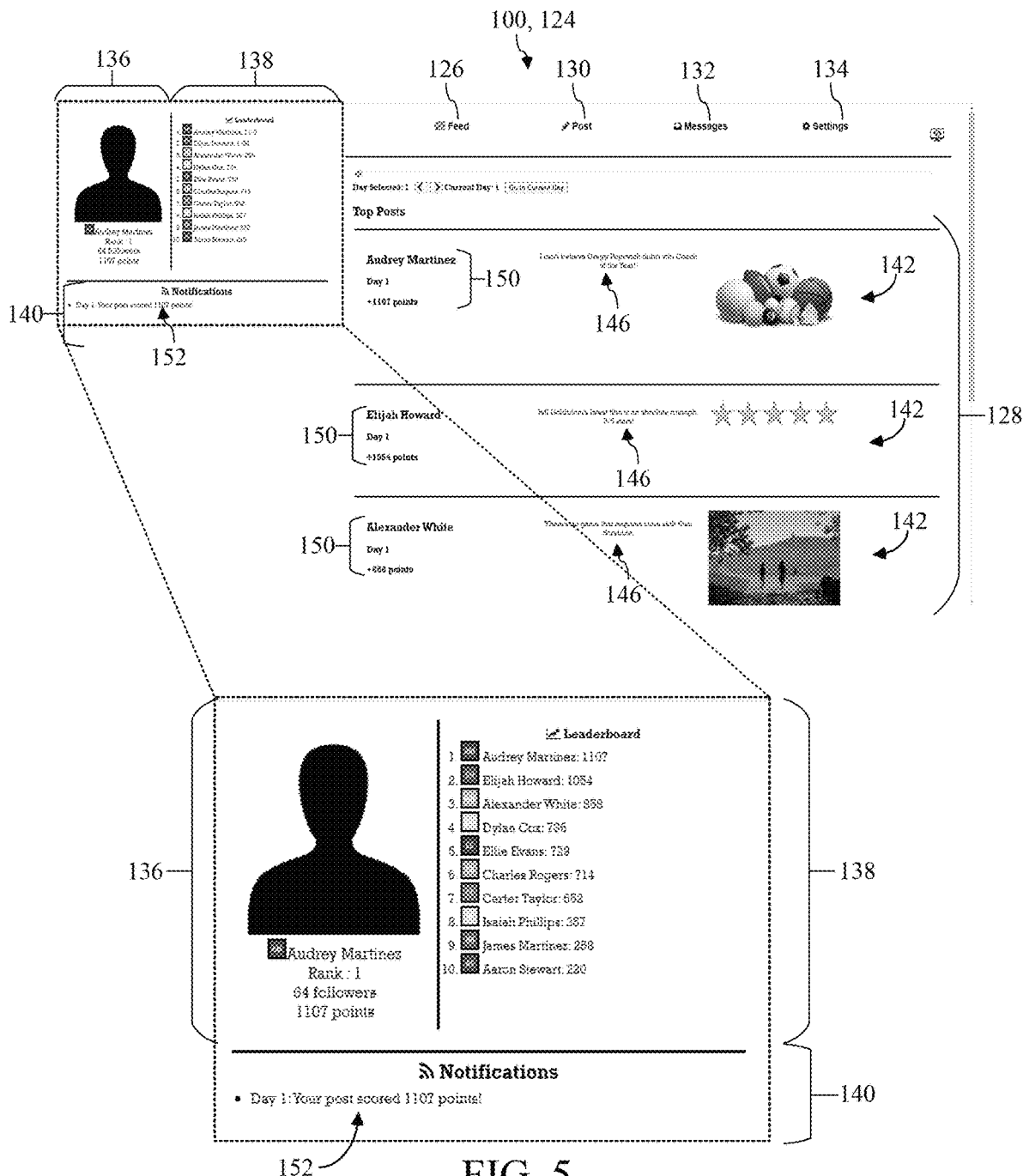

During the simulation the user/poster may have the ability to select and subsequently disseminate one (1) media post 142 a day. Each time the user selects and disseminates media post 142, and/or performs distinct actions or tasks as discussed herein, the simulation generated by program 100 advances by one day. As shown in FIG. 5, simulation screen 124 depicts feed page 126 after poster/fictitious characters have created/selected and disseminated media post 142. In the non-limiting example, the simulation has advanced to day one (1) as a result of the various media posts 142 being disseminated in the simulation. As shown, feed area 128 of simulation screen 124 has been populated, displays, and/or includes the various media posts 142 disseminated by users/posters of the simulation generated by program 100. Additionally, feed area 128 displays the various media posts 142 in a ranked order based on obtained, assigned, generated, awarded, and/or calculated audience points for each media post 142. In the example shown, media post 142 selected and disseminated by the poster associated with the fictitious character "Audrey Martinez" is positioned or displayed in the top or first slot within feed area 128. In addition to displaying media post 142, feed area 128 may include supplemental data 150 relating to each specific media post 142. For example, supplemental data 150 for each media post 142 may include the fictitious character's name, the day in which media post 142 was disseminated, and the audience point value assigned to media post 142 by the simulation of program 100.

As discussed herein, simulation screen 124 may include user specific data 136, leaderboard 138, and notification area 140. In a non-limiting example, after each day, posting, and/or event, user specific data 136, leaderboard 138, and notification area 140 may be automatically updated and/or regenerated. As shown in FIG. 5, after the user/poster disseminates media post 142, user specific data 136 is updated. More specifically, the users rank, number of followers, and/or associated points included in user specific data 136 may be updated and/or regenerated. Furthermore, leaderboard 138 may also be updated and/or regenerated to display the new rankings for each fictitious character of the simulation based on the assigned, generated, awarded, and/or calculated audience points for each media post 142 disseminated by fictitious character. Also as shown in FIG. 5, notification area 140 may include a visual or text notification 152 specific to the user/poster associated with the assigned fictitious character. In this example, notification area 140 may include text notification 152 indicating the amount of received points for media post 142 made and disseminated by the user interacting with simulation of program 100.

As discussed herein, audience points awarded or assigned to each user/fictitious character may be based on each media post 142 associated with each fictitious character. More specifically, the audience points assigned or awarded to each fictitious character may be based, at least in part, on a number of audience likes and/or a number of followers of each fictitious character. In this non-limiting example, a fictitious character that has more audience likes and more followers than a distinct fictitious characters may receive, be assigned, and/or awarded more audience points per media post 142 than the distinct fictitious character. The audience likes may be generated or predetermined by program 100 creating the simulation, and/or may be based on other users' interaction with each media post 142. Additionally, the number of followers of each fictitious character may be generated or predetermined by program 100, and/or may be based on other users' interaction with distinct fictitious characters. In addition to or alternative from the audience likes and/or number of followers, the audience points assigned or awarded to each fictitious character may be based on, at least in part, the predefined subject associated with the content of each media post 142, the visibility of each media post 142, and/or the actual content in each media post 142.

In addition to generating and awarding audience points, program 100 may also generate and/or calculate a danger score (not shown) for each media post 142 created and disseminated by a poster. The calculated danger score may represent a sensitive information exposure risk for the poster/user engaging the simulation of program 100. That is, the calculated danger score may quantify a risk or danger associated with how exposed the poster/user's sensitive information 154 is, and/or if the user/poster is quantitatively at risk of exposing or disseminating sensitive information 154 via their media posts 142. Briefly turning to FIG. 7, sensitive information 154 may include assigned information 122 (see, FIG. 2) (e.g., full name, e-mail, birthday, residence), as well as other information that may lead to password guesses/security questions (e.g., pet name), social security number (not shown), credit card information (not shown), or any other suitable information associated with a person that is private and/or may provide access to private data/information/accounts (e.g., bank accounts) associated with the user/poster. Danger score may be kept from the user and/or not made visible to a poster/user of the simulation to prevent the user from knowing the online security and privacy risk's the poster is taking while engaged with the simulation of program 100.

Danger score may be based on and/or calculated using a variety of factors associated with the poster, fictitious character associated with the poster, and/or media posts 142. In a non-limiting example, danger score may be based on content 146 of a current media post 142 and/or media post 142 included in posting library 128 (e.g., archived or old media post 142), a media type (e.g., text, picture, video) of the current media post 142 and/or media post included in posting library 128, and/or a number of audience likes on the current media post 142 and/or media post included in posting library 128. Additionally, or alternatively to the examples provided herein, danger score may be based on the number of followers for the poster/associated fictitious character, visibility characteristics 148 of the current media post 142 and/or media post included in posting library 128, and/or predefined subjects 144 associated with and/or assigned to content 146 of the current media post 142 and/or media post included in posting library 128.

Figure 6:
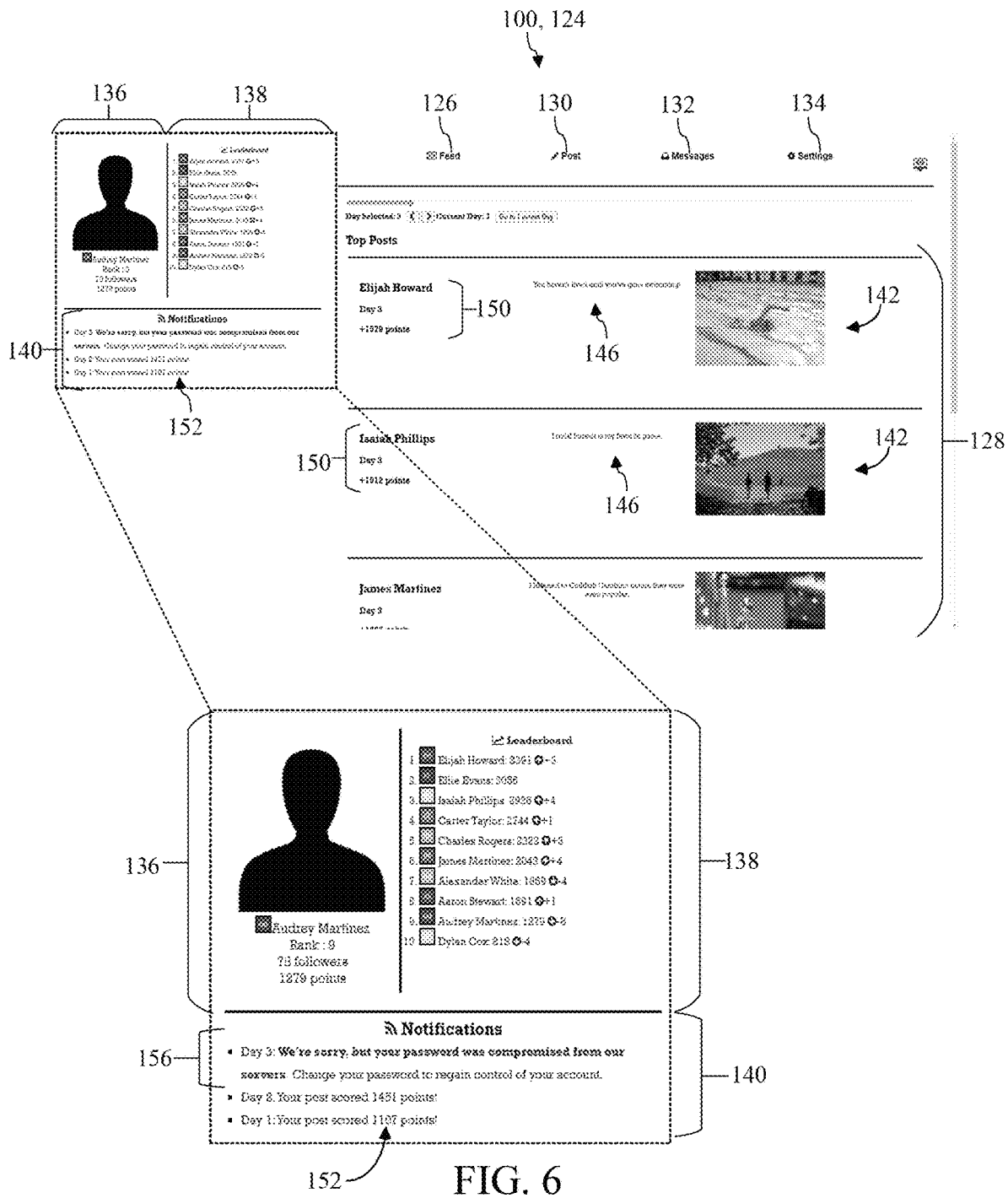

FIG. 6 shows a non-limiting example of simulation screen 124 of program 100 after day 3 of the simulation. Comparing FIG. 6 with FIG. 5, feed page 126, user specific data 136, leaderboard 138, and notification area 140 have all be updated based on events occurring within the simulation. Events occurring in simulation may include any action, process, and/or activity that changes/alters the simulation and data included therein. Disseminating media posts 142 are considered events that occur within simulation of program 100. For example, with respect to feed page 126, posting library 128 may be updated with the most recent media posts 142 made by users/fictitious characters in the simulation of program 100. As a result, user specific data 136, leaderboard 138 and/or notification area 140 may all also be updated and/or include new/rearranged data based on the dissemination of additional media posts 142 on days 2 and 3, respectively.

Additionally in the simulation, events may include security and privacy events 156. Security and privacy events 156 associated with a theft action and/or undesired obtaining of sensitive information by a thief of the simulation, which in turn may negatively impact the poster/user within the simulation (e.g., loss of audience points). For example, and as shown in FIG. 6, notification area 140 indicates security and privacy event 156 has occurred on day 3. In the example, the security and privacy event 156 may be the compromising of the poster's password in a "server" of the simulation generated by program 100. Text notification 152 in notification area 140 may provide the details of security and privacy even 156 to the poster (e.g., "compromised password"), and may further provide remedy actions (e.g., "change password").

As a danger score for media posts 142 disseminated by the poster increases, the likelihood of the occurrence of security and privacy event 156 also increases. For example, the calculated danger score for the poster, and more specifically each media post 142 disseminated by the poster, may increase from day 1 to day 3. This may be a result of each post being visible to the public (e.g., large dissemination/viewer group), the increase in the number of followers from day 1 to day 3, and/or the increase in the number of audience likes from day 1 to day 3. Because of the increase in the danger score, by day 3 the poster is susceptible to experiencing security and privacy event 156, and/or the occurrence of security and privacy event 156 may be a result of the increased danger score for media post 142 disseminated by the poster on day 3.

Figure 7:
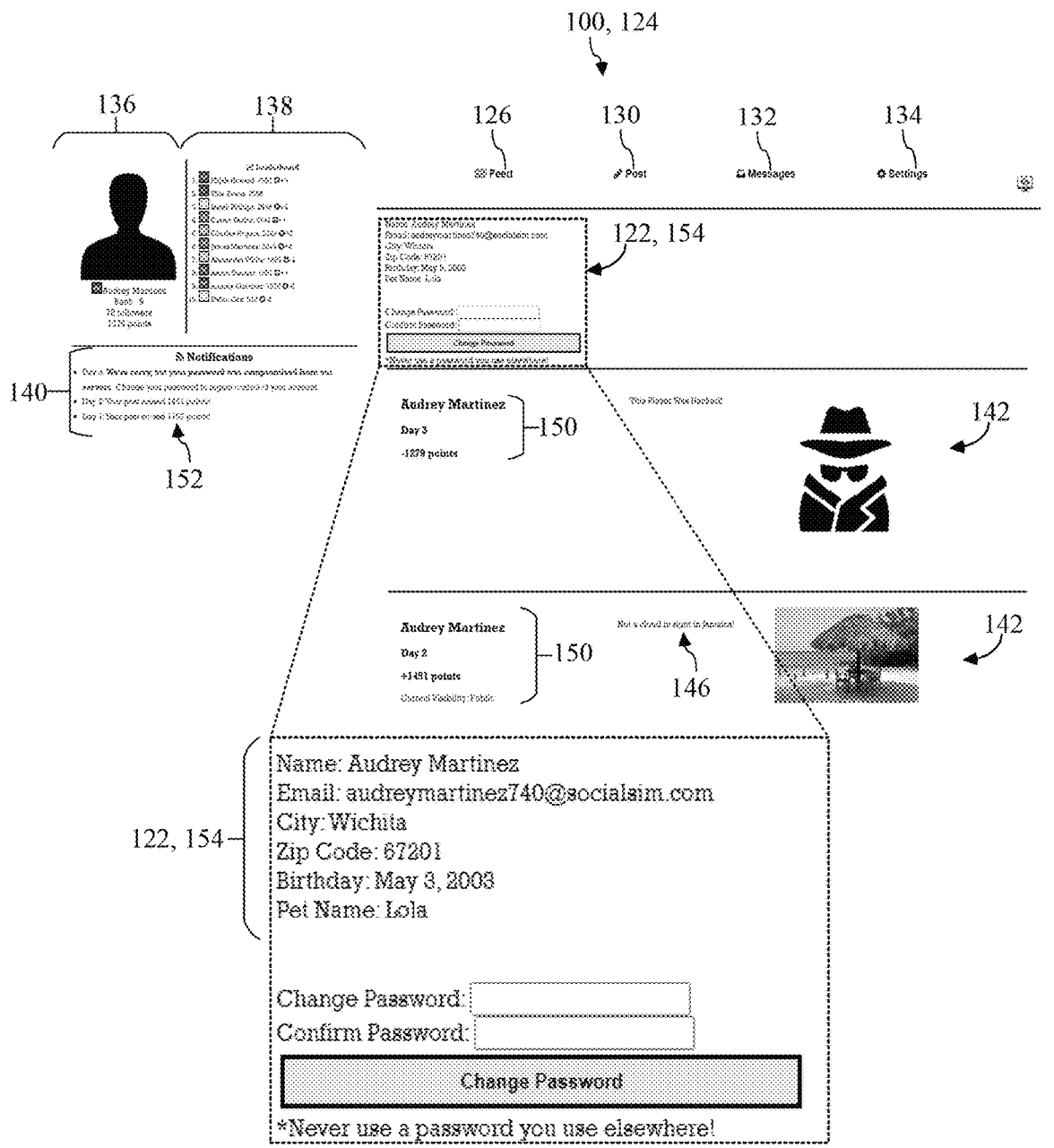

Turning to FIG. 7, a poster is able to access or view a poster profile in the simulation. The poster profile may include assigned information 122/sensitive information 154 for the associated fictitious character, as well as, change their password. Poster profile may be accessible, for example, by clicking the profile picture in user specific data 136 and/or the fictitious name associated with the poster (e.g., in specific data 136, leaderboard 138, and/or posting library 128). Here the poster profile may provide the poster with the opportunity to change their password for the simulation.

Additionally as shown in FIG. 7, poster profile includes all media posts 142 including supplemental data 150 made only by the poster/fictitious character. As shown in FIG. 7, media post 142 disseminated, or attempted to be disseminate, on day 3 indicates that the poster has been hacked (e.g., "password has been compromised"), and supplemental data 150 for media post 142 of day 3 indicates that poster/associated fictitious character has lost audience points as a result of the hack. That is, when a poster of the simulation has been hacked and/or a security and privacy event 156 occurs during on a day in the simulation, the poster/associated fictitious character loses audience points or audience points are subtracted from the poster. As discussed herein, the subtracted audience points may be added or converted to theft points, which may be assigned or awarded to a thief who has successfully carried out security and privacy events 156 (e.g., hacks, attacks) against posters interacting with the simulation of program 100.

Figure 8:
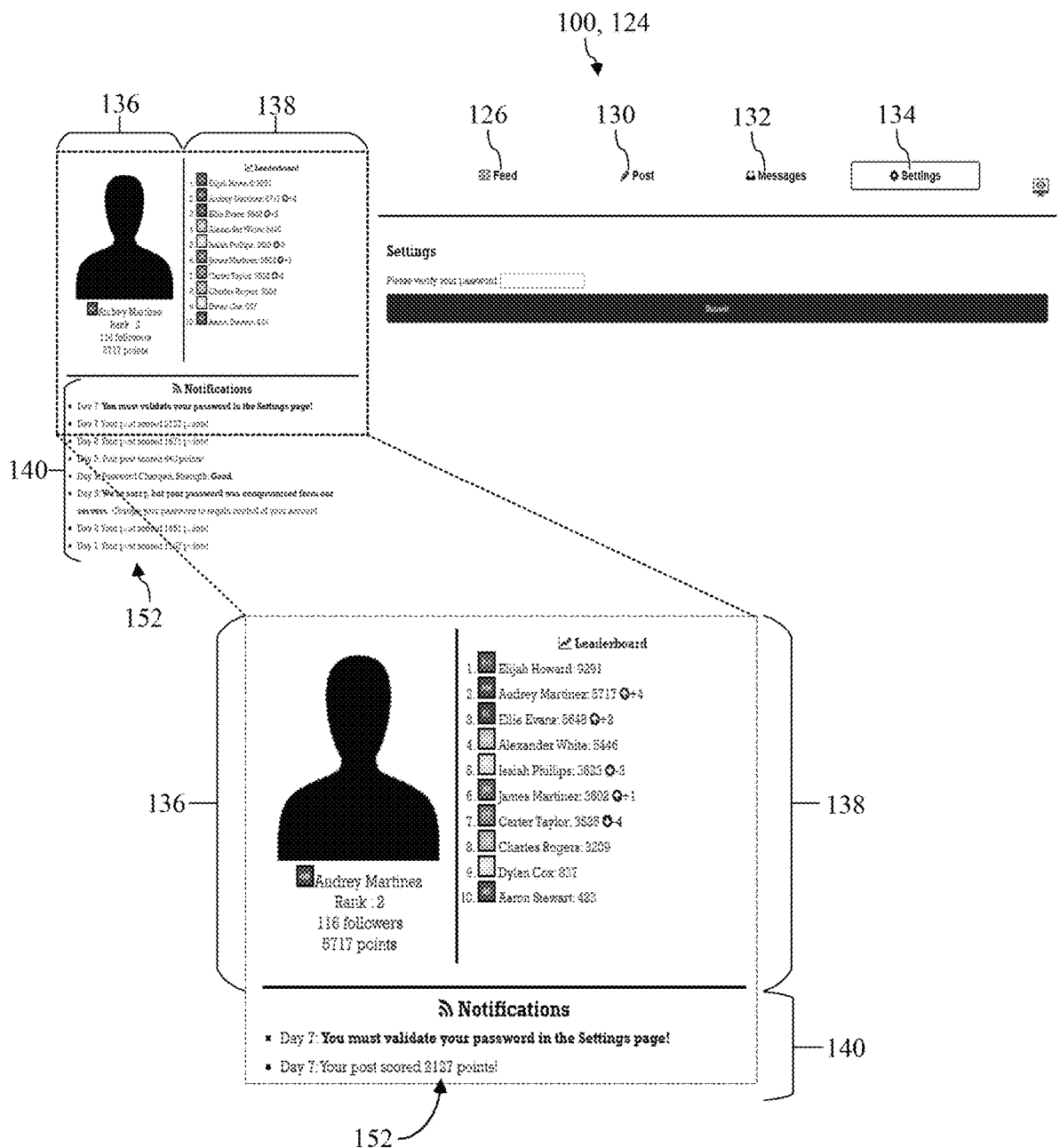

FIG. 8 shows another non-limiting example of security and privacy event 156. In the non-limiting example, security and privacy event 156, as highlighted and indicated in notification area 140, may include a prompt to validate and/or verify the poster's password in the settings page 134. This security and privacy event 156 may be or may include a pre-attack event where the poster must successfully validate their password to avoid another successful security and privacy event 156 that may negatively affect the poster interacting with the simulation of program 100. Where the poster can successfully validate their password in settings page 134, the poster may avoid or prevent further security and privacy events 156 that may result in the loss or subtraction of audience points. Alternatively where the poster cannot successfully validate their password, the poster may be susceptible to a successful security and privacy event 156 resulting in the loss or subtraction of audience points. Additionally, where the poster is unable to validate their password, the danger score for current and subsequent media posts 142 made by the poster may increase.

Figure 9:
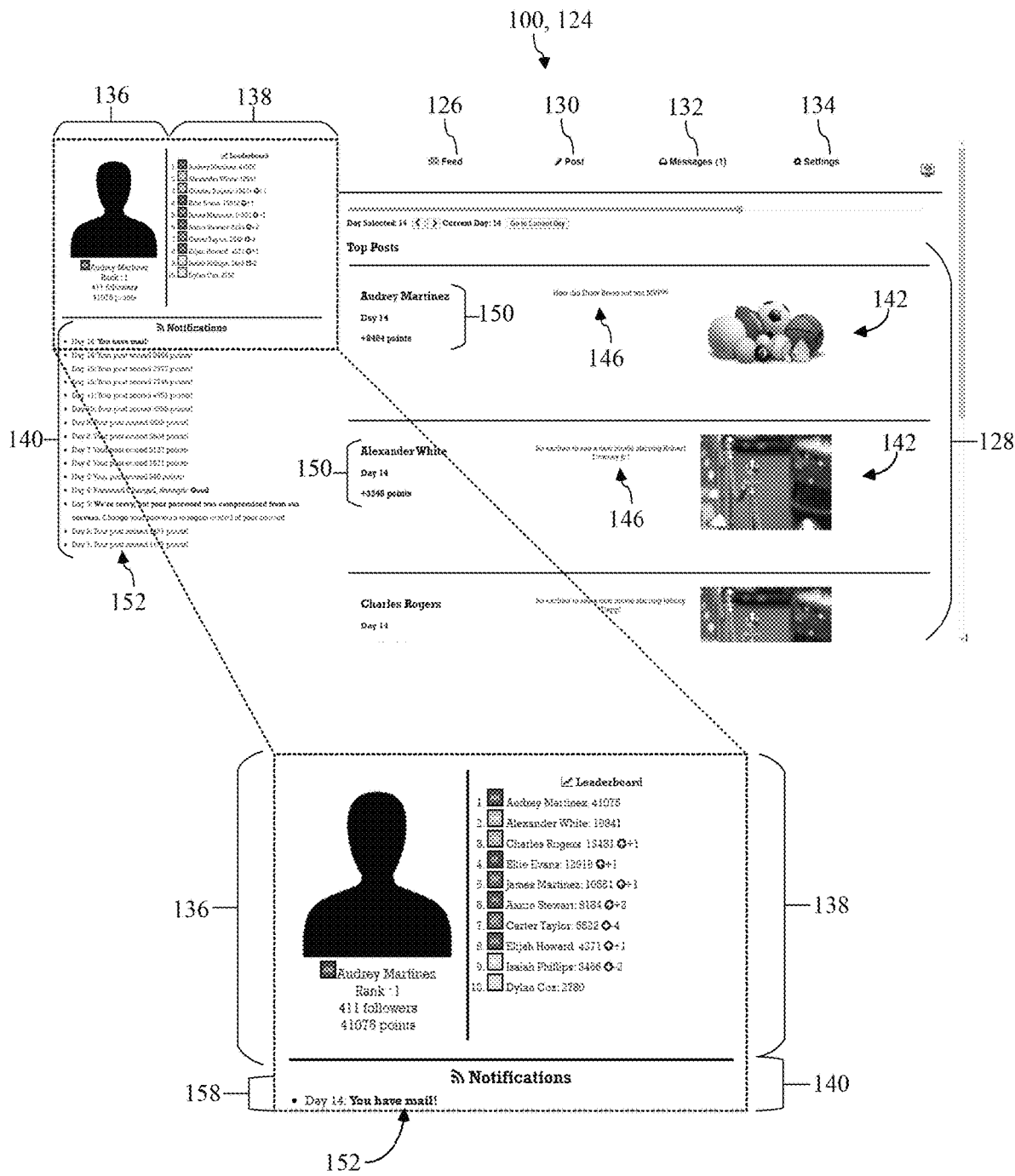
Figure 10:
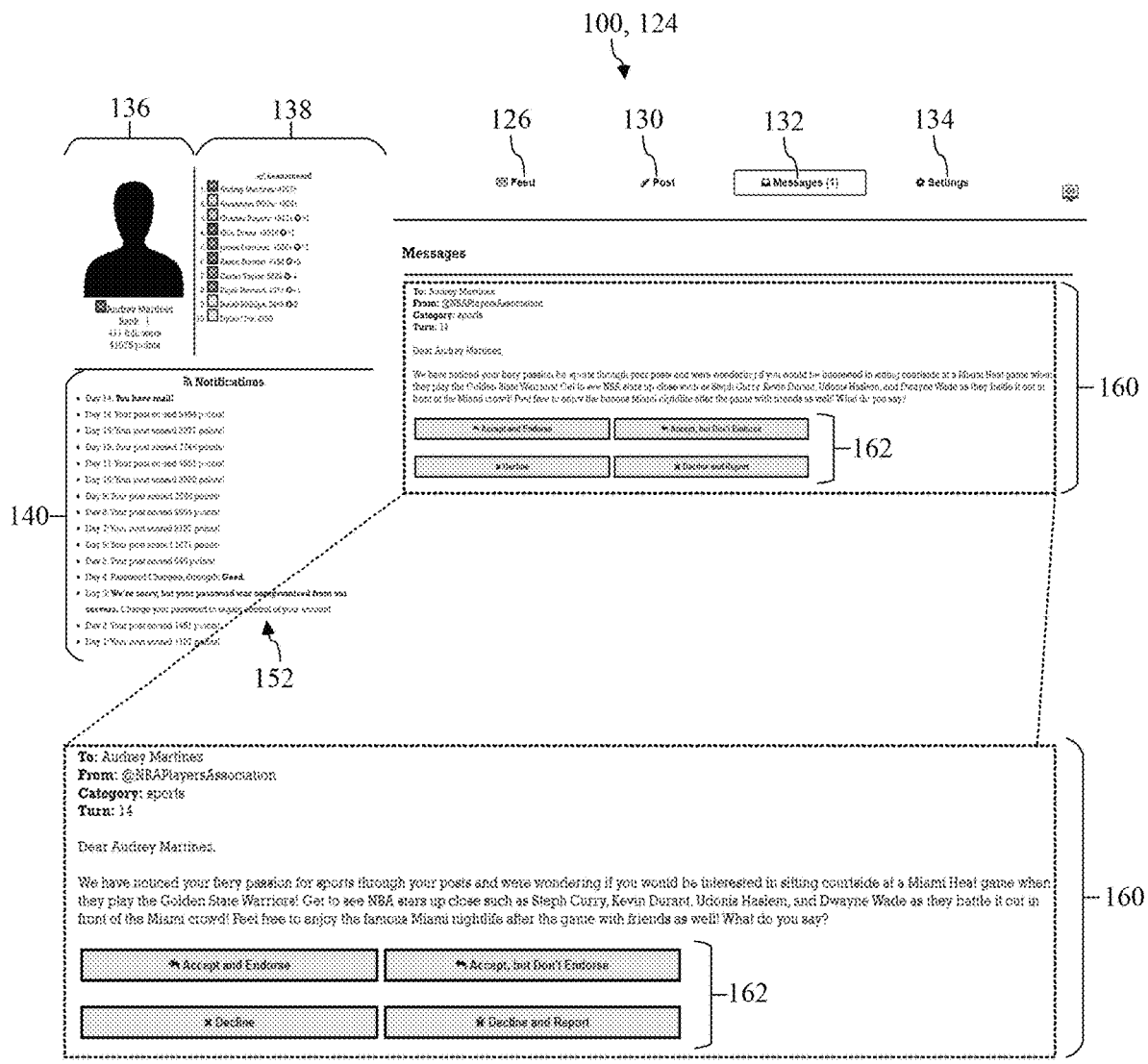
Figure 11:
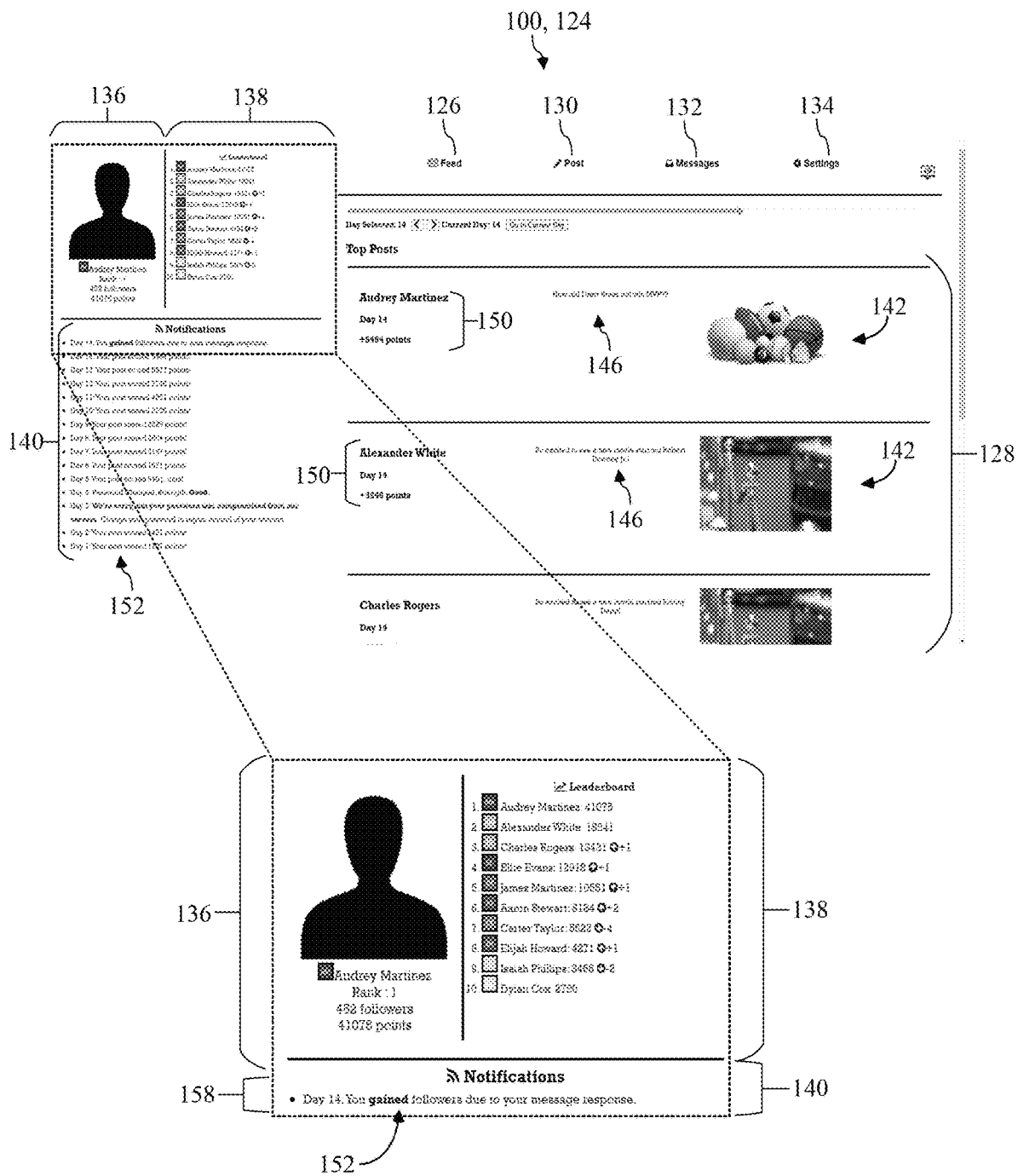

FIGS. 9 and 10 show an example of a message or mail event 158. Specifically, notification area 140 in FIG. 9 provides notification text 152 that indicates that the poster has received a message or mail on day 14 (e.g., mail event 158). Furthermore, and as shown in FIG. 9, message page 134 includes an indicator (e.g., "(1)") that notifies the poster that a message or mail has been received. FIG. 10 shows message page 134 including the message or mail 160 received as a result of mail event 158. In the non-limiting example, poster may examine, inspect, and/or personally analyze all portions of the message (e.g., mailing address, category, message content, etc.) to determine how they will interact (or no interact) with mail 160. Where mail 160 includes genuine or unharmful request and/or data, interacting positively with mail 160 may improve the poster/fictitious characters experience in the simulation of program 100. However, if mail 160 is harmful (e.g., phishing), interacting positively with mail 160 may negatively impact the poster/fictitious characters experience in the simulation of program 100 (e.g., triggering security and privacy event 156 resulting in a loss of audience points).

The poster may interact with mail 160 may choosing from a set of predetermined response 162. The set of predetermined response 162 may determine how mail 160 is received/interacted with by the poster, and may range from full acceptance of the content or ask in mail 160 to complete rejection and reporting of mail 160. In the non-limiting example, the poster may "accept and endorse" mail 160, "accept" but not endorse mail 160, "decline" mail 160, or "decline and report" mail 160. Each predetermine response may positively and/or negatively impact the poster/fictitious character in the simulation of program 100. For example, and briefly turning to FIG. 11, if the poster "accepts and endorses" mail 160, and mail 160 is unharmful, the poster may gain followers (see, FIG. 11), which in turn may result in additional audience points for subsequent media posts 142. However in this example, the acceptance and endorsement of mail 160 may result in an increase in danger score for subsequent media posts 142, which in turn may increase the risk of future security and privacy events 156.

In another example where the poster "accepts and endorses" mail 160, and mail 160 is harmful (e.g., phishing), the poster may increase their danger score for subsequent media posts 142, expose sensitive information 154, allow a thief access to sensitive information through mail 160, and ultimately lose audience points in future days/with subsequent media posts 142. Alternatively, declining or declining and reporting mail 160 may lower the danger score associated with the poster and/or future media posts 142 made by the poster. However, the declining of mail 160 may result in the poster/associated fictitious character not gaining followers on that day of the simulation, which in turn results in no ability to increase audience points in subsequent days of the simulation.

Figure 12:
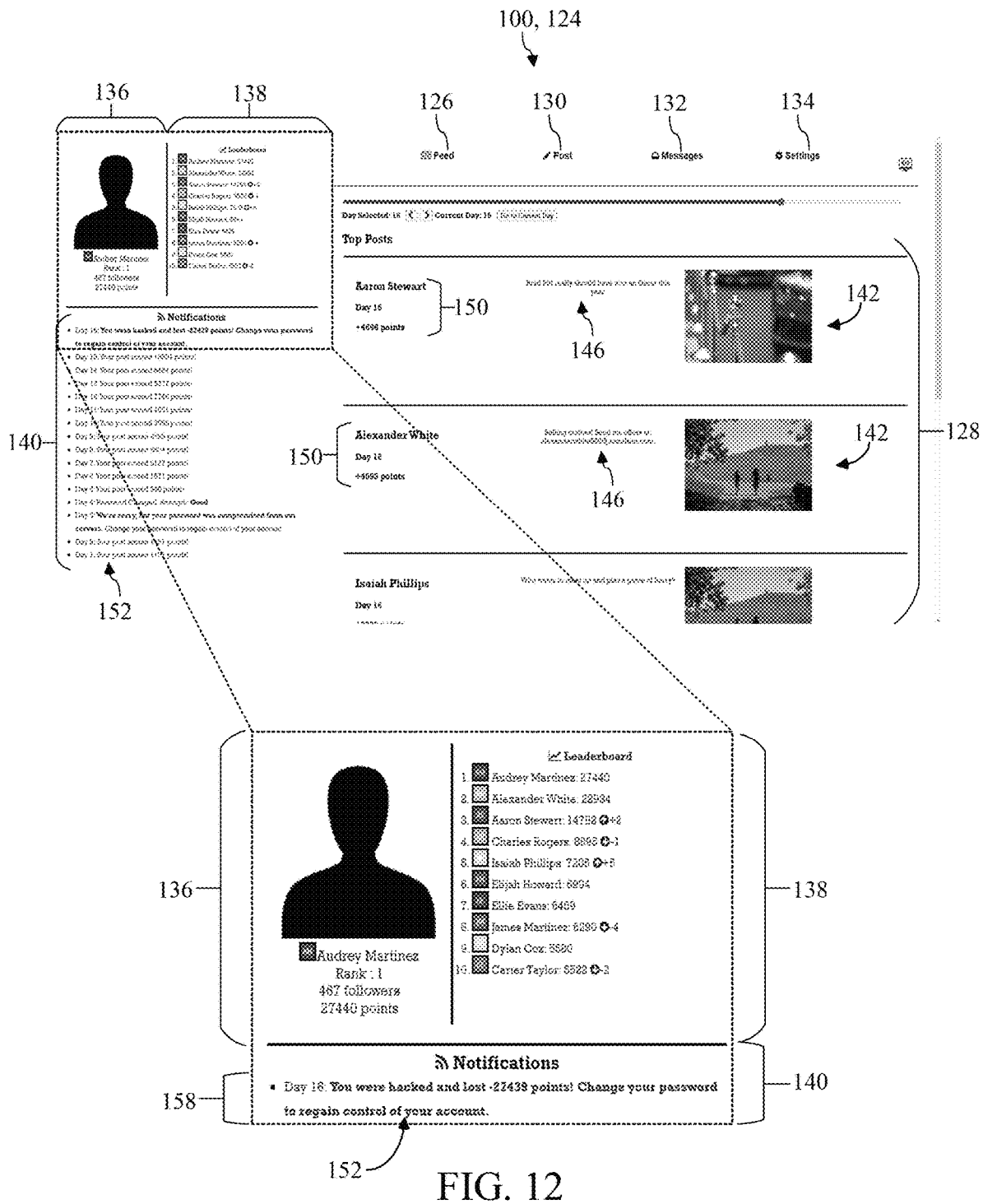

FIG. 12 shows another non-limiting example of security and privacy event 156. In this non-limiting example notification area 140 indicates security and privacy event 156 has occurred on day 16. In the example, the security and privacy event 156 may be that the poster's account was hacked, and audience points were lost/subtracted. Text notification 152 in notification area 140 may provide the details of security and privacy even 156 to the poster (e.g., "hacked"), and may further provide remedy actions (e.g., "change password").

Figure 13:
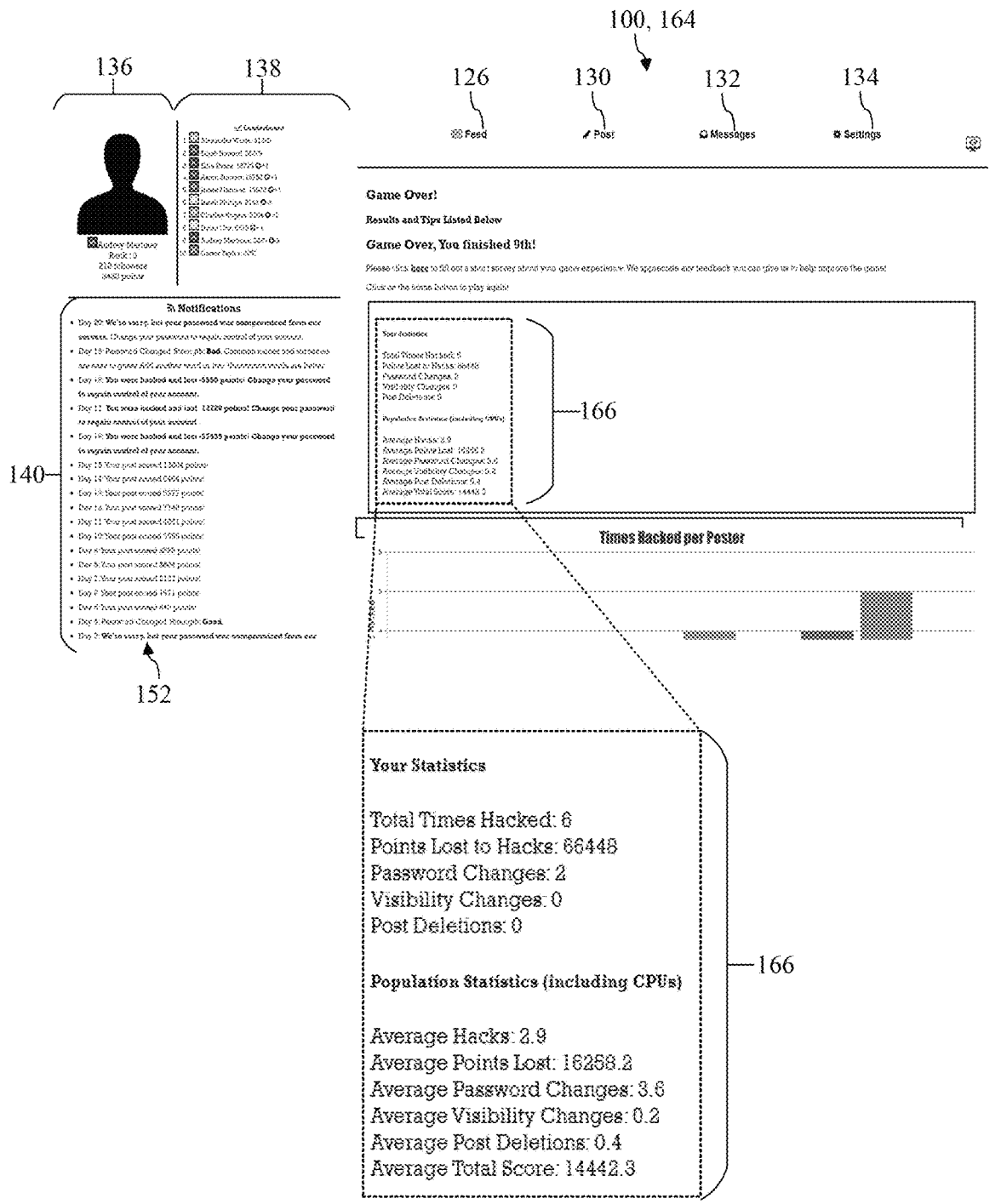

FIG. 13 shows a results screen 164 of simulation generated by program 100. Results screen 164 may be displayed at the end of the simulation (e.g., after the predetermined amount of turns/days have been engaged by the poster). Results screen 164 may provide various statistics 166 relating to, for example, the posters interaction with the simulation, as well as statistics for the whole simulation including data for both the poster and computer generated/artificial intelligence-based statistics. Using statistics 166, the user/poster may learn how to avoid security and privacy events 156 from occurring in the simulation, and/or may better understand scenarios and/or occurrences that result in potential exposure of sensitive information 154 and/or risk of negative events (e.g., security and privacy events 156) while interacting with the simulation and/or posting on social media.

FIGS. 14-26 depict a non-limiting example of the simulation of program 100 for a thief or cyber-attacker. That is, FIGS. 14-26 depict preliminary information screen 120 and/or simulation screen 124 when a user is not a poster, but assigned or associated with the role of "thief" or "hacker" who is actively trying to create security and privacy events 156 for fictitious characters (and users/posters when applicable) in the simulation. Because the user is assigned the role of hacker or thief are operating on program 100, the hacker's experience and/or visuals may be substantially similar to this shown and discussed herein with respect to FIGS. 2-13. It is understood that similarly numbered and/or named components may function in a substantially similar fashion. Redundant explanation of these components has been omitted for clarity.

Figure 14:
FIGS. 14-26 show illustrative views of a simulation screen of the simulation of online security and privacy issues of FIG. 1 as engaged by a user-thief, according to embodiments of the disclosure.

As shown in FIG. 14, preliminary information screen 120 is presented to the user/hacker/thief, and may provide simulated, generated, and/or artificial information associated with and/or assigned to the user of program 100—referred to herein as assigned information 122. Assigned information 122 may include any suitable information relating to the fictitious character in which the user is associated with within and/or during operation of program 100.

Figure 15:
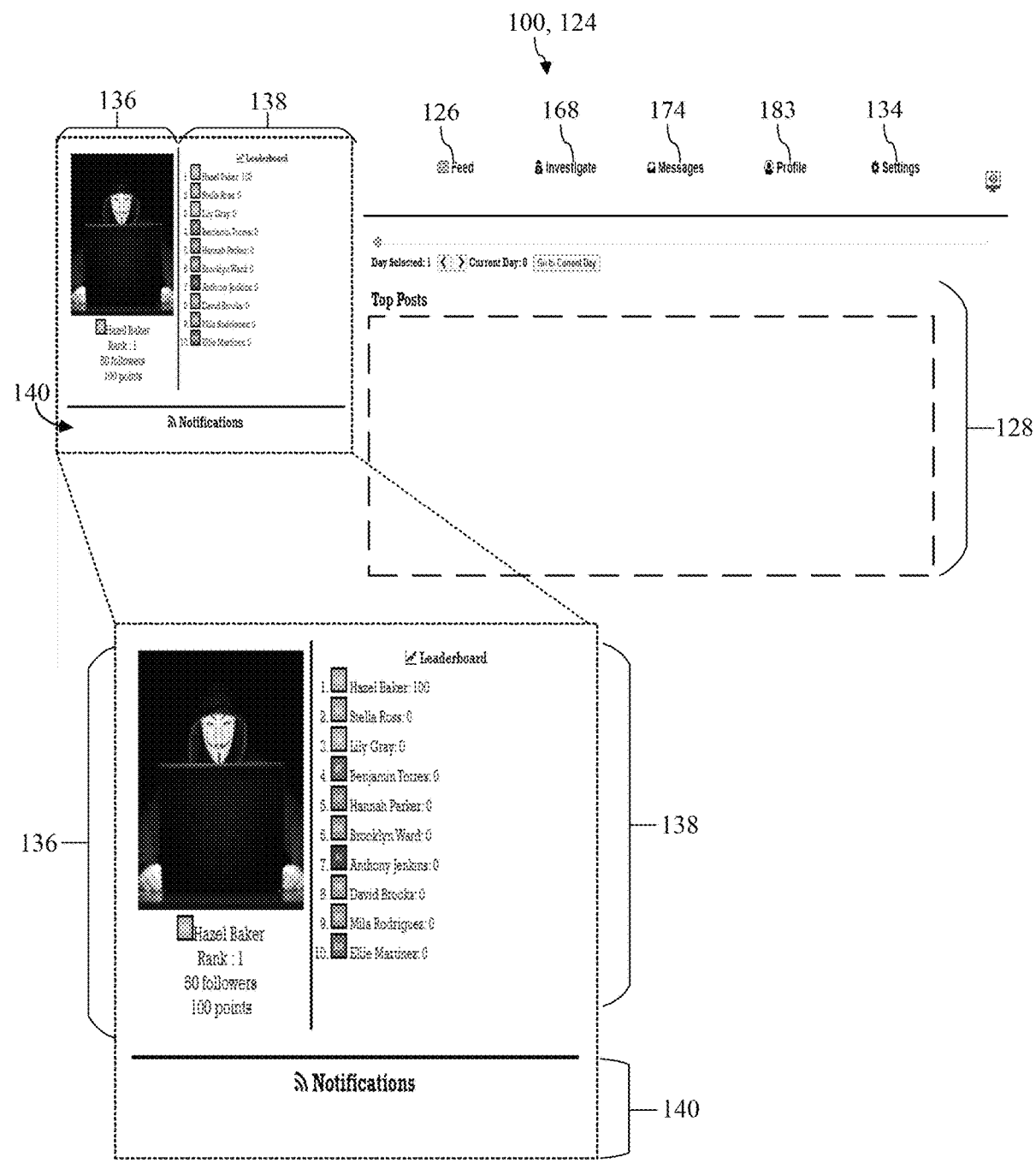

FIG. 15 depicts simulation screen 124 as created or generated by program 100 for user/thief. In the non-limiting example, simulation screen 124 may include a feed page 126 including a posting library 128 and settings page 134, as similarly discussed herein with respect to FIG. 3.

Figure 16:
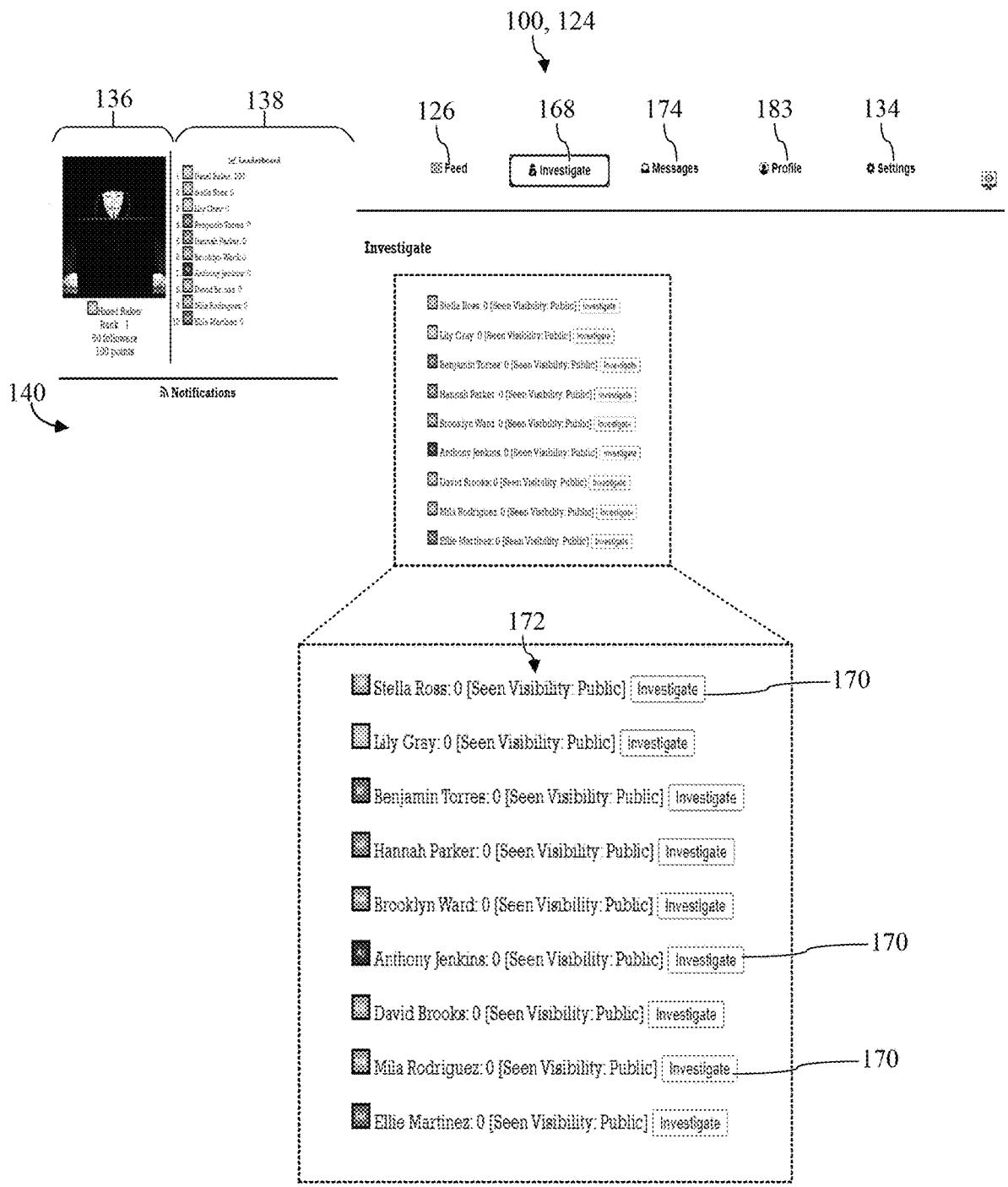

Simulation screen 124 may also include an investigate page 168. Briefly turning to FIG. 16, Investigate page 168 may provide the thief the ability to investigate, probe, and/or gain access or clearance to a selected poster engaging and/or interacting with the simulation of program 100. That is, and as discussed herein, each turn the thief may choose to investigate one of the posters by interacting with a investigate button 170 associated with the specific poster. Additionally as shown in FIG. 16, a visibility indicator 172 for each of the posters may be present and/or displayed in investigate page 168. Visibility indicator 172 may display the visibility (e.g., public) or clearance level that the user/thief has with each poster. As shown in FIG. 16, on day 0 of the simulation, the thief may only have access to media posts made by the posters that include "public" visibility characteristics 148 (see, FIG. 4). However, during the simulation the thief may continuously investigate the same poster to gain additional visibility/clearance levels for the poster. As the clearance levels increase between the thief and the post, visibility indicator 172 may change, resulting in the thief being able to view media posts made by the poster that have other visibility characteristics 148 (e.g., friends only, friends of friends). This in turn may allow the thief to access information or data disseminated in the media posts to attempt security and privacy events 156 against the poster.

Figure 17:
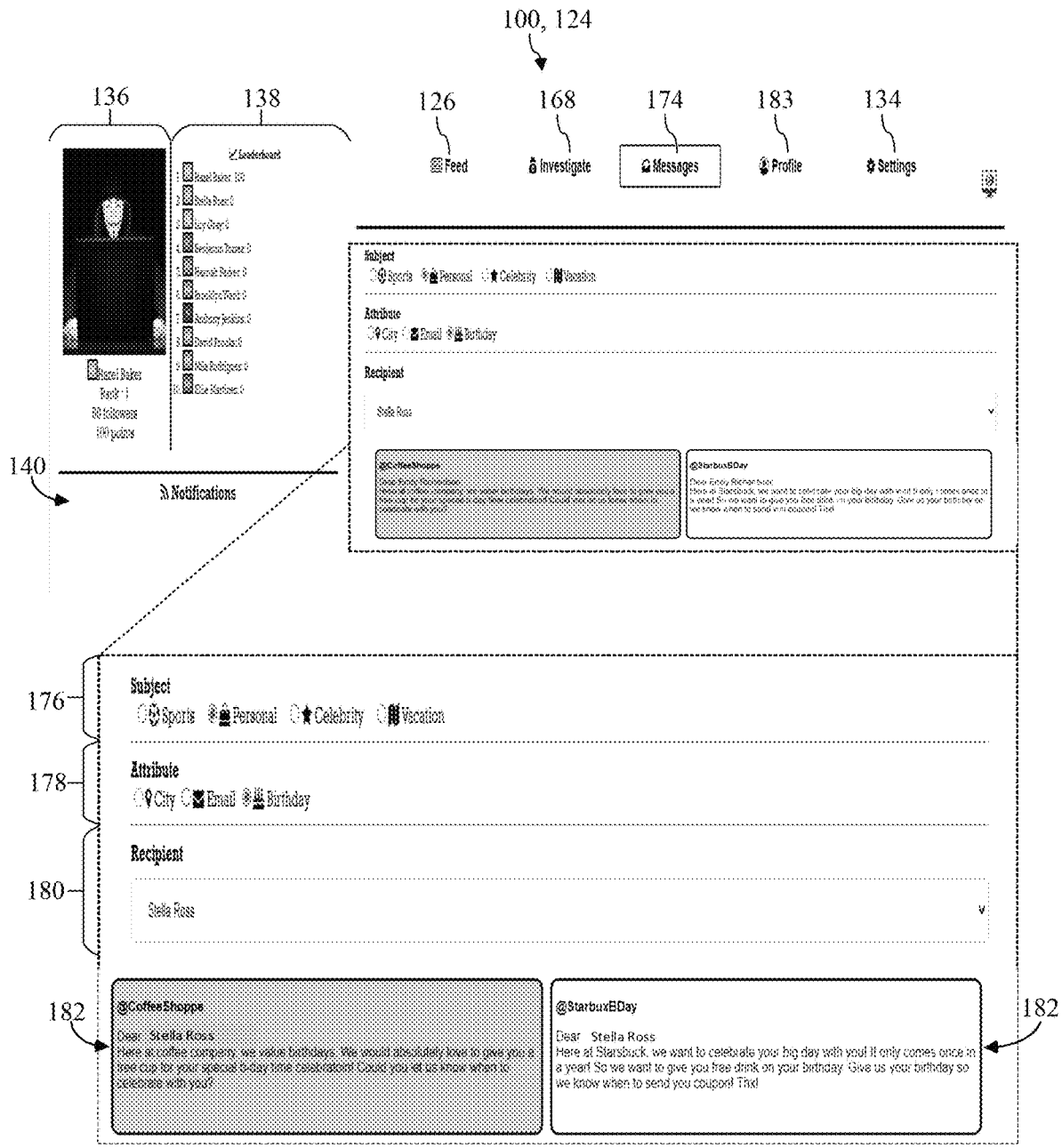

With continued reference to FIG. 15, and briefly referring to FIG. 17, simulation screen 124 may also include message page 174. Message page 174 may provide the thief the ability to send messages to other posters to obtain access, increase clearance levels to the posters, and/or obtain additional information or data (e.g., sensitive information 154) relating to the poster. For example, and as shown in FIG. 17, message page 174 may allow thief to select a subject 176 of the message being sent to the poster, an attribute 178 for the message being sent to the poster, and the identified recipient 180 (e.g., poster) of the message. Message 182 sent to recipient 180 (e.g., poster) may be selected by the thief from a plurality of predetermined messages 182 specific to subject 176 and attribute 178, respectively. Each message 182 may also include distinct requests (e.g., the message or text of the message) included therein. As discussed herein, the requests in messages 182 (e.g., phishing e-mail) may, at least in part, positively or negatively affect the thief's experience during the simulation including, but not limited to, the amount of points received/deducted, the ability to gain information/data (e.g., sensitive information 154) from the poster, and/or the ability to (successfully) attempt security and privacy events 156 that affect the poster. In a non-limiting example, and as discussed herein, the thief may only send message 182 to posters after obtaining and verifying that specific poster's e-mail address. For example, and as shown in FIG. 17, the thief may send a poster a phishing message 182 for a false business requesting that the poster provide response to the email including sensitive information (e.g., a birthday). If successful (e.g., the poster response/provides the sensitive information 154), the thief may obtain sensitive information 154 for that user to be used for subsequent security and privacy events 156.

Figure 18:
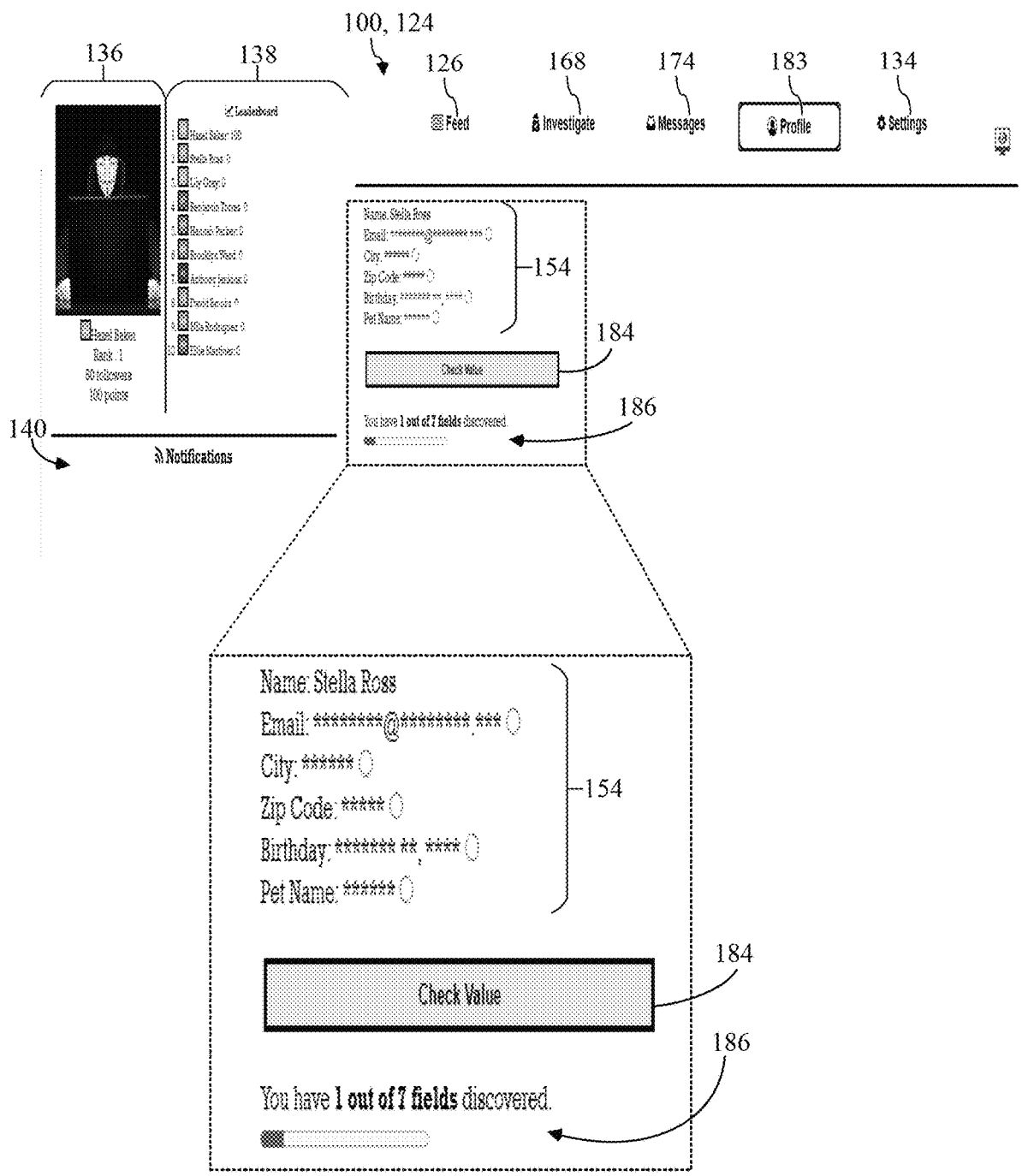

Profile page 183 may provide access or the viewing of each poster's profile. More specifically, and as shown in FIG. 18, profile page 183 may depict the individual poster's profile, which may include sensitive information 154. Initially, the only sensitive information 154 the thief may have for each poster is their name (e.g., "Stella Ross"). Profile page 183 may also provide a check value button 184, as well as progress indicators 186. As discussed herein, after a thief selects a blocked-field of sensitive information 154, check value button 184 may be engaged to allow the thief the ability to input the information or data they believe is associated with the selected, field of sensitive information 154 (see, FIGS. 22 and 23). If correct, that specific piece of sensitive information 154 may no longer be blocked. Additionally, progress indicators 186 may indicate that one (1) additional field for sensitive information 154 has been discovered. As discussed herein, once a predetermined number of fields of sensitive information 154 has been discovered for a single poster, the thief may attempt an security and privacy event 156 (e.g., hack) (see, FIG. XX).

Figure 19:
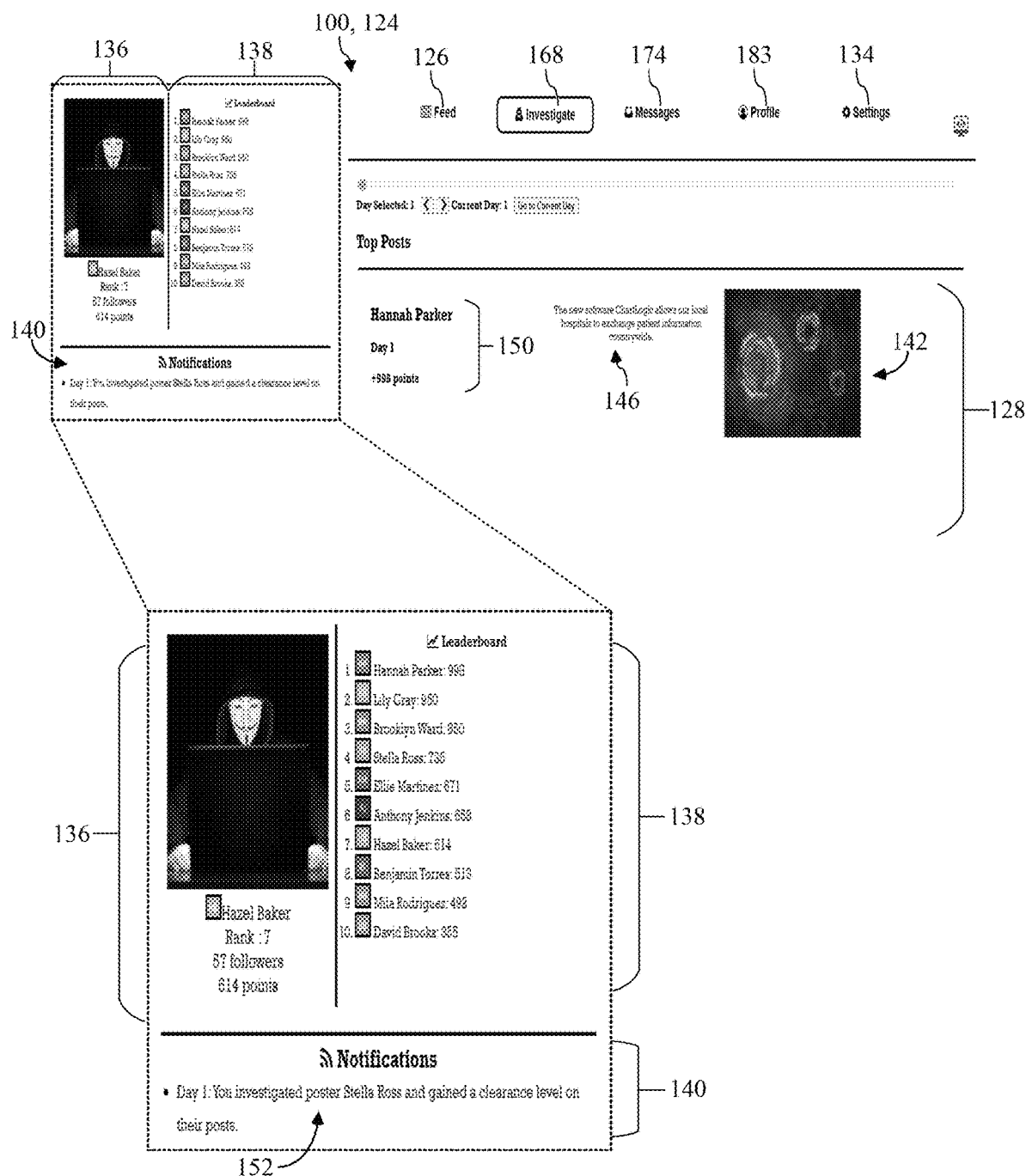
Figure 20:
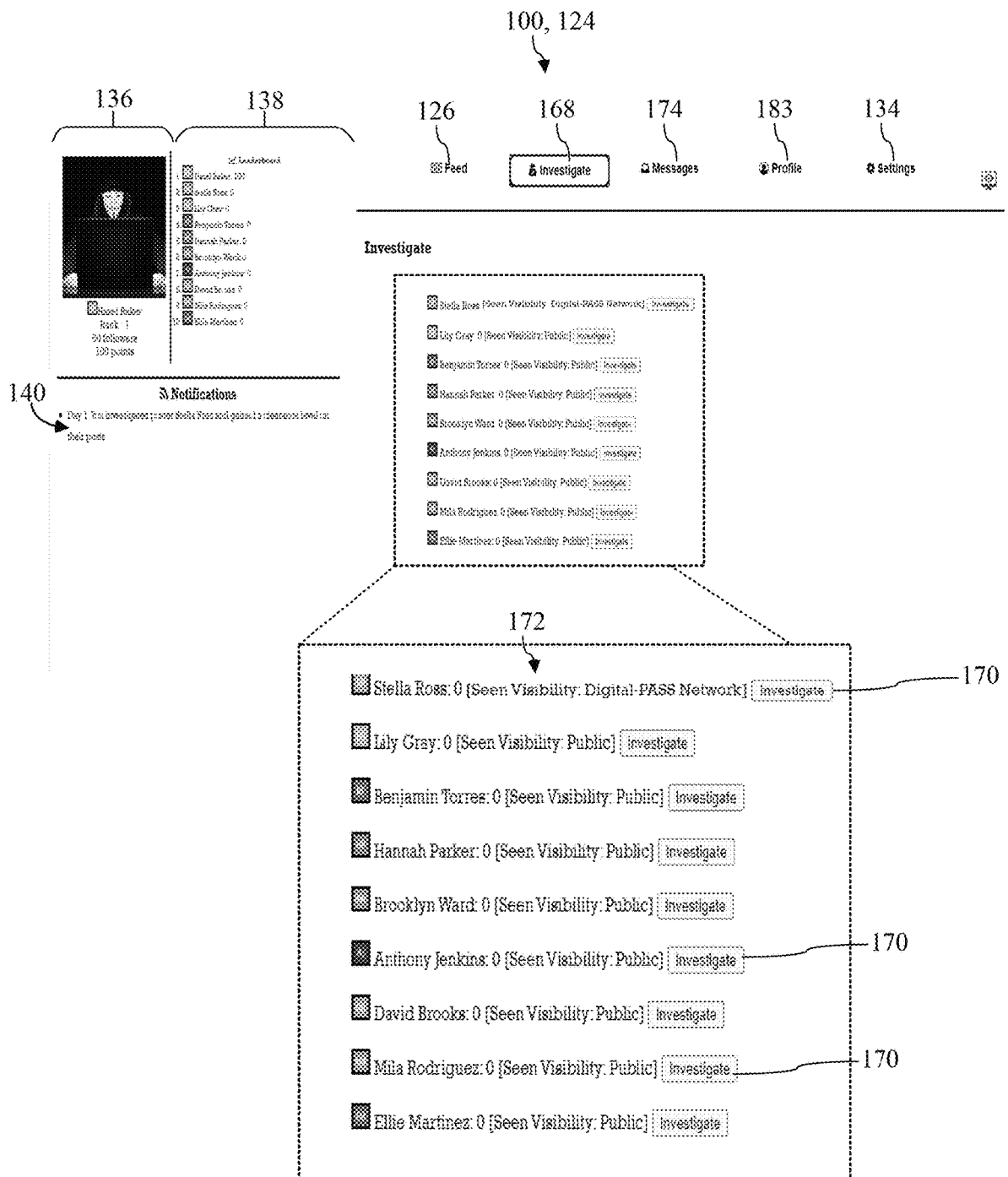

Turning to FIG. 19, a non-limiting example of feed page 126 is shown after the day one (1). More specifically, and as indicated via a text notification 152 shown in notifications area 140, the user/thief has investigated poster "Stella Ross" using investigate page 168. As shown in FIG. 19, and indicated in notifications area 140, the thief who investigated Stella Ross may have gained a clearance level for the poster's posts, which in turn means the thief can now view posts made by Stella Ross that are, for example, visible to the public or network users (e.g., all users of a specific network) (see, FIG. 4). Briefly turning to FIG. 20, and as a result of the thief investigating Stella Ross, visibility indicator 172 may change or be adjusted for Stella Ross.

Returning to FIG. 19, an examination of posting library 128 of feed page may show a media post made by poster Hannah Parker. Thief may review media post 142, and more specifically content 146 of media post 142, as well as supplemental data 150 to determine if any sensitive information 154 may be gleaned from media post 142. Upon examination, it may be determined that content 146/supplemental data 150 does not include any sensitive information 154.

Figure 21:
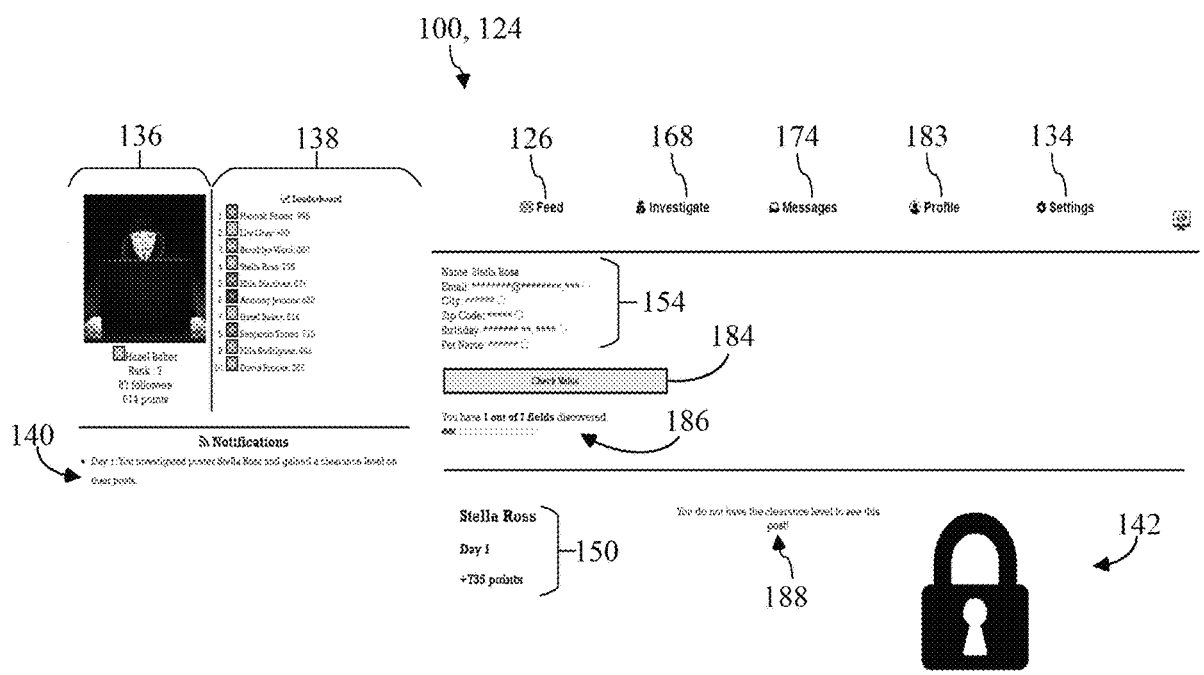

Turning to FIG. 21, the thief may view Stella Rose's profile after Day 1. Simulation screen 124 depicting Stella Rose's profile on profile page 183 may show sensitive information 154, check value button 184, and progress indicators 186. Additionally, profile page 183 for Stella Rose may show media posts 142 made by the poster, as well as supplemental data 150. However, and based on the visibility characteristics 148 for the media post 142 made by Stella Rose, the thief may not have access to content 146. Rather, content 146 may be blocked and/or thief may be provided with a block message 188 indicating that the thief does not have the appropriate clearance level to see the post made by Stella Rose on day 1.

Figure 22:
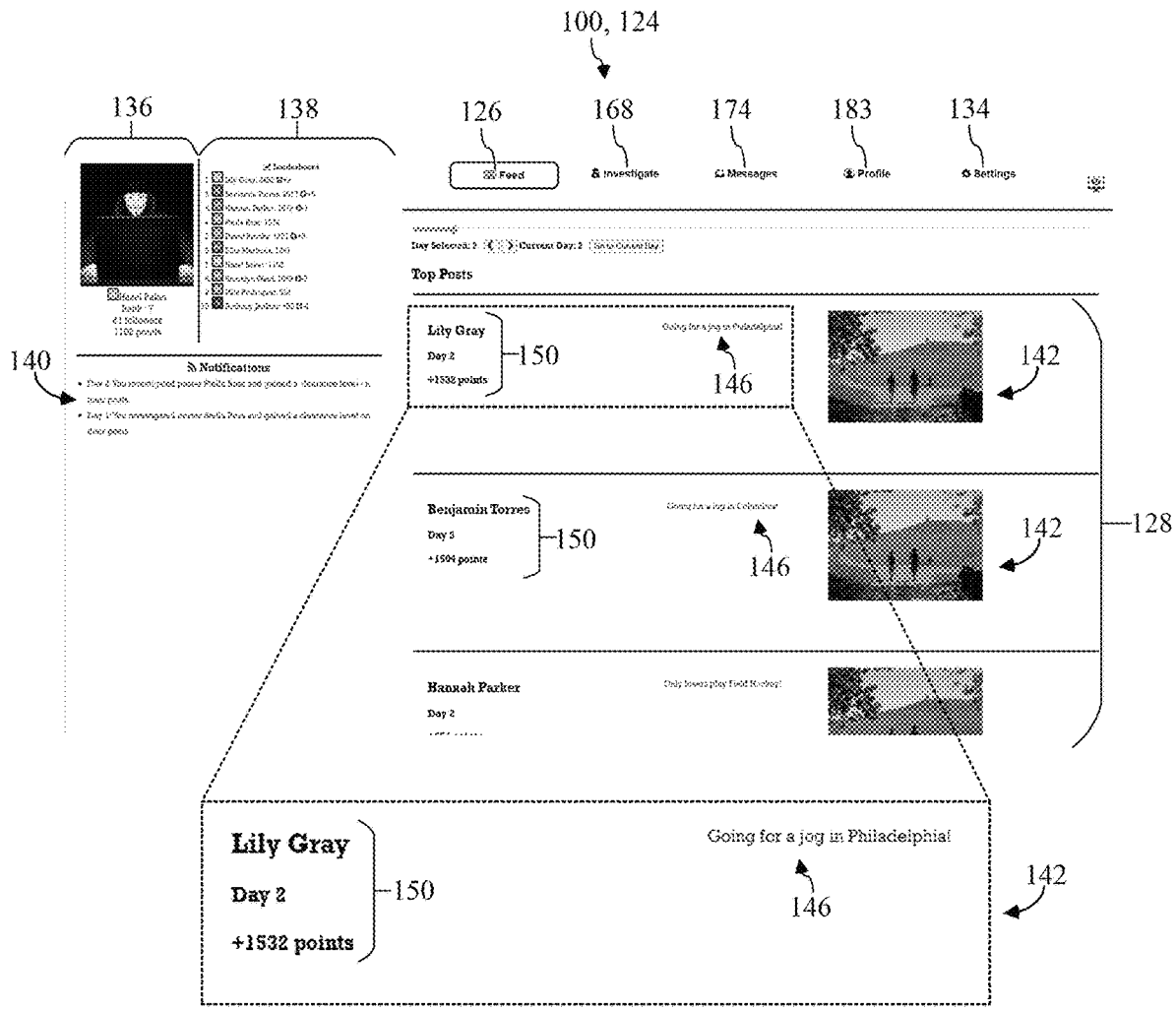

Simulation screen 124 shown in FIG. 22 shows simulation after day 2. In the non-limiting example, the thief may view multiple media posts 142 in postings library 128 via post feed 126. For example, the thief may view media post 142, and the incorporated content 146 and supplemental data 150 disseminated by poster Lily Gray. Upon examination, the thief may see that content 146 includes text that recites "[g]oing for a jog in Philadelphia!" Using this information, the thief may attempt to gain, obtain, and/or confirm sensitive information 154 for poster Lily Gray.

Figure 23:
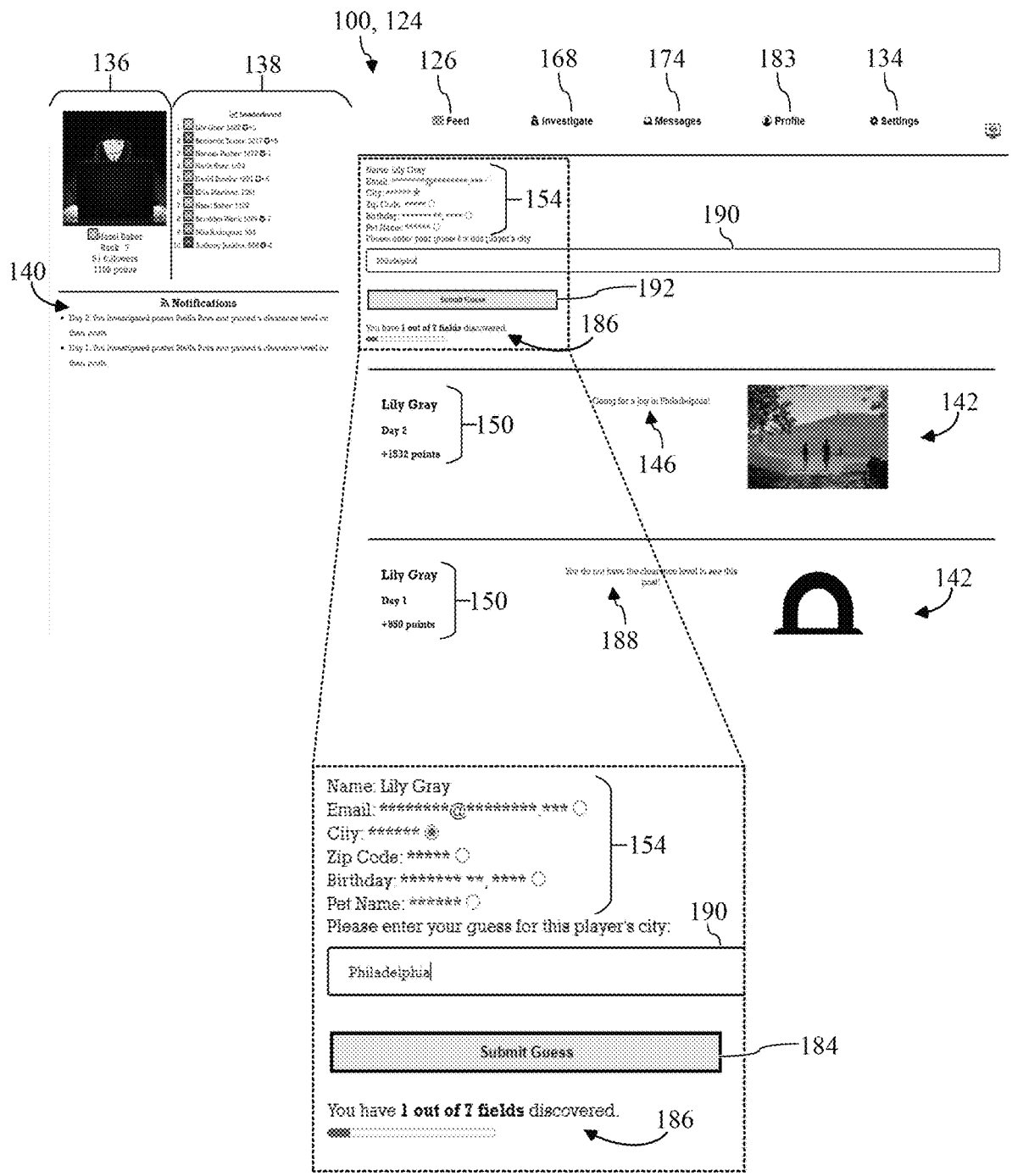
Figure 24:
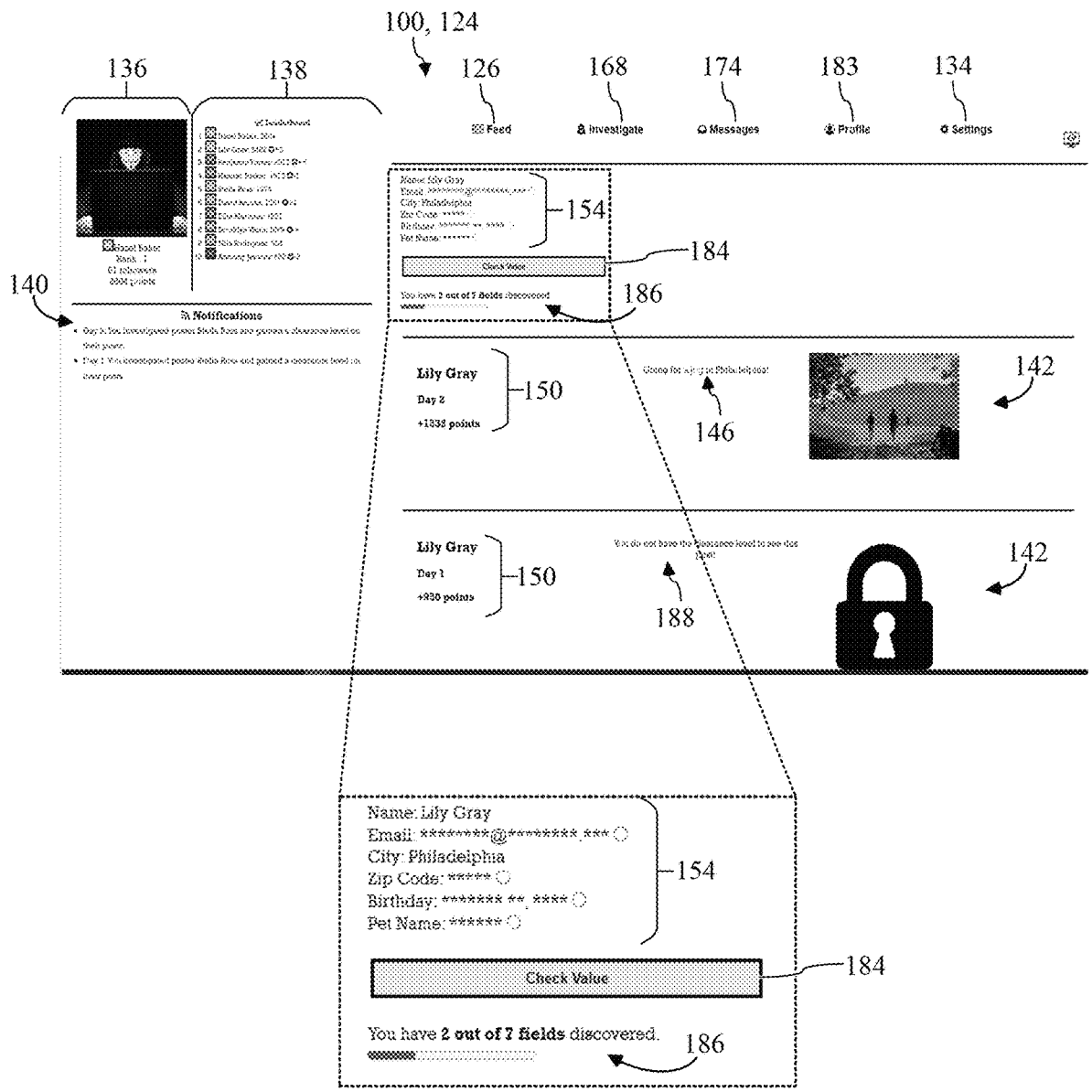

For example, and with reference to FIG. 23, the thief may access Lily Gray's profile via profile page 183. From there, the thief may select a blocked field for sensitive information 154 specific to Lily Gray that they believe they have obtained. For example, the thief may select the blocked "City" in Lily Gray's profile, and subsequently engages the check value button 184 (see, FIG. 18). Upon engaging check value button 184, a dialog or text box 190 and a submit guess button 192 may appear in the poster's profile. Here, the thief may manually add their guess to text box 190 and submit the guess using button 192. If correct, sensitive information 154 may be updated in the poster's profile. For example, and as shown in FIG. 24, after correctly guessing the Lily Gray's city is "Philadelphia," sensitive information 154 in Lily Gray's profile may be updated. Additionally, progress indicators 186 may be updated to reflect the number of fields of sensitive information 154 the thief has discovered and/or obtained.

In addition to updating sensitive information 154, the thief may gain, obtain, and/or be awarded thief points— similar to audience points discussed herein. That is, the thief may gain or be awarded thief points based on the actions and/or interactions with the simulation of program 100. In this example, the thief may obtain 100 audience points for properly guessing the poster's city. Alternatively, if the thief improperly guesses and/or inputs the wrong information or data for a poster's profile, the thief may lose thief points.

Figure 25:
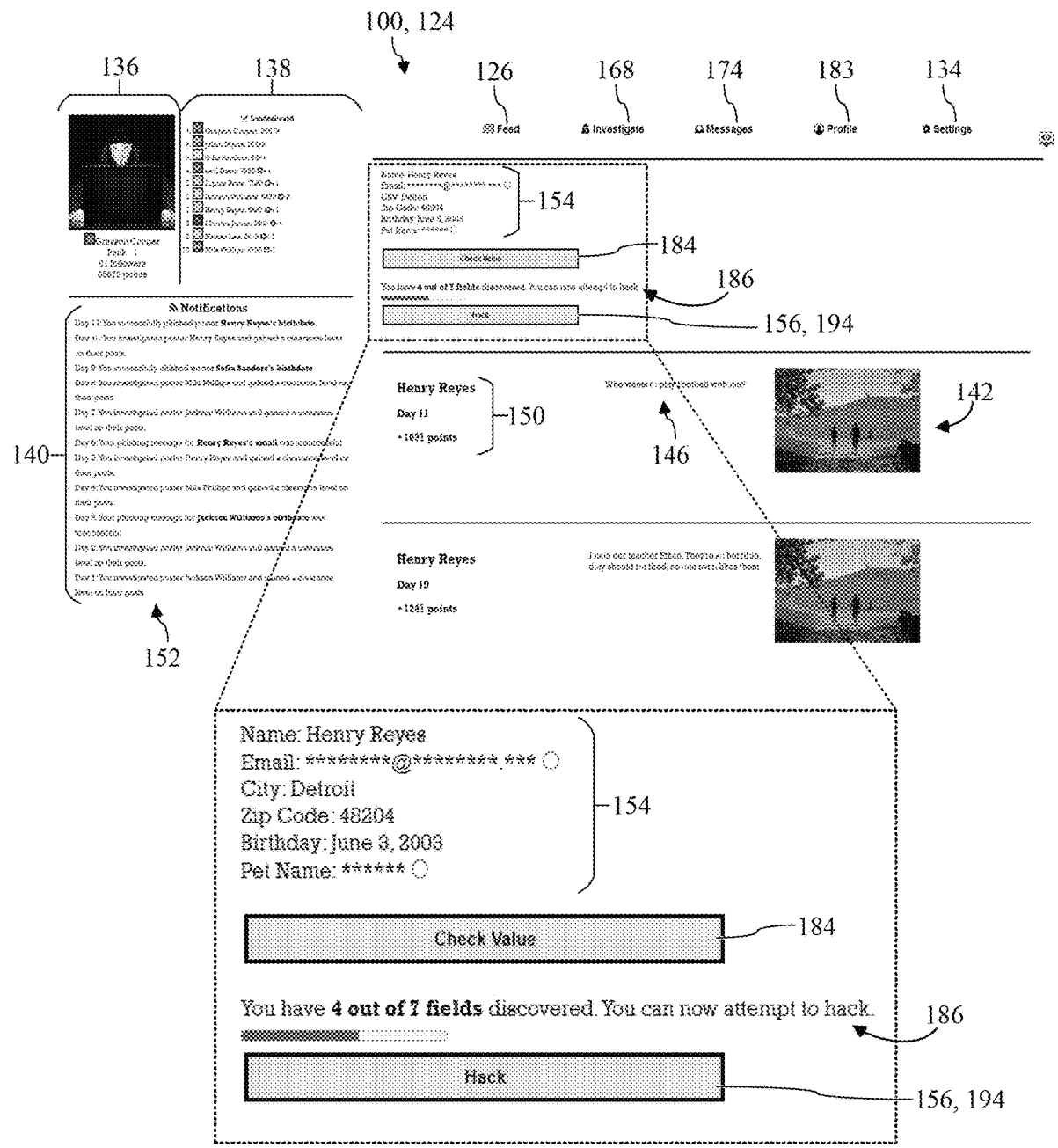

The thief may continue to interact with the simulation of program 100 by investigating different posters using investigate page 168 and/or sending messages 182 using message page 174 to obtain and/or collect additional sensitive information 154 for the posters. The thief may obtain as much information as possible in order to execute or attempt a security and privacy event 156 on a target poster. For example, and turning to FIG. 25, thief may obtain and/or collect as much information on poster Henry Reyes as possible. As discussed herein, the thief may obtain the sensitive information 154 by reviewing media posts 142 and/or content 146 disseminated by the poster and/or through phishing messages 182. Once the thief obtains enough sensitive information 154 for the poster (e.g., Henry Reyes) the thief may perform the security and privacy event 156. In the non-limiting example shown in FIG. 25, the simulation may allow the thief to perform security and privacy event 156 after the thief has obtained four (4) pieces or fields worth of sensitive information 154 for the poster. Once accomplished, the profile for the poster may include a interactive button to attempt/achieve the security and privacy event 156. As shown in FIG. 25, the security and privacy event 156 may include an account hack on Henry Reyes. To attempt this event, the thief must engage or click on hack button 194.

Figure 26:
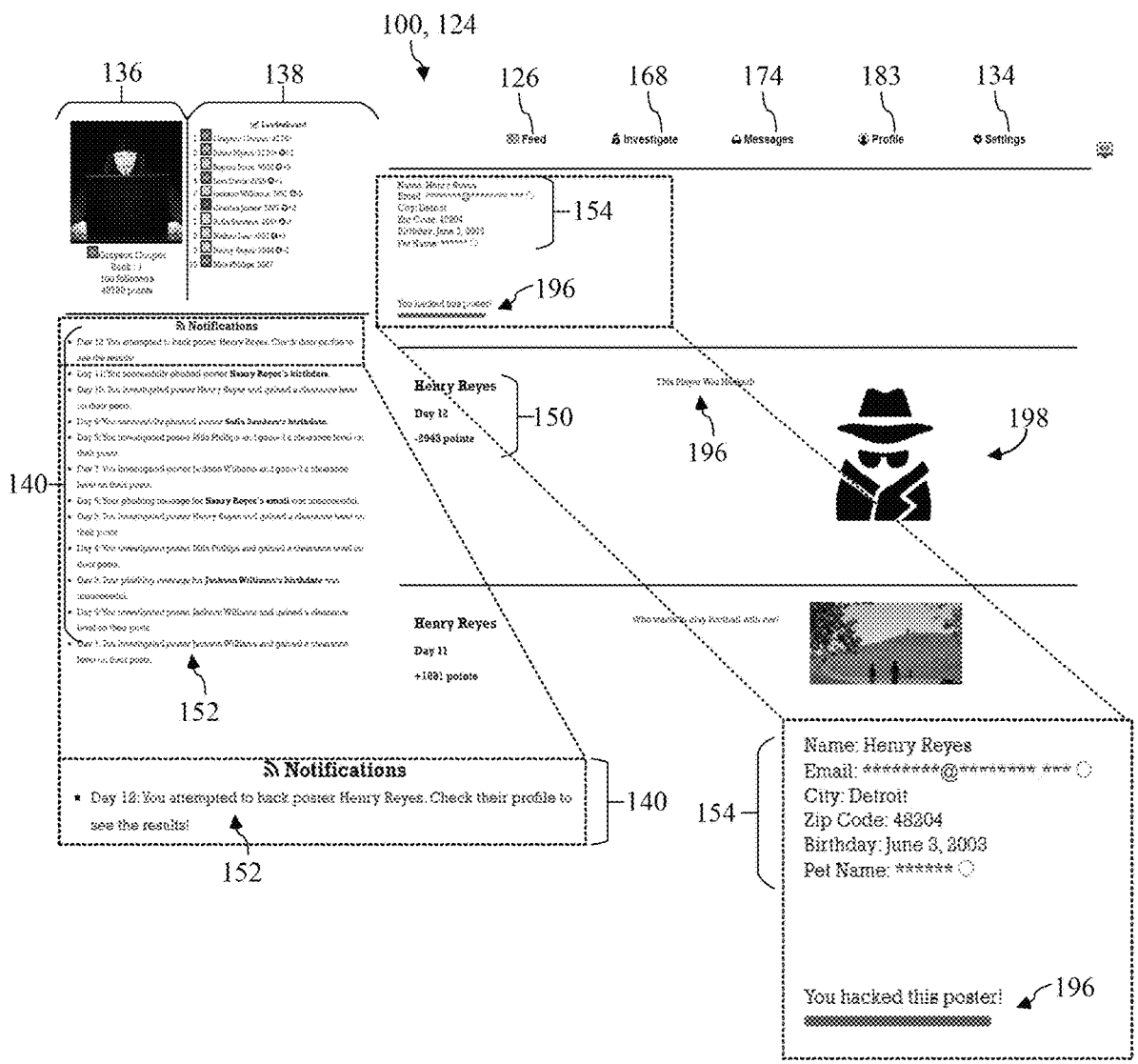

Once the thief attempts the account hack and/or clicks hack button 194, notification area 140 may include text notification 152 that provides the status of the security and privacy event 156 (e.g., account hack). As shown in FIG. 26, text notification 152 to the thief may indicate that the thief attempted to hack the poster (Henry Reyes), and to check the poster's profile to see the results. The thief may then check the poster's profile to see the status. In the non-limiting example shown in FIG. 26, an event or hack indicator 196 may be added to the poster's profile. Specifically, hack indicator 196 may be added to the poster's profile below sensitive information 154. In this example, the security and privacy event 156/account hack was successful against Henry Reyes. Additionally as shown in the poster's profile hack indicator 196 may be provided in a hack post 198 that is specific and/or indicative of a successful security and privacy event 156/hack against the poster.

Similar to the poster, the thief may interact with the simulation of program 100 until all turns (e.g., days) are taken. At the end of the simulation, the thief may be provided with statistics 166 (see, FIG. 13) relating to, for example, the thief's interaction with the simulation, as well as statistics for the whole simulation including data for both the poster and computer generated/artificial intelligence-based statistics. Using statistics 166, the user/thief may learn how to avoid security and privacy events 156 from occurring in the simulation, and/or may better understand scenarios and/or occurrences that result in potential exposure of sensitive information 154 and/or risk of negative events (e.g., security and privacy events 156) while interacting with the simulation and/or posting on social media.

Additional information relating to the hacker's/thief's interaction may be found in "A Novel Approach to Social Media Privacy Education Through Simulated Role Reversal," Ghazinour et al., 11$^{th}$ International Conference on Emerging Ubiquitous Systems and Pervasive Networks (EUSPN 2020), Nov. 2-5, 2020 (Anticipated)—the reference which is hereby incorporated herein by reference in its entirety, with an emphasis on sections 4 and 5.

Figure 27:
FIG. 27 shows an illustrative view of a new game screen of the simulation of online security and privacy issues of FIG. 1 as engaged by a user-poster, according to embodiments of the disclosure.

FIG. 27 shows a non-limiting example of a visual of program 100 after a user clicks or engages new game button 106 on home screen 102 (see, FIG. 1). As shown, the engaging user of program 100 may be provided with a new game screen 168. New game screen 200 may provide adjustable game parameters 202 for the simulation of program 100. In the non-limiting example, adjustable game parameters 202 may include a number of human posters, a number of all posters, a number of human hackers or thieves, a number of computer-generated or artificial intelligence (AI) hackers or thieves, a number of turns or days for the simulation, and a session password. Additionally, the adjustable game parameters 202 may include the option to include/exclude certain subjects or categories for media posts 142 within the simulation.

Figure 28:
FIG. 28 shows an illustrative view of a join game screen of the simulation of online security and privacy issues of FIG. 1 as engaged by a user-poster, according to embodiments of the disclosure.

FIG. 28 shows a non-limiting example of a visual of program 100 after a user clicks or engages join game button 108 on home screen 102 (see, FIG. 1). As shown, the engaging user of program 100 may be provided with a join game screen 204. In the non-limiting example, join game screen 204 may provide the user with a session number input or dialog box 206 and a session password input or dialog box 208. Here the user may provide predetermined information in order to join a new game/game in progress. The session number to be input in session number input 206 may be defined, established, and/or assigned to a specific game after a user selects and approves adjustable game parameters 202 displayed on a new game screen 202 (see, FIG. 27). Additionally, the session password to be input in session password input 206 may be defined, established, and/or created by a user in new game screen 208 using adjustable game parameters 202 (see, FIG. 27).

Figure 29:
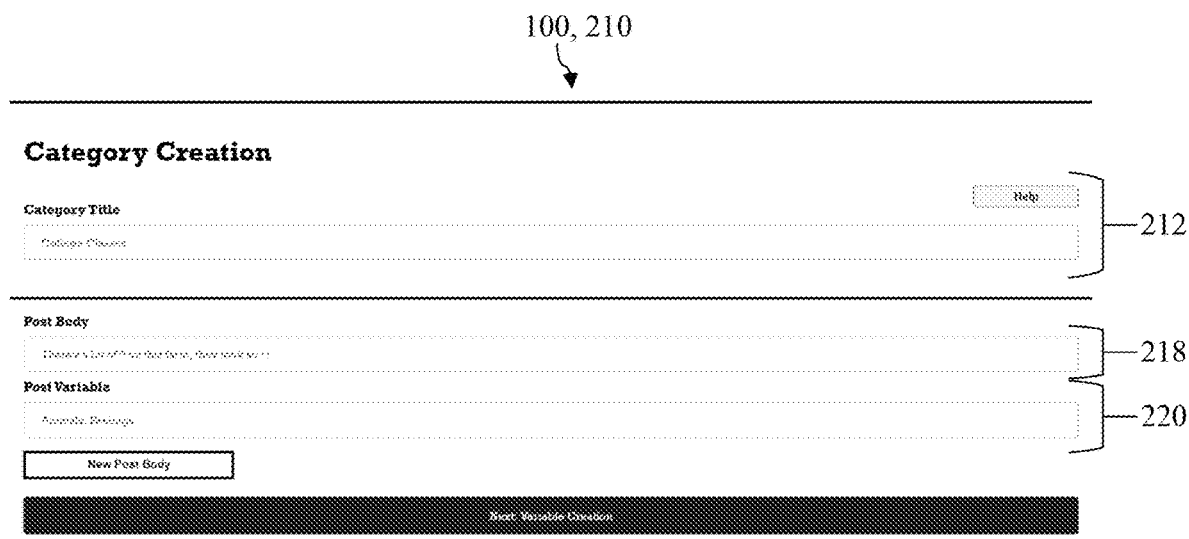
FIG. 29 shows an illustrative view of a category creation screen of the simulation of online security and privacy issues of FIG. 1 as engaged by a user-poster, according to embodiments of the disclosure.

FIG. 29 shows a non-limiting example of a visual of program 100 after a user clicks or engages category creation button 110 on home screen 102 (see, FIG. 1). As shown, the engaging user of program 100 may be provided with a category creation screen 210. Using category creation screen 210, along with various input or dialog boxes 212, 218, 220, the engaging user of the program may create custom media posts 142 having custom categories and/or subjects (e.g., subjects 144) that may be selected by posters and/or implemented in the simulation of program 100. Allowing the user/poster to create custom media posts 142 using category creation screen 210 may provide a more custom experience of the simulation that is tailored to the users/posters/thieves who may engage and/or interact with program 100.

Figure 30:
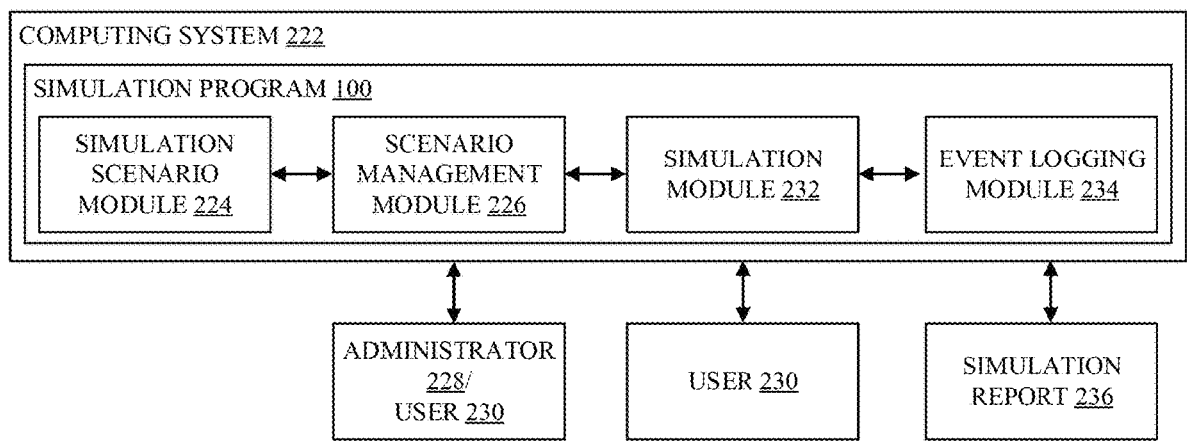
FIG. 30 shows schematic view of computing system including a simulation program and a variety of modules that simulate online security and privacy issues, according to embodiments of the disclosure.

FIG. 30 shows a schematic view of a computing system 222 that may include simulation program 100 shown and discussed herein with respect to FIGS. 1-29. In the non-limiting example simulation program 100 may include a plurality of modules, units, and/or data points that may store the code, programing, and/or machine-readable formatted data to engage and/or operation program 100. For example, program 100 stored and operated on computing system 222 may include a simulation scenario module 224 which has predetermined, information, code, and/or machine-readable formatted data outlines predetermined or set operational scenarios for the simulation (e.g., start game button 104—simulation screen 124 of FIGS. 3-13). Simulation scenario module 224 may be in communication with scenario management module 226 of program 100. Scenario management module 226 may allow an administrator 228 and/or user 230 of program 100 the ability to modify, create, alter, and/or download scenario specifics and/or adjust operational characteristics or parameters of the simulation during operation of program 100.

Once a scenario is selected (and/or modified) simulator module 232 may load the scenario and users 230 (e.g., posters/thieves) may interact and/or engage the simulation of program 100 in a similar discussed herein with respect to FIGS. 2-15. Event logging module 234 may log the simulation engaged by users 230 and may generate a simulation report 236. Simulation report 236, similar to statistics 166 shown on results screen 164 (see FIG. 13), may be viewed as a supplemental teaching tool following the simulation run by program 100 to learn from possible mistakes and choices made by users 230 during the simulation. In a non-limiting example, simulation report 236 may include the calculated danger score or each media post made by user 230 during the simulation to see how their decisions/actions in the simulation increased/decreased the danger score, and in turn the sensitive information exposure risk for user 230.

Online Security and Privacy Prevention

Figure 31:
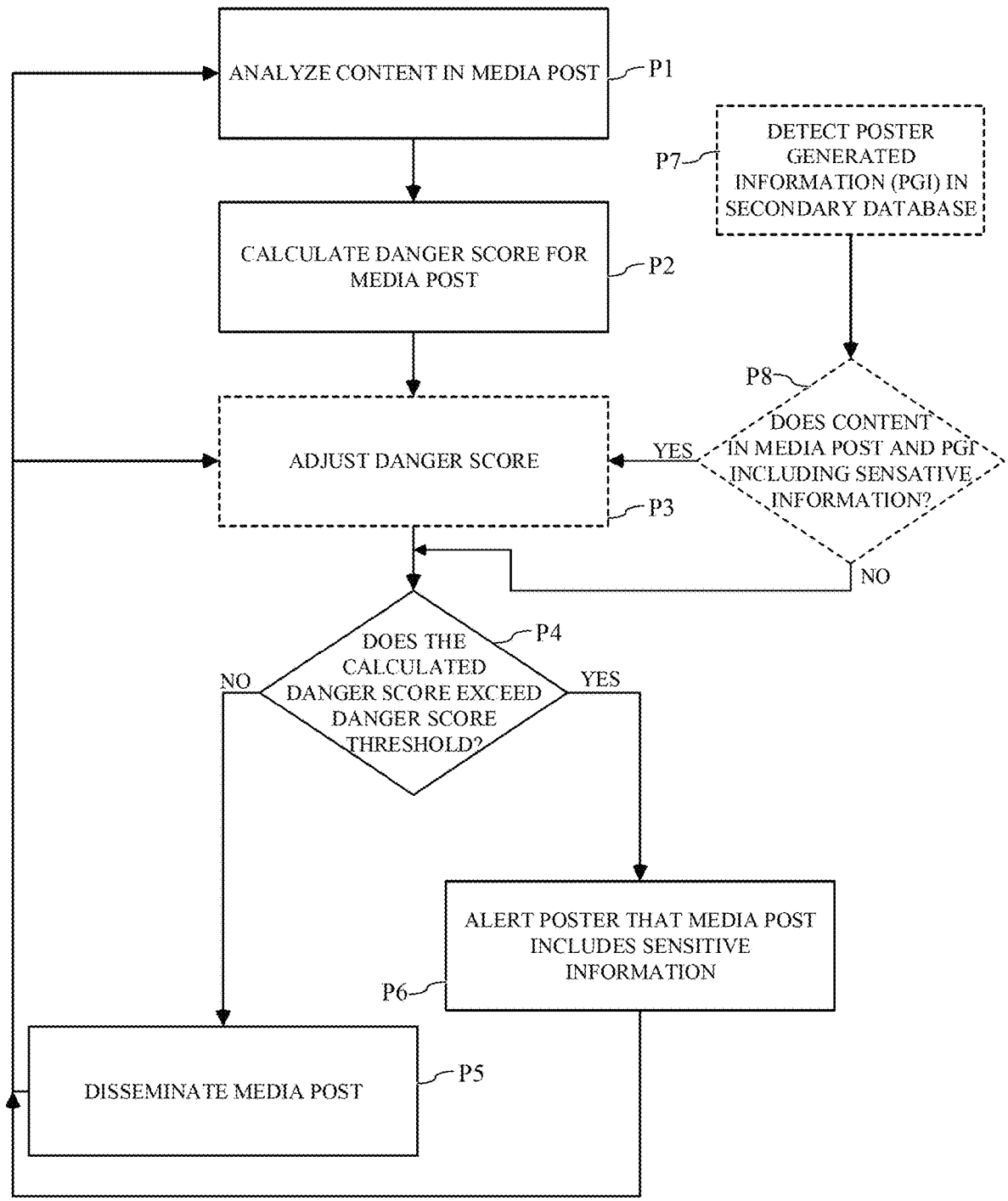
FIG. 31 shows a flowchart illustrating a process for preventing the dissemination of sensitive information via media posts, according to embodiments of the disclosure.

FIG. 31 depicts example processes for preventing the dissemination of sensitive information over the internet. More specifically, FIG. 31 depicts a non-limiting example of processes for preventing the dissemination of sensitive information included in media posts by creating alters/corrective actions. The alerts and corrective actions in these processes may be substantially similar to those shown and discussed herein with respect to FIGS. 21A-34.

In process P1, content of a media post created by a poster is analyzed. More specifically, the content included in the media post that is created by and/or associated with a poster/user of a social media app or platform is analyzed, reviewed, and/or examined. The media post may be a potential media post (e.g., a pending-post or a post queued for dissemination/publication), or a previous media post that has disseminated and/or published previously by the poster/user. Analyzing the content in the media post may include detecting sensitive information included in the content of the media post. In non-limiting examples, media post may include at least one media type including, but not limited to, user generated text, a photo, and/or a video that may be/is disseminated over the internet for viewing/interacting. Sensitive information may include user specific information, data, and/or material, which may personal and/or if collected, obtained and/or complied by harmful third-party (e.g., hacker) may be detrimental to the user/poster. The content of the media post may be analyzed and/or the sensitive information may be detected using any suitable procedure or technique that may review the media post. For example, natural language processing (NLP) and/or object detection/image processing may be used to analyze the media posts and/or detect sensitive information included in the content of the media post.

In process P2, a danger score for the media post may be calculated. More specifically, and based on the analyzed content included in the potential media post, a danger score for the media post may be calculated, generated, and/or determined. The danger score may be calculated for a potential media post or a previous media post-whichever is being analyzed in process P1. In a non-limiting example, the danger score may represent a sensitive information exposure risk, may quantify a risk or danger associated with how exposed the poster/user's sensitive information is, and/or if the user is at risk of disseminating sensitive information based on the analyzed media post. The danger score for the media post may be calculated based on, at least in part, the content included in the media post, the media type of the media post, the number of audience likes for the media post, a number of followers of the poster, a visibility of the media post, and/or a predefined subject associated with the content of the media post. The visibility of the media post may determine and/or dictate who may view and/or receive the media post created by the user/poster. Furthermore, the predefined subject or category associated with the content of the media post may be selected or identified by the user/poster, or alternatively, may be automatically assigned/specific to the media post based on the analyzed content of the media post.

In process P3, shown in phantom as optional, the danger score for the media post may be adjusted. The Danger score for the post may be adjusted, corrected, and/or altered after the calculating in process P2 under predetermined circumstances. For example, the danger score may be adjusted for a potential or pending media post in response to analyzing/processing previous media post(s) created by the user/poster. In the example, the danger score for the potential media post may be adjusted based on, at least in part, the content included in previous media post(s), the media type of previous media post(s), the number of audience likes for previous media post(s), a number of followers of the poster, a visibility of previous media post(s), and/or a predefined subject associated with the content of previous media post(s). In another non-limiting example, and as discussed herein, additional processes (e.g., processes P7 and P8) may result in the danger score being adjusted.

In process P4, it is determined if the calculated (or adjusted) danger score exceeds a danger score threshold. More specifically, the calculated/adjusted danger score for the media post is compared to a predetermined/predefined danger score threshold to determine if the calculated/adjusted danger score is greater than or exceeds the danger score threshold. The predetermined/predefined danger score threshold may be specific to the user/poster and/or may be specific to the app or platform in which the poster is disseminating media posts. In non-limiting examples, the danger score threshold may be fixed, or alternatively, may be variable, and may be dependent on, at least in part, an averaged number of audience likes for media posts created by the poster, a number of followers of the poster, average visibility characteristics for media posts created by the poster, and/or the predefined subject associated with the content of the media posts.

In response to determining the danger score for the analyzed media post does not exceed the danger score threshold (e.g., "NO" at process P4), the media post may be disseminated in process P5. That is, where it is determined that the content of the media post does not include detected sensitive information and/or there is no or low risk of disseminating sensitive information (e.g., calculated/adjusted danger score is <danger score threshold), the media post created by the poster may be automatically disseminated via the internet/the utilized app or social media platform. Where the analyzed media post is a pending or potential media post, the media post may be automatically disseminated with the intended visibly as determined/selected by the poster. Alternatively where the analyzed media post is a previously disseminated media post, the app or platform may keep the post as published, to the intended viewer group (e.g., visibility), without notifying and/or alerting the poster.

In response to determining the danger score for the analyzed media post does exceed the danger score threshold (e.g., "YES" at process P4), the poster may be provided an altered in process P6. More specifically, where the calculated/adjusted danger score exceeds the danger score threshold, the poster may be altered that the analyzed media post includes sensitive information. The alert may be a visual alert or warning that notifies the poster that the media post, either potential or previously disseminated, may include sensitive information. Alternatively, the visual alert may provide the poster the ability to cancel the media post completely, edit the media post (e.g., remove sensitive information), or disseminate the post knowing it may contain sensitive information. Alerting the poster may also include visually identifying to the poster the detected sensitive information included in the content of the media post. In this non-limiting example, the potentially sensitive information may be highlighted, emphasized, and/or marked in the media post so the poster may easily identify and review the sensitive information. Additionally, or alternatively, alerting the poster in process P6 may also include modifying the media post to remove the detected sensitive information from the content of the media post. That is, the visual alert provided to the poster may also include a recommend post that may be a modified version of the poster generated media post. The recommended/modified version of the media post may have the detected sensitive information removed and/or blocked from sight.

In process P7, shown in phantom as optional, poster generated information (PGI) may be detected in a secondary database. That is, preventing the dissemination of sensitive information may include detecting information (e.g., PGI) in secondary databases, apps, platforms, message boards, and the like. The poster generated information (PGI) may correspond to information, media posts, and/or data shared by or relating to the poster, knowingly or not. For example, the secondary database may include a reddit message board in which the user/poster is a regular contributor.

In process P8, shown in phantom as optional, it is determined if the content in the analyzed media post (e.g., process P1) and the PGI include sensitive information. That is, it is determined if the combination of the content included in the media post and the content in the detected PGI would collectively including sensitive information. For example, the content of the media post on its own may not include sensitive information (e.g., posting you were born on a specific day without identifying the year) that is detected/identified when analyzed (e.g., process P1). Furthermore, PGI found on a message board about people born in a specific alone may not rise to the level of being considered sensitive information. However, the analysis of the content of the media post (e.g., poster's birthday and poster's birth month), along with or combined with the PGI from the message board for people born in a specific year (e.g., poster's birth year) may collectively include sensitive information. In response to determining the combination of the content of the media post and the PGI does include sensitive information (e.g., "YES" at process P8), the calculated danger score for the media post may be adjusted at process P3. Alternatively, if the combination of the content of the media post and the PGI does not include sensitive information (e.g., "NO" at process P8), the calculated danger score may be compared to the danger score threshold in process P4.

Figure 32A:
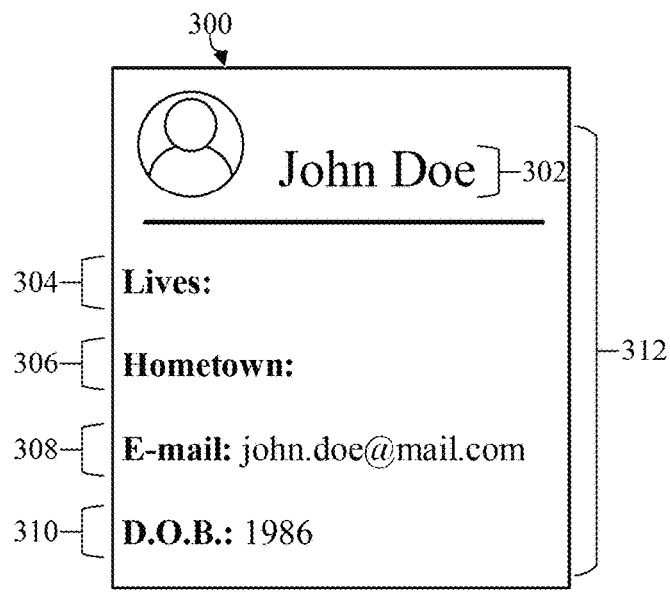
FIG. 32A shows an illustrative view of a user-media poster's profile including sensitive information, according to embodiments of the disclosure.

FIGS. 32A-45 show various views of non-limiting examples of poster information, media posts, and/or alerts that undergo processes P1-P8 discussed herein with respect to FIG. 31 to prevent the dissemination of sensitive information via media posts. Turning to FIG. 32A, a non-limiting example of a poster's profile 300 is shown. Profile 300 may be associated with the social media app or platform in which the poster is creates and disseminates media posts to be viewed and/or interacted with. Profile 300 may include a plurality of data or information that may be input and/or provided by the poster at their discretion. In the non-limiting example, profile 300 may include the ability for a poster to input their name 302, their residence 304, their hometown 306, their e-mail address 308, and date of birth (D.O.B.) 310. Profile 300 may also include additional data (not shown) specific to the poster including, but not limited to, job title, place of work, hometown, astrological signs, education data, pets name, and/or the like. As shown in FIG. 32A, poster "John Doe" has opted to leave some of the data input portions of profile 300 blank (e.g., residence 304, hometown 306) or partially filled in (D.O.B. 310 only including year). The poster may opt to leave some of the personal data out of profile 300 to limit risk against cyber-attacks and/or reduce exposure to sensitive information. For the non-limiting examples discussed herein with respect to FIGS. 32A-45, the information or data 302-310 included in poster's profile 300 may include or be considered sensitive information 312 that is specific to the poster.

Figure 32B:
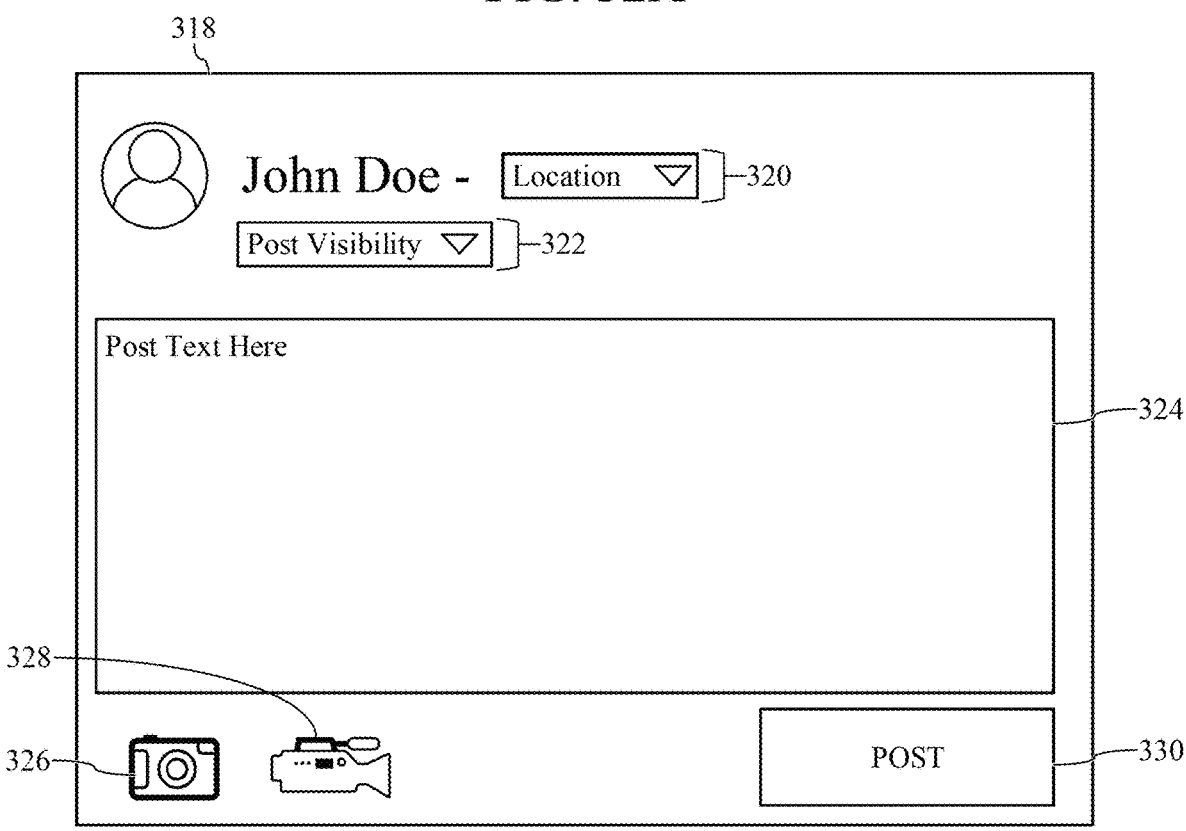
FIG. 32B shows an illustrative view of a media posting post window for the user-media poster, according to embodiments of the disclosure.

FIG. 32B shows a post window 318 associated with the creation or generation of a media post made within the social media app or platform that may disseminate a media post to be viewed and/or interacted with by an audience. That is, post window 318 may be provided to and/or may be used by a poster to generate and create a media post to disseminated for viewing. The created media post may be attributed or associated with the poster by including the poster's name 302 within the media post. Post window 318 may provide the poster with various options and input areas to modify the information or data included in the created media post. For example, post window 318 used to create a media post may include the ability to incorporate or include a location 320 associated with the media post. Included location 320 may be labeled as a landmark (e.g., Statue of Liberty), a geolocation (e.g., New York, NY), and/or any other descriptor relating to a location associated with the media post. Additionally, post window 318 used to create a media post may also include options for post visibility 322 relating to the media post. Post visibility 322 may allow the poster to determine and/or dictate who (e.g., audience) may view and/or receive the media post created using post window 318, once disseminated. Post window 318 may also include a post content box 324. In the non-limiting example, post content box 324 may be formed as media or text box that may allow the poster to add custom text (e.g., personal message) to be included in the media post. Additionally in the non-limiting example shown in FIG. 32B, post window 318 may also provide the poster the ability to include distinct media-types and/or upload a photo 326 and/or a video 328 to be included in post content box 324, along with the text message. Once the media post has been created by the poster using post window 318, the poster may engage and/or interact (e.g., "click") a post button 330 that may disseminate the media post and/or begin the processes discussed herein to analyze the media post to prevent the dissemination of sensitive material 312 included therein.

Figure 33:
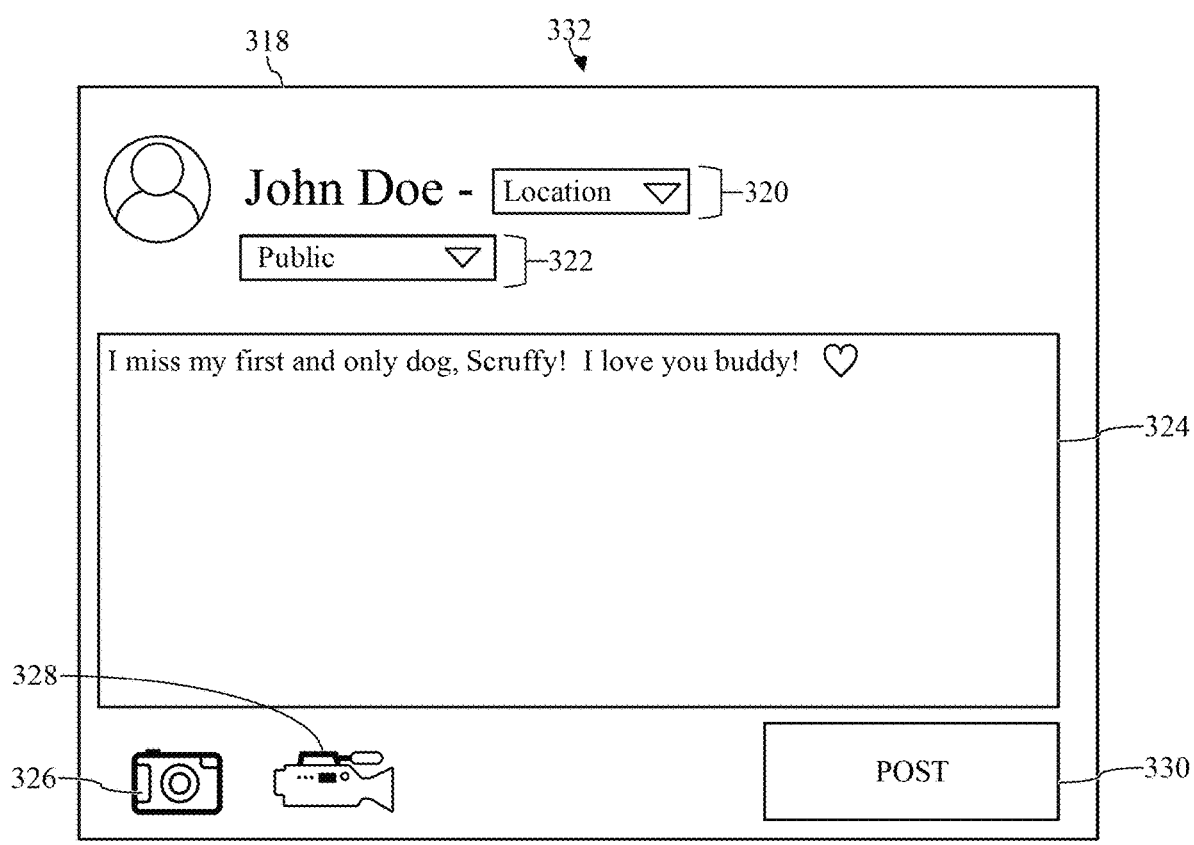
FIG. 33 shows an illustrative view of a pending media post created, but not yet disseminated, by the user-media poster, according to embodiments of the disclosure.

Turning to FIG. 33, another non-limiting example of post window 318 is shown. As shown in FIG. 33, a poster may have provided input and/or altered different portions of post window 318 to create a draft or potential media post 332 for subsequent dissemination. For example, the poster may select or set post visibility 332 of the created media post to "public"-which is the least restrictive/most visible group that may be able to view/interact with potential media post 332 once disseminated. Additionally, poster may add a custom message or text to potential media post 332 using post content box 324 (e.g., "In miss my first and only dog, Scruffy! I love you buddy!"). Once the poster has completed potential media post 332 and/or has changed all desired portions of potential media post 332 using post window 318, the poster may engage post button 330, which in turn may begin the process for preventing the dissemination of sensitive information 312 via potential media post 332 created by the poster.

Figure 34:
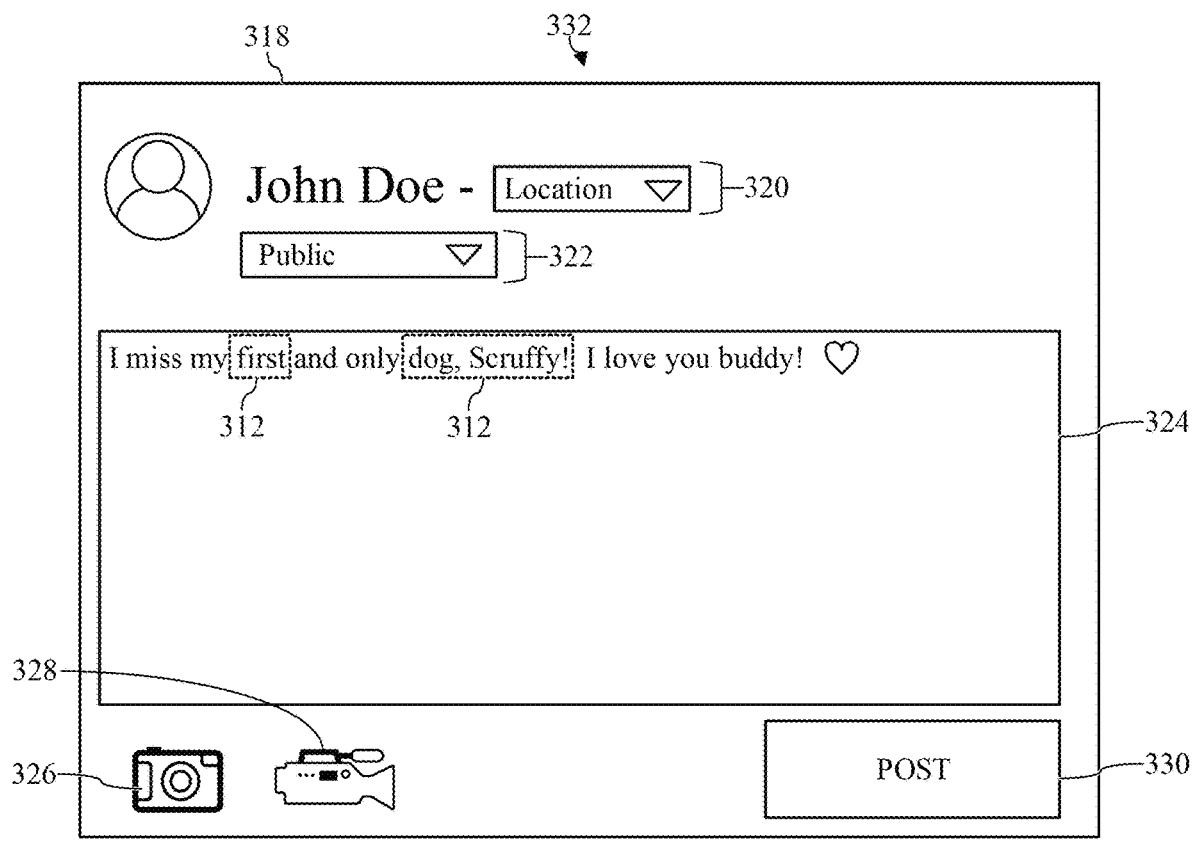
FIG. 34 shows an illustrative view of the pending media post of FIG. 33 with identified sensitive information included in the content of the pending media post, according to embodiments of the disclosure.

FIG. 34 shows post window 318 including potential media post 332 created by the poster after undergoing an analysis process. More specifically, subsequent to the post engaging post button 330, potential media post 332, and more specifically the content of potential media post 332, may be analyzed to detect sensitive information 312 that may be included in the content of potential media post 332. In the non-limiting example, the content of potential media post 332 to be analyzed may include the custom message included in post content box 324. The content of potential media post 332 may be analyzed and/or sensitive information 312 may be detected using any suitable procedure or technique that may review the media post. For example, natural language processing (NLP) may be used to analyze the content (e.g., text included in post content box 324) included in potential media post 332 and detect sensitive information 312 included therein. Using NLP, the analysis of potential media post 332 may identify or detect that the content of potential media post 332 does in fact include sensitive information 312. Specifically, sensitive information 312 relating to the poster's pet (e.g., pet's name) may be detected and/or identified in post content box 324 of potential media post 332. Although not necessarily included in the poster's profile 300 (see, FIG. 32A), the poster's pet name may be considered sensitive information 312 as a result of common security questions asked when accessing different accounts and/or apps (e.g., "What was your first pets name?").

Analyzed potential media post 332 may or may not be visible to the poster. That is, the analyzed potential media post 332 shown in FIG. 34 may not be visible to the poster. Rather, FIG. 34 may be an illustrative image representing actions taken by a computing system and/or program code that is configured to analyze potential media post 332 and aid in the prevention of sensitive information 312 dissemination via media posts, as discussed herein. Alternatively, post window 318 and the depicted analysis of potential media post 332 may be visible or displayed to the poster in real-time. More specifically, post window 318 shown in FIG. 34 may be visible to the poster during the analysis, such that the poster may watch the analysis process and/or detection of sensitive information 312 included in potential media post 332 in real-time.

Once analyzed, and sensitive information 312 is identified/detected, a danger score for potential media post 332 may be calculated. More specifically, a danger score for potential media post 332 may be calculated, generated, and/or produced based on the analyzed content included in potential media post 332. The calculated danger score may represent a sensitive information exposure risk, may quantify a risk or danger associated with how exposed the poster's sensitive information 312 is, and/or if the poster is at risk of disseminating sensitive information 312 based on the analyzed potential media post 332. The danger score for potential media post 332 may be calculated based on, at least in part, the content (e.g., post content box 324) included in potential media post 332, the media type (e.g., text, photo, video) of potential media post 332, the number of audience likes for media posts associated with the poster, a number of followers of the poster, a visibility (e.g., public) of potential media post 332, and/or a predefined subject associated with the content of potential media post 332. The predefined subject or category associated with the content (e.g., post content box 324) of potential media post 332 may be automatically assigned to an "animal" and/or "pets" category based on potential media post 332 reciting " . . . my . . . dog, scruffy . . . " In the non-limiting example, calculated danger score for potential media post 332 shown in FIG. 34 may be "high" as a result of the presence of sensitive information 312 in the content of potential media post 332, the public visibility of potential medial post 332, and the assigned subject associated with potential medial post 332 is a common subject (e.g., "animals" or "pets") that includes high visibility and/or viewing-traffic.

Once the danger score for potential media post 332 is calculated, it may be determined if the calculated danger score exceeds a danger score threshold. Where the danger score for potential media post 332 does not exceed the danger score threshold, potential media post 332 may be posted, published, and/or publicly disseminated for the target audience (e.g., public) to openly view and/or interact within. However, if the danger score for potential media post 332 does exceed the danger score threshold, then an alert may be provided to the poster, as discussed herein. The danger score threshold may be specific to the poster and/or may be specific to the app or platform in which the poster is attempting to disseminating potential media post 332. In non-limiting examples, the danger score threshold may be fixed, or alternatively, may be variable, and may be dependent on, at least in part, an averaged number of audience likes for media posts created by the poster, a number of followers of the poster, average visibility characteristics for media posts created by the poster, and/or the predefined subject associated with the content of the media posts. In the non-limiting example, the calculated danger score for potential media post 332 exceeds the danger score threshold.

Figure 35:
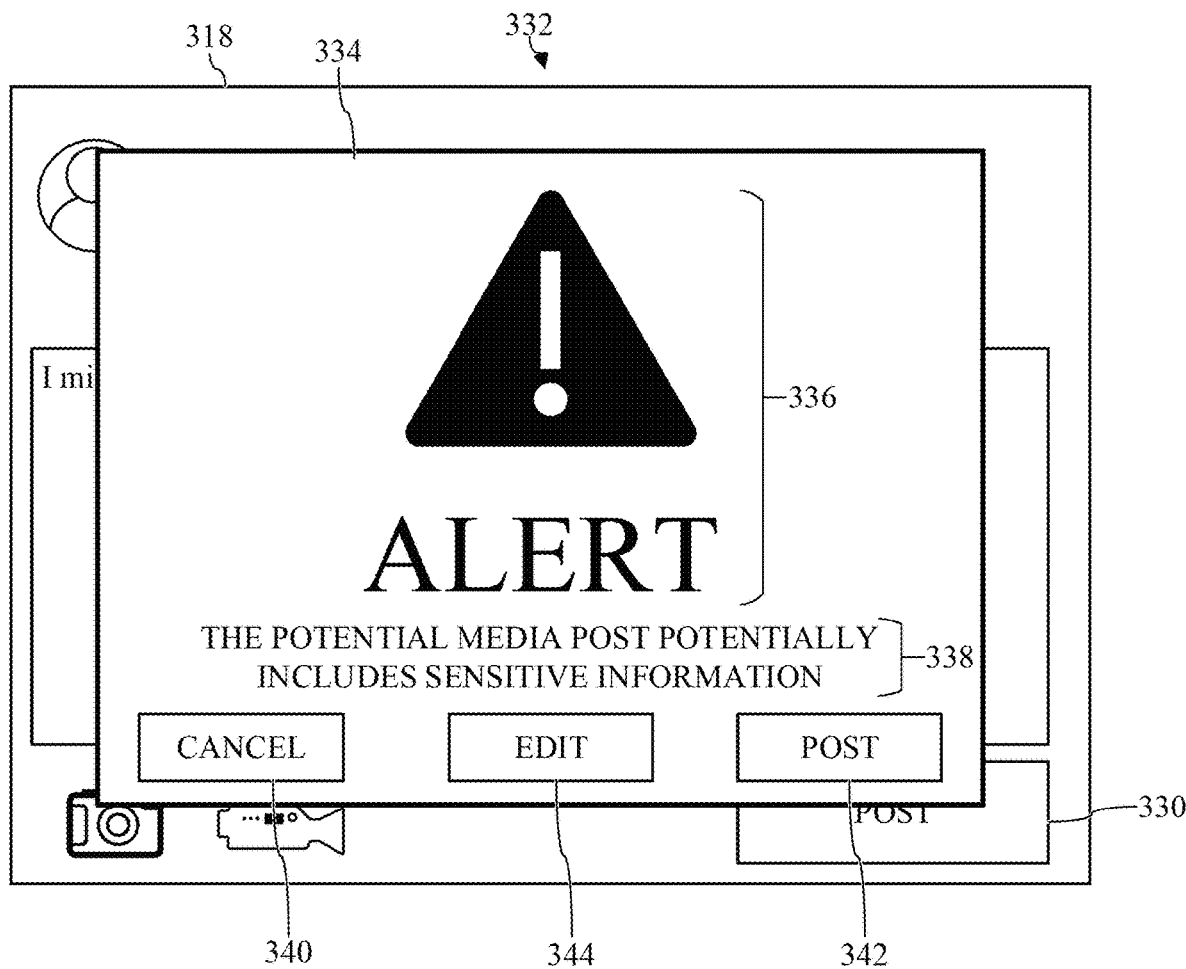
FIG. 35 shows an illustrative view of an alert for the pending media post of FIG. 33 indicating that the pending post potentially includes sensitive information, according to embodiments of the disclosure.

Turning to FIG. 35, an illustrative view of an alert window 334 is shown. More specifically, and in response to determining that the calculated danger score for potential media post 332 exceeds the danger score threshold, alert window 334 is provided to the poster. In the non-limiting example, alert window 334 may be displayed and/or provided over post window 318 including potential media post 332. In other non-limiting examples, alert window 334 may be provided within and/or may replace post window and/or the information/data previously included in potential media post 332—similar to the transitions between webpages in a web browser. As shown FIG. 35, alert window 334 may provide a variety of visual cues to the poster to indicate and/or warn that the potential media post 332 may include sensitive information 312. For example, alert window 334 may include large graphic(s) and/or warning language 336 to immediately notify the poster that the there may be a potential issue or concern relating to potential post 332. Additionally in the non-limiting example, alert window 334 may also provide additional text and/or information relating to the warning. For example, alert window 334 may include details or clarification text 338, which may provide the poster with additional information as to why they may be receiving and/or viewing alert window 334. Based on the analysis of potential media post 332, clarification text 338 may indicate to the poster that potential media post 332 may include sensitive information 312.

In the non-limiting example shown in FIG. 35, alert window 334 may also provide the poster with various options on how to proceed with and/or process potential media post 332 including sensitive information 312. For example, alert window 334 may provide a cancel button 340, a post button 342, and an edit button 344—each engageable/interactive to the poster to process potential media post 332 in different ways. Cancel button 340 may allow the poster to complete cancel, delete, and/or remove potential media post 332. Post button 342 may allow the poster to bypass and/or ignore the alert provided in alert window 334, and opt to disseminate and/or publish potential media post 332 with the identified sensitive information 312.

Edit button 344 may remove alert window 334 and bring the poster back to post window 318 to further edit, alter, and/or change the content of potential media post 332 (e.g., post content box 324). When the poster engages edit button 342, the poster may be brought back to potential media post 332 without visual identification of the sensitive information 312 that triggered alert window 334 (e.g., FIG. 33). That is, in one example, the poster may simply be brought back to post window 318 including potential media post 332, and may have to review the content of potential media post 332 to determine what may have triggered the alert (e.g., self-identify sensitive information 312 in potential media post 332).

Figure 36:
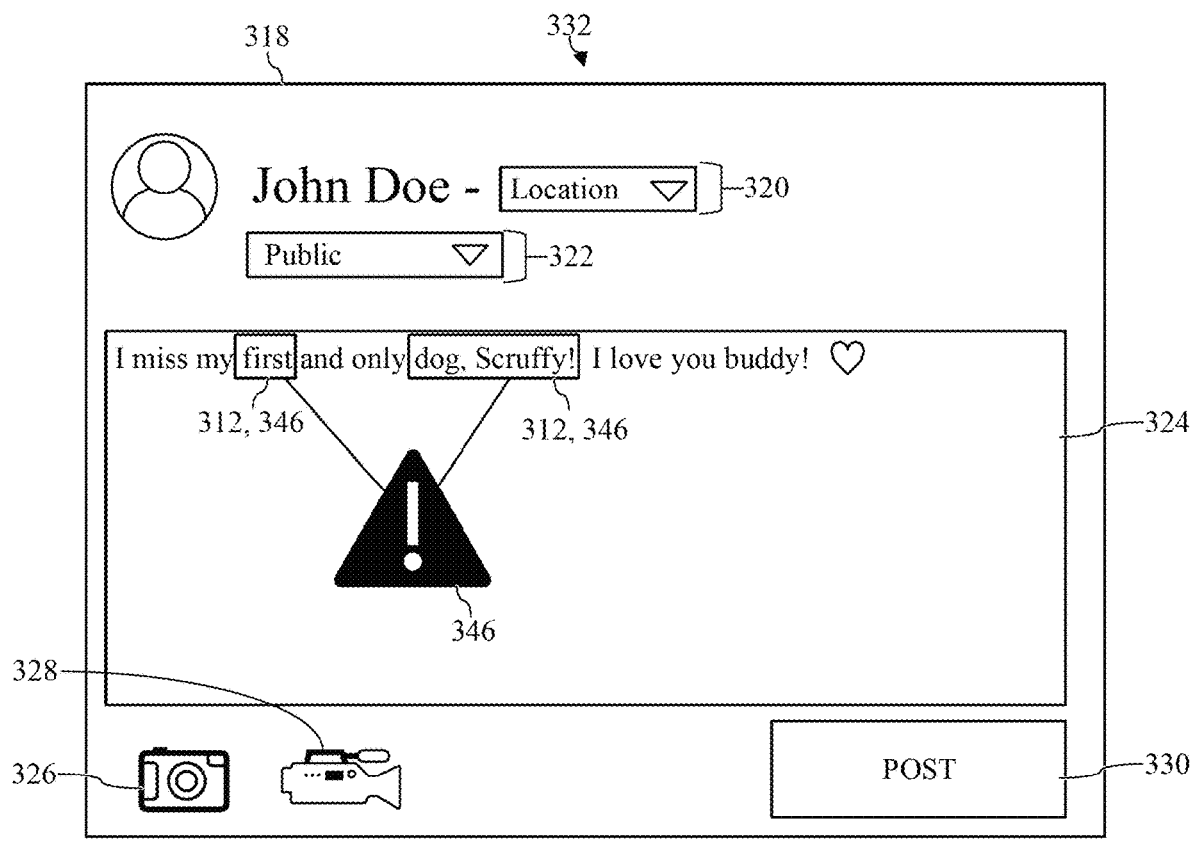
FIG. 36 shows an illustrative view of the pending media post of FIG. 33 with identified sensitive information included in the content of the pending media post, according to additional embodiments of the disclosure.

In another non-limiting example shown in FIG. 36, when the poster engages edit button 344, the poster may be brought back to potential media post 332, but post window 318 may include visual identification, indicators, cues, and/or markers 346 (hereafter, "visual indicators 346") of the sensitive information 312 that triggered alert window 334 (e.g., FIG. 33). That is, when the poster clicks edit button 344, potential media post 332 included in post window 318 may include visual indicators 346 that highlight, emphasize, and/or mark the content include in potential media post 332, and more specifically post content box 324, that may include sensitive information 312. In the non-limiting example shown in FIG. 36, visual indicators 346 for detected sensitive information 312 may include boxes that enclose the sensitive information 312, as well as a warning symbol linked or connected to each box. In other non-limiting examples, visual indicators 346 may include highlighting (e.g., colorizing), and/or adjusting font characteristics (e.g., bolding, underlining, increasing size, altering color, and the like) for text that may include sensitive information 312. The use of visual indicators 346 with potential media post 332 may allow the poster to more easily identify, correct, edit, and/or remove sensitive information 312 from potential media post 332, which in turn may prevent the dissemination of sensitive information 312 via media post 332.

In the non-limiting example, the poster may edit potential media post 332, and more specifically the content (e.g., post content box 324) of potential media post 332, to remove the identified sensitive information 312, and engage post button 330 again. Edited potential media post 332 may undergo similar processes as those discussed herein with respect to FIGS. 33-35 (e.g., analyze, calculate danger score, etc.) to determine if some/all sensitive information 312 has been removed, and/or if the calculated danger score of edited potential media post 332 exceeds the danger score threshold. In response to determining sensitive information 312 has been removed and/or the calculated danger score of edited potential media post 332 does not exceed the danger score threshold, the edited potential media post 332 may be disseminated and/or published to the desired audience (e.g., public) as designated by the poster (see, FIG. 37B). Alternatively, if sensitive information 312 has not been removed and/or the calculated danger score of edited potential media post 332 still exceeds the danger score threshold, another alert window 334 (see, FIG. 35) may be presented to the poster.

Figure 37A:
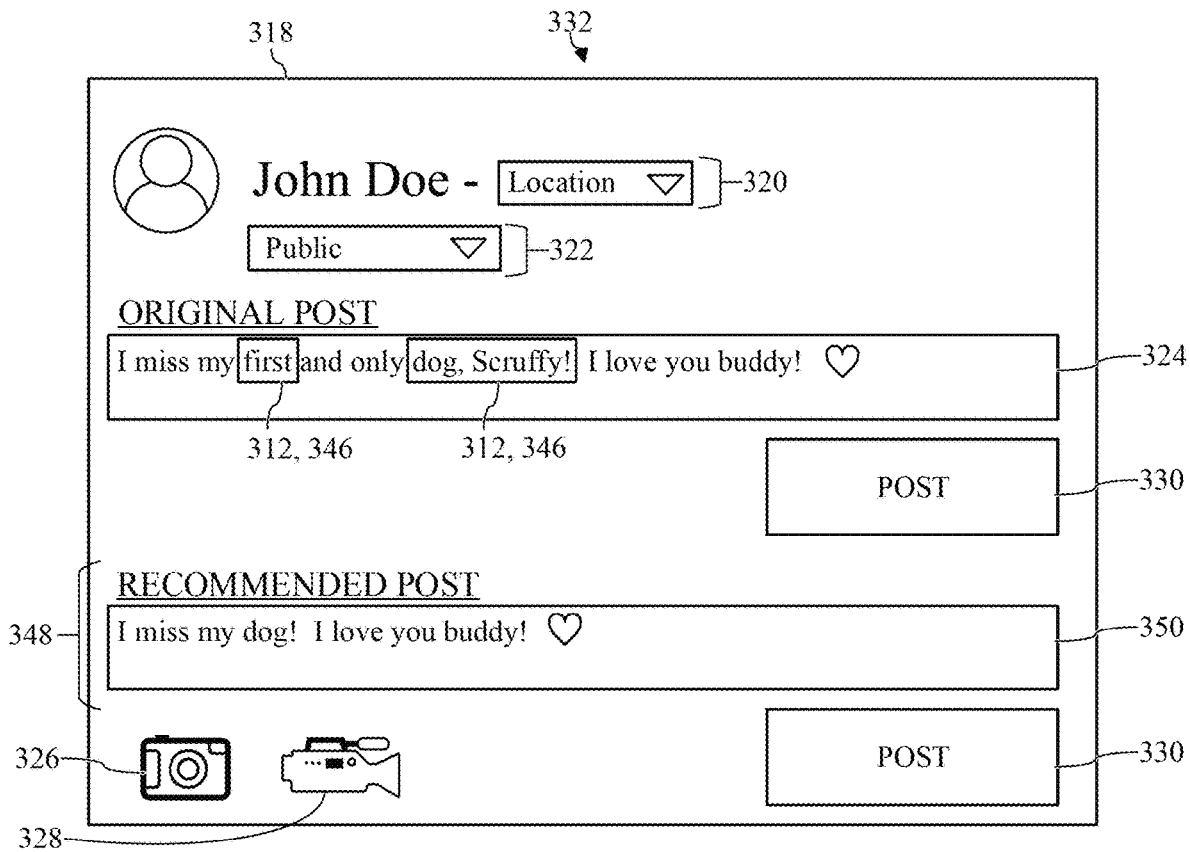
FIG. 37A shows an illustrative view of the pending media post of FIG. 33 with identified sensitive information included in the content of the pending media post and a recommended post with the sensitive information removed, according to embodiments of the disclosure.
Figure 37B:
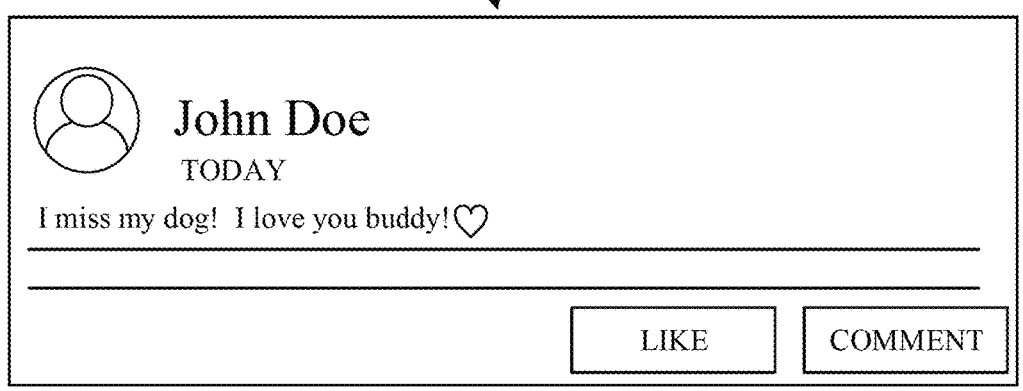
FIG. 37B shows an illustrative view of a disseminated media post after all identified and detected sensitive information has been removed, according to embodiments of the disclosure.

As shown in FIG. 37A, and similar to FIG. 36, post window 318 may include visual indicators 346 of the sensitive information 312 that triggered alert window 334 (e.g., FIG. 33) after the poster engages edit button 344 in alert window 334. In doing so, the poster may review the sensitive information 312 highlighted or identified by visual indicators 346 and opt to disseminate or publish potential media post 332 with the identified sensitive information 312 (e.g., engage post button 330). Additionally as shown in the non-limiting example of FIG. 37A, post window 318 may also include suggested or recommended post content 348 for potential media post 332. That is, and based on the identified sensitive information 312 included in the content of potential media post 332, recommended post content 348 for potential media post 332 may be (computer-generated and) provided to the poster in post window 318. Recommended post content 348 may be an edited version of the content (e.g., post content box 324) included and/or provided in potential media post 332 by the poster. In the non-limiting example, recommended post content 348 may include an edited post content box 350, which shows edited/recommended text for potential media post 322 that completely removes sensitive information 312 therein. Similar to post content box 324, the content included in edited post content box 350 may be edited and/or altered by the poster. If the poster likes recommended post content 348 for potential media post 332, the poster may engage the post button 330 associated with recommended post content 348, which in turn may disseminate and/or publish media post 352 which includes the content included in edited post content box 350 (see, FIG. 37B). Publishing media post 352 with recommend post content 348 may prevent the dissemination of sensitive material 312 for the poster, and in turn reduce the risk or expose to cyber-attacks for the poster.

In another non-limiting example (not shown), recommended post content 348 may also suggest that the poster adjust or change post visibility 322. For example, if the poster does not wish to post the content included in edited post content box 350 of recommended post content 348, but opts to post the content in content post box 324 another alert and/or recommended post content 348 may be updated to notify or suggest the user adjust post visibility 322 to be more restrictive. Continuing the example shown in FIG. 37B, recommended post content 348 may recommend or suggest the poster adjust post visibility 322 from "public" to "friends only," which is a more restrictive/least visible (and seemingly trustworthy) audience group. In this example, although potential media post 332 may still include sensitive information 312, changing post visibility 322 may adjust (e.g., lower) the calculated danger score for the edited potential media post 332, such that the adjusted, calculated danger score no longer exceeds the danger score threshold, and the poster may be free to post edited potential media post 332 with triggering or receiving alter window 334.

FIGS. 38-41 show another non-limiting example for preventing the dissemination of sensitive information 312 via a media post. It is understood that similarly numbered and/or named components may function in a substantially similar fashion. Redundant explanation of these components has been omitted for clarity.

Figure 38:
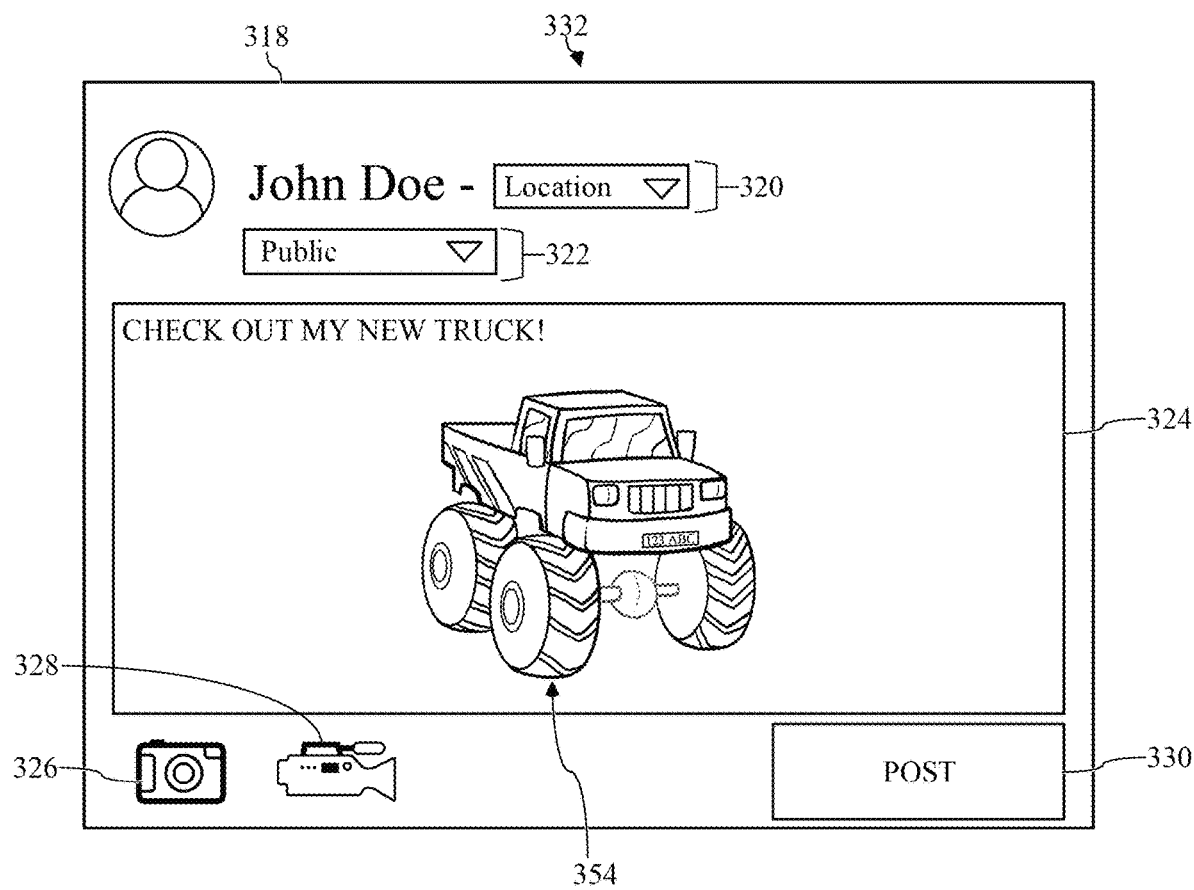
FIG. 38 shows an illustrative view of a pending media post created, but not yet disseminated, by the user-media poster, according to further embodiments of the disclosure.
Figure 39:
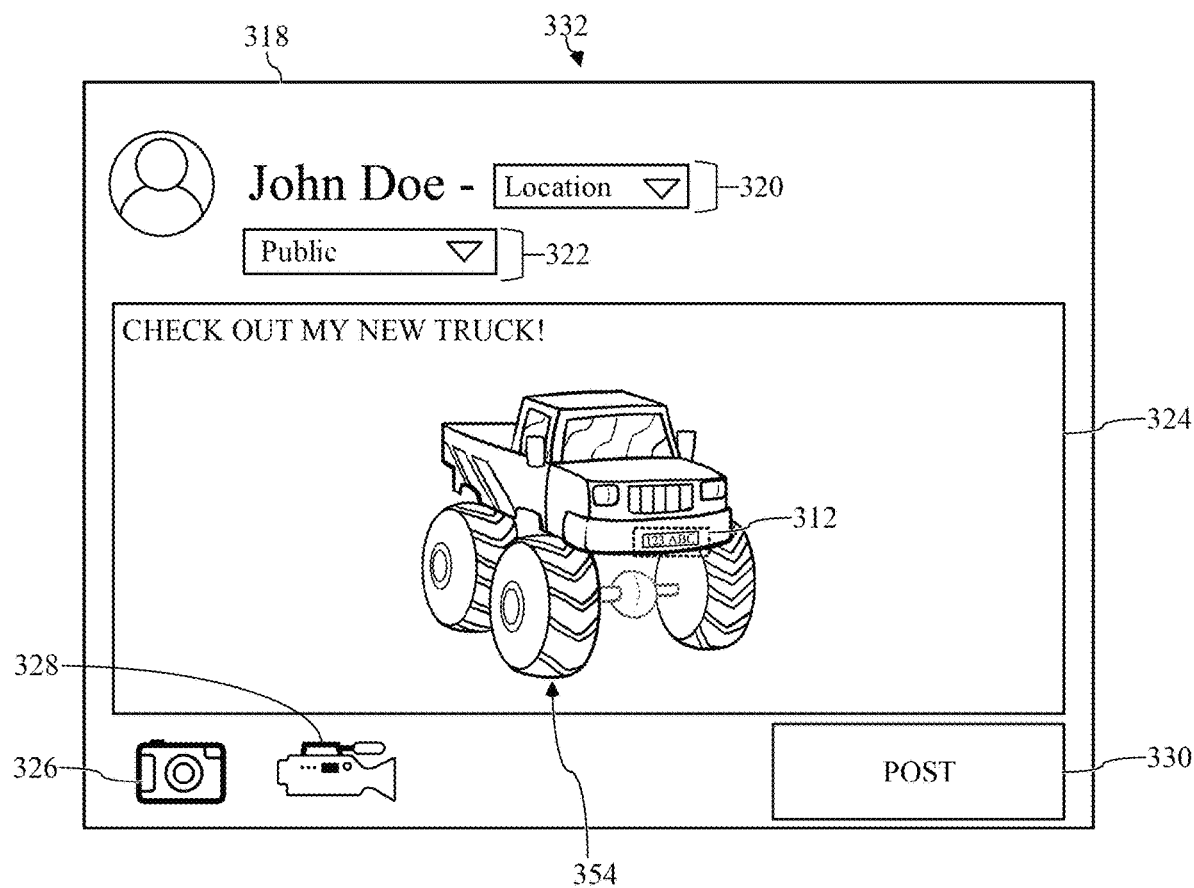
FIG. 39 shows an illustrative view of the pending media post of FIG. 38 with identified sensitive information included in the content of the pending media post, according to embodiments of the disclosure.
Figure 40:
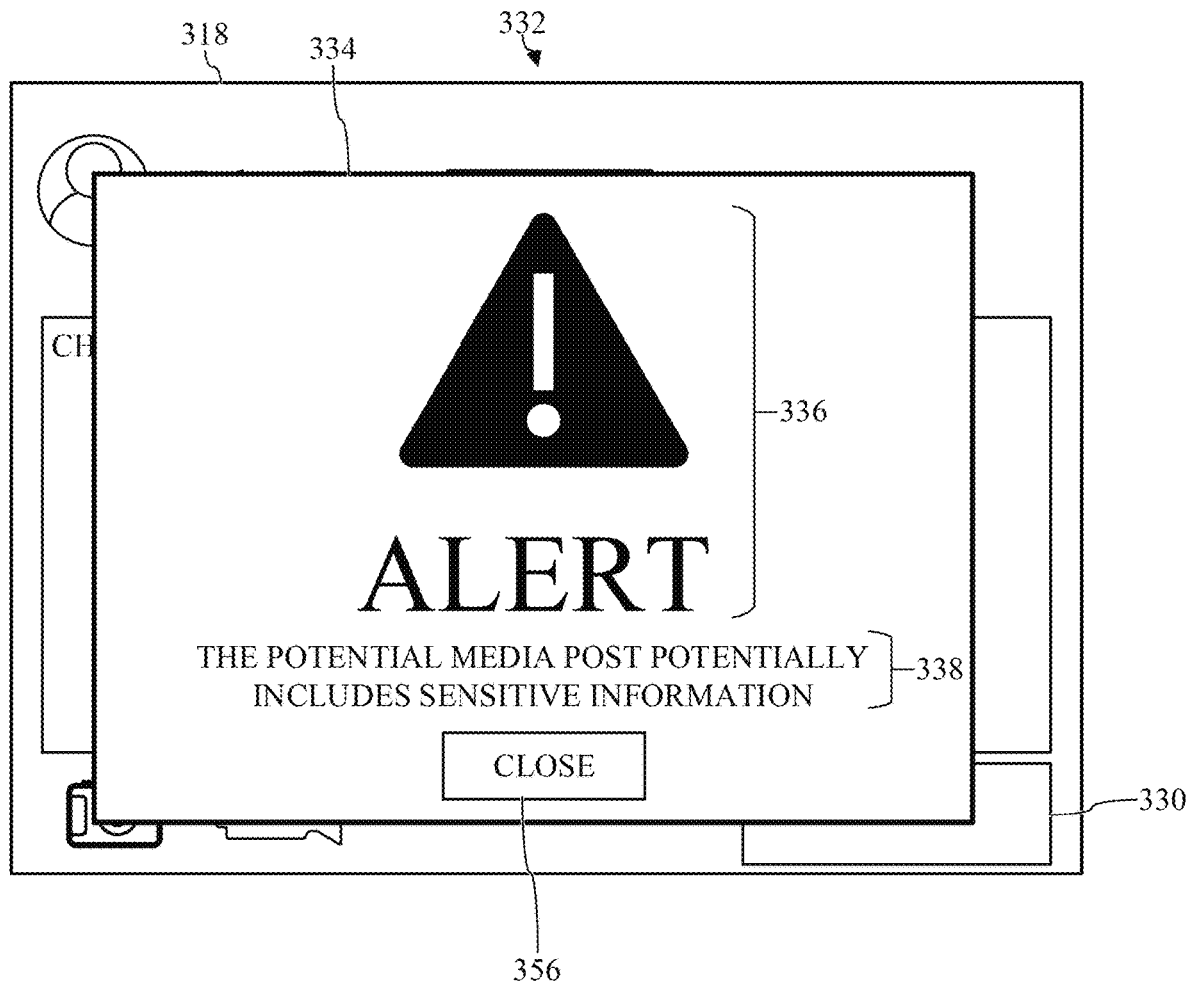
FIG. 40 shows an illustrative view of an alert for the pending media post of FIG. 38 indicating that the pending post potentially includes sensitive information, according to embodiments of the disclosure.

As shown in FIG. 38, potential media post 332 depicted in post window 318 may include both poster text, as well as an image 354 included in post content box 324. Based on the content, and more specifically the text and image 354 included in post content box 324, potential media post be automatically assigned to "truck" and/or "automobile" category (e.g., " . . . . MY NEW TRUCK!", image of truck).

In response to engaging post button 330, potential media post 332 may undergo a similar analysis process discussed and shown herein with respect to FIGS. 33-37B. That is, and with reference to FIG. 39, potential media post 332 shown in post window 318 may undergo an analysis process to identify and/or detect sensitive information 312. More specifically, the content of potential media post 332 (e.g., text and image 354), may be analyzed to detect sensitive information 312 that may be included in the content of potential media post 332. As similarly discussed herein, the text of potential media post 332 may be analyzed using natural language processing (NLP). Additionally, image 354 may be analyzed and/or sensitive information 312 included or displayed in image 354 may be detected using any suitable procedure or technique including, but not limited to, object detection/image processing. Using NLP, the analysis of potential media post 332 may not identify or detect sensitive information 312 in the text of potential media post 332 of FIG. 39. However, using object detection/image processing to analyze image 354 may result in the detection and/or identification of sensitive information 312 included in image 354. That is, it may be determined that analyzed image 354 may show, depict, and/or display the posters license plate, which may be considered sensitive information 312. As discussed herein, in addition to analyzing potential media post 332, a danger score associated with potential media post 332 including sensitive information 312 (e.g., license plate) may be calculated, and compared to a danger score threshold.

In the non-limiting example, the calculated danger score for potential media post 332 including sensitive information 312 (e.g., license plate) may exceed the danger score threshold. As a result, and a shown in FIG. 40, alert window 334 may be provided to the poster. Similar to the non-limiting example shown in FIG. 35, alert window 334 of FIG. 40 may include large graphic(s) and/or warning language 336 and details/clarification text 338. However, alert window 334 shown in FIG. 40 may only include a engageable/interactive close button 356. In the non-limiting example, when the poster engages with close button 356, poster may close alert window 334 and may be brought back to post window 318. Similar to the non-limiting examples discussed herein, once alert window 334 is closed, post window 318 may display the original, unedited potential media post 332, or alternatively may provide visual indicators 346 (see, FIG. 36) identifying and/or highlighting sensitive information 312 included in the content of potential media post 332.

Figure 41:
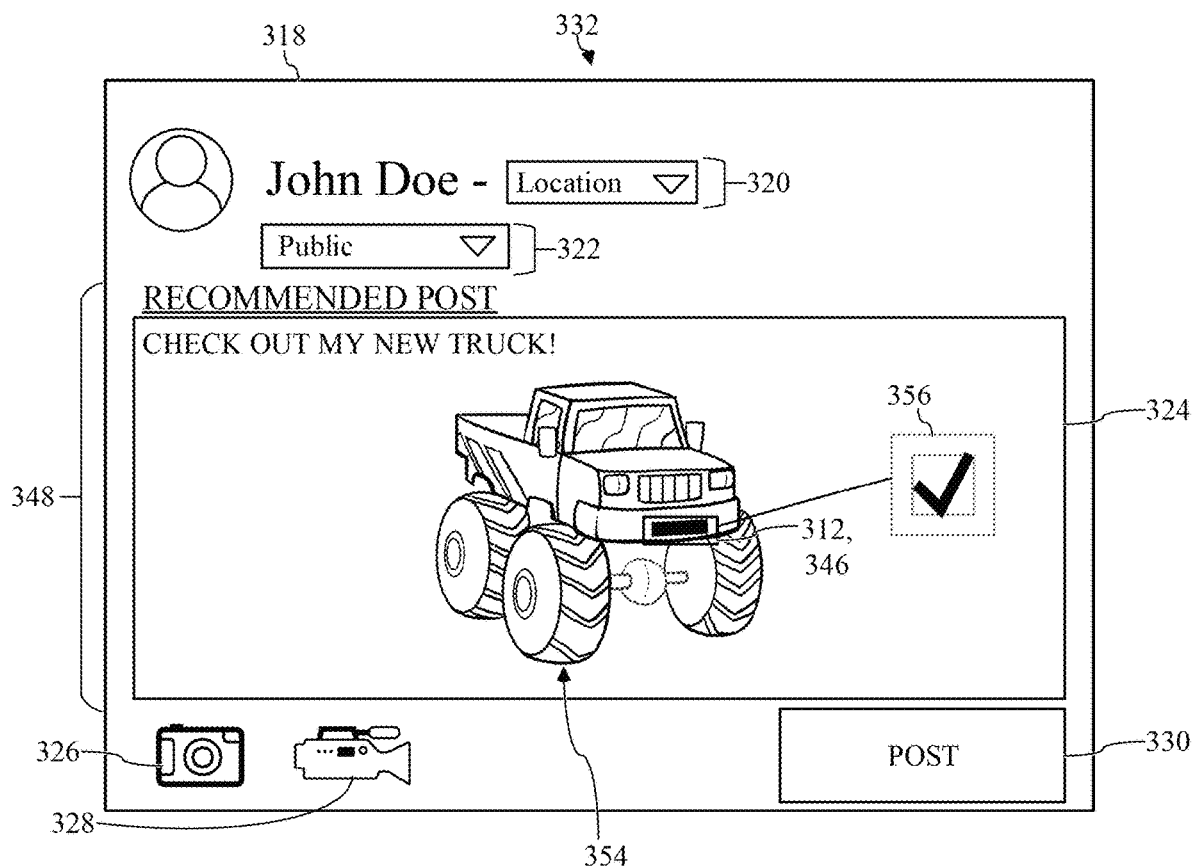
FIG. 41 shows an illustrative view of the pending media post of FIG. 38 with identified sensitive information and a recommended post with the sensitive information removed, according to embodiments of the disclosure.

In another non-limiting example shown in FIG. 41, and as similarly discussed herein with respect to FIG. 37A, post window 318 may include potential media post 332 included visual indicators 346 and recommended post content 348. As discussed herein, visual indicators 346 may highlight and/or emphasize the portions of the content of potential media post 332 that include sensitive information 312. Additionally, recommended post content 348 may include an edited version of the content (e.g., post content box 324 including text and image 354) included and/or provided in potential media post 332 by the poster. In the non-limiting example shown in FIG. 41, recommended post content 348 may include an automated/computer-generated edit of image 354 that blocks the poster's license plate, thus removing sensitive information 312. As shown in FIG. 41, recommended post content 348 may also include an edit indicator 356, which highlights, emphasized, and/or visually marks the edit made to image 354 in recommended post content 348. In blocking the poster's license plate in image 354, potential media post may then be free of sensitive information 312 and/or may have an adjusted danger score that does not exceed the danger score threshold, and therefore may not be in risk of disseminating sensitive information 312.

In another non-limiting example (not shown) where sensitive information 312 is identified and/or detected near a boarder of an image included in potential media post 332, recommended post content 348 may include an edited and/or cropped image to remove sensitive information 312. Additionally, recommended post content 348 may also include removing the text included in post content box 324, where the app or platform automatically assigns categories or subjects to media posts based on text alone. That is, by recommending that potential media post 332 remove the text, which includes the work "TRUCK," the content of potential media post 332 may not be automatically assigned a category, which may reduce visibility/searchability, and in turn adjust (e.g., lower) the calculated danger score associated with potential media post 332.

Figure 42A:
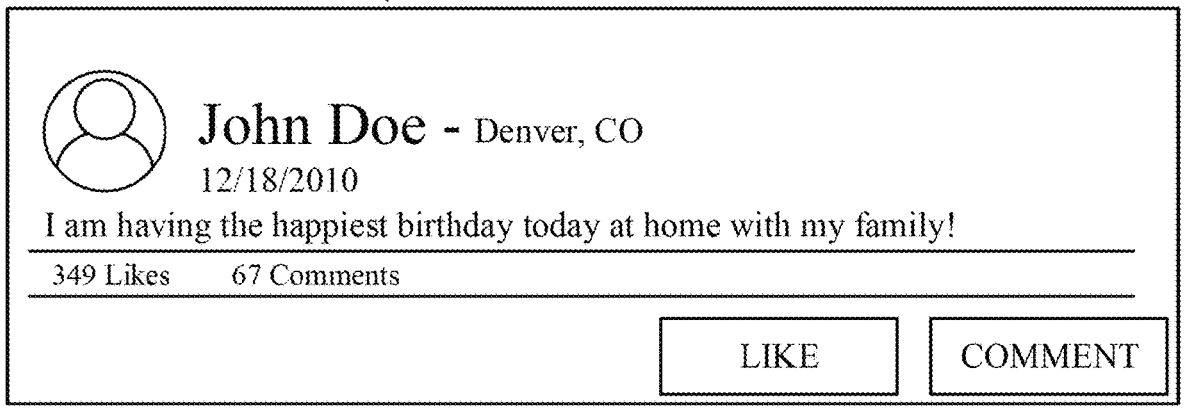
FIGS. 42A-42C show illustrative views of a created and disseminated media posts that includes content, sensitive information, and an alter for the disseminated media post, according to embodiments of the disclosure.
Figure 42B:
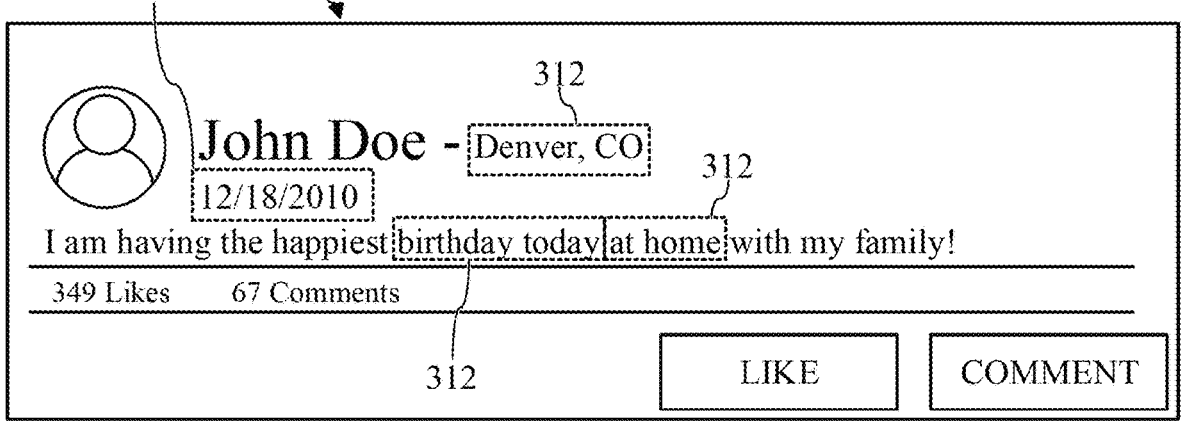

The process for analyzing of media posts and prevention the disseminating of sensitive information discussed herein may not be limited to potential or pending media posts, but the process may also be performed on previous/historic media posts currently published and disseminated. For example, and turning to FIGS. 42A-42C, the process of preventing the dissemination of sensitive information may be performed on previous media posts 358. As shown in FIG. 42A, a post made a disseminated or published previous media post 358 in 2010. An analysis of previous media post 358, as shown in FIG. 42B, may result in the identification and/or detection of multiple pieces of sensitive information 312. For example, and a shown in FIG. 42B, analyzing previous media post 358 may result in the detection of sensitive information relating to the poster's residence (e.g., Location-Denver, CO, text-" . . . at home . . . "), as well as information relating to the poster's birthday (e.g., previous media post 358 disseminated on Dec. 18, 2010, text—" . . . birthday today . . . "). Although previous media post 358 does not include the year the poster was born, poster's profile 300 (see, FIG. 32A) does include a year in which the poster was born (e.g., D.O.B. 310). As such, the date stamp and text indicating the poster's birthday month and day, in combination with the poster's profile information, may result in the identification and/or detect of sensitive information 312 relating to the poster's date of birth.

Figure 42C:
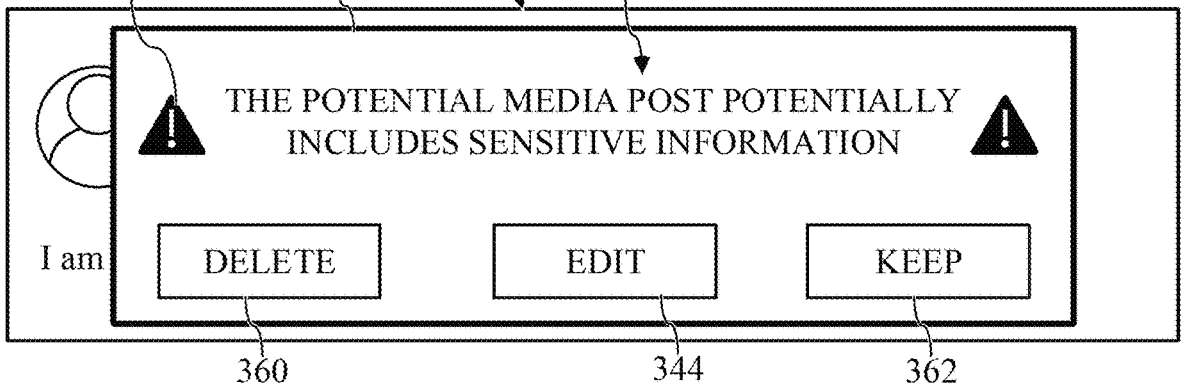

In this non-limiting example, the calculated danger score for previous media post 358 may exceed the danger score threshold. As a result, and as shown in FIG. 42C, alert window 334 may be provided to the poster based on previous media post 358. Alert window 334 of FIG. 42C may include large graphic(s) and/or warning language 336 and details/clarification text 338. Additionally, and as similarly discussed herein, alert window 334 may include edit button 344, which may allow the poster to edit previous media post 358 to remove/edit sensitive information 312 included therein. Alert window 334 of FIG. 42C may also include a delete button 360 and a keep button 362. Delete button 360 may provide the poster the opportunity to delete previous media post 358 to prevent further viewing and/or dissemination of the post. Alternatively, keep button 362 may allow the poster to ignore the warning, and keep or maintain the dissemination of previous media post 358.

The process of analyzing previous media posts 358 may occur upon a poster's request, where all previous media posts 358 may be analyzed to prevent the dissemination of sensitive information. Alternatively, previous media posts 358 may be continuously and/or automatically analyzed to previous the dissemination of sensitive information included therein. The continuous/automatic analysis of previous media posts 358 may take place or occur as a result of changes and/or adjustments to the danger scores associated with media posts (e.g., based on the number of likes for media posts, changes to the number of followers of the poster who may see old post) and/or changes or adjustments the danger score threshold.

Figure 43A:
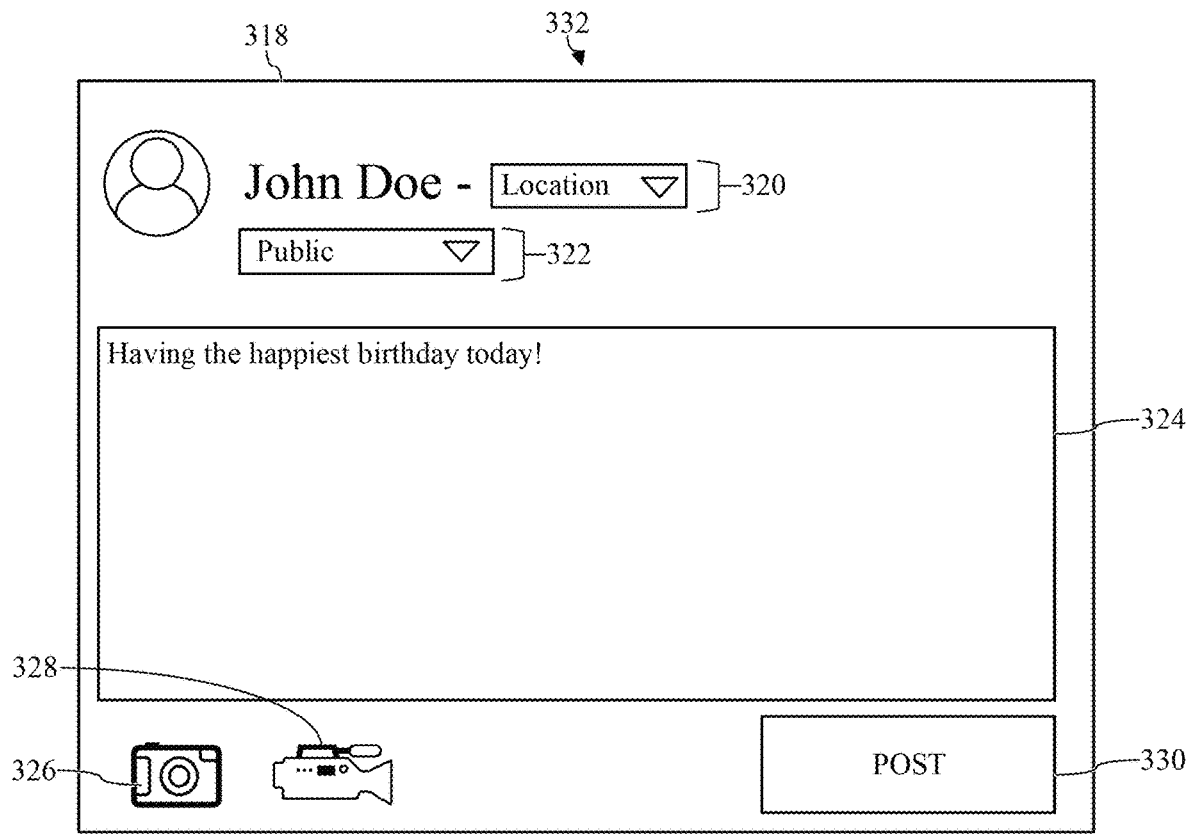
FIGS. 43A and 43B show illustrative views of a pending media post and poster-generated information in a second database that combined includes sensitive information, according to embodiments.

FIGS. 43A-45 show another non-limiting example of preventing the dissemination of sensitive information 312 via media posts. In the non-limiting example discussed herein, not only is the content of potential/previous media posts 332/358 analyzed, but poster generated information (PGI) included in a secondary database may also be analyzed to determine if the combination of media post 332/358 and PGI includes sensitive information. FIG. 43A includes potential media post 332 including similar portions as those discussed herein. Post content box 324 may include text that recites "Having the happiest birthday today!". Assuming the poster's profile does not include any information or data input in D.O.B. 310 (e.g., no provided year), analysis alone of post content box 324 in potential media post 332 may not identify sensitive information. That is, even if the poster disseminated potential media post 332 on the day of the poster's birthday, the year in which the poster was born is not available and/or disseminated, and therefore the content of potential media post 332 alone may not include sensitive information 312 and/or may not include a calculated danger score that exceeds the danger score threshold.

Figure 43B:
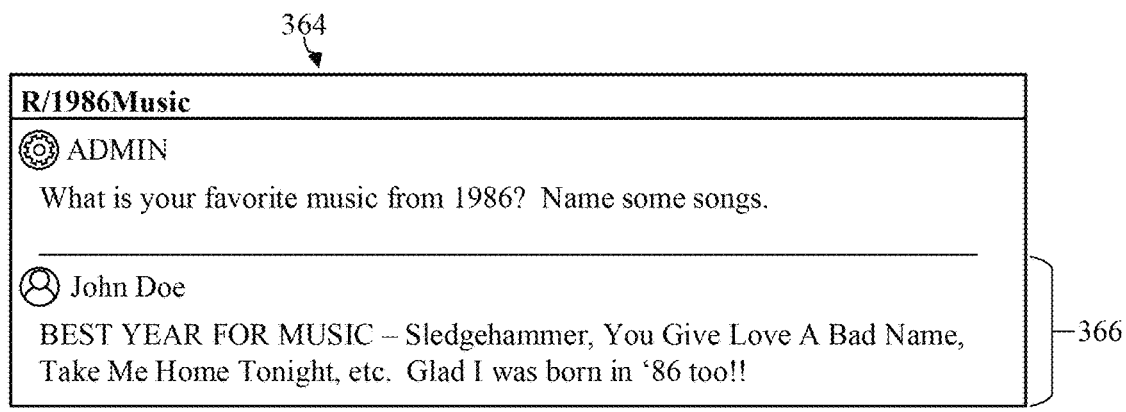

However, in addition to analyzing media posts 332(/358), secondary databases associated with the poster may be analyzed to detect sensitive information 312. For example, and as shown in FIG. 43B, a secondary database 364 may be analyzed. In the non-limiting example, secondary database 364 may include a message board and/or interactive forum (e.g., Reddit®) in which the poster is active in and/or provides poster generated information (PGI) 366. Secondary database 364 may be any website, app/platform, or other data repository that is capable of including and/or storing data. Additionally, PGI 366 may be any information or data that is associated with the poster, that either the poster has generated themselves, or alternatively is automatically generated and provided to secondary database 364 without the knowledge of the poster. In the non-limiting example shown in FIG. 43B, secondary database 364 may include a sub-reddit topic relating to music from 1986 (e.g., r/1986music), for which the poster is a regular poster in and/or provides regular PGI 366.

Figure 44A:
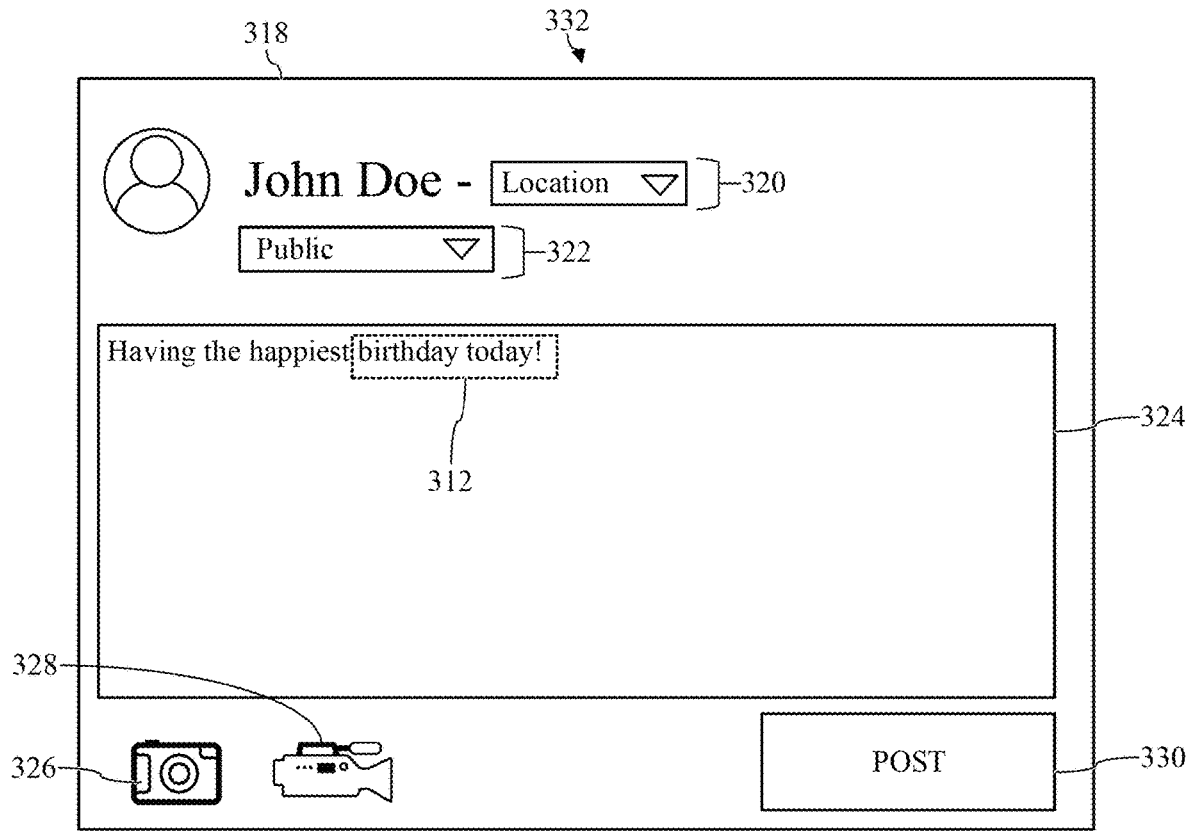
FIGS. 44A and 44B show illustrative views of the pending media post and poster-generated information of FIGS. 43A and 43B including identified sensitive information, according to embodiments.
Figure 44B:
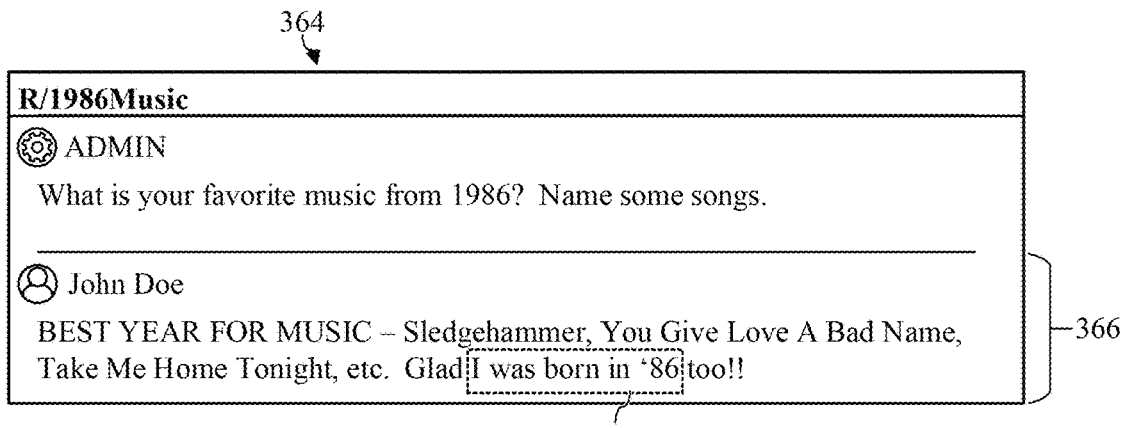
Figure 45:
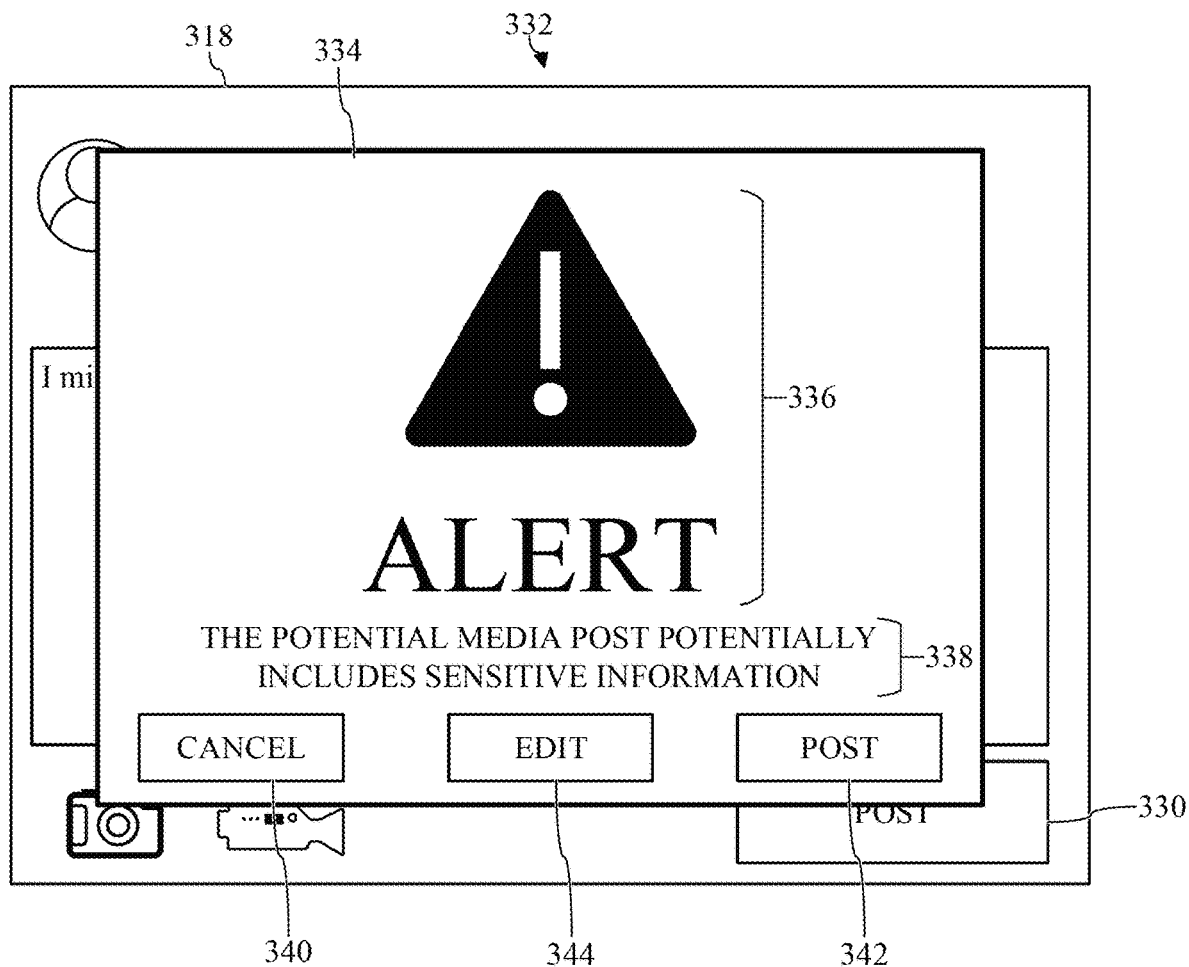
FIG. 45 shows an illustrative view of an alert for the pending media post of FIG. 32A indicating that the pending post potentially includes sensitive information, according to embodiments of the disclosure.

Turning to FIGS. 44A and 44B, each of potential media post 332 and secondary database 364 may be analyzed to identify and/or detect sensitive information 312. Each of potential media post 332 and secondary database 364 may be analyzed individually to detect sensitive information 312, and then may be subsequently analyzed together or in combination to detect or identify sensitive information 312. As discussed herein, content of potential media post 322 including in post content box 324, analyzed on its own, may not include and/or identify any sensitive information 312. Similarly, PGI 366 in secondary database 364, analyzed on its own, may also not include and/or identify any sensitive information 312. However, when analyzed in combination, the analysis of both post content box 324 and PGI 366 may result in the identification and/or detection of sensitive information 312. That is, based on the text (e.g., " . . . birthday today . . . ") of potential media post 322 and the anticipated time-stamp associated with the potential media post 322, along with the text of PGI 366 (e.g., " . . . . I was born in '86 . . . "), potential media post 322 may include sensitive information 312, and/or may include a calculated danger score for potential media post 322. In this non-limiting example, the combination, collection, and/or compilation of analyzed information may result in the identification and/or detection of sensitive information 312 relating to the poster's D.O.B. 310. In view of this, the poster of potential media post 332 may be presented with alert window 334, as shown FIG. 45, and similarly discussed herein, to prevent the dissemination of sensitive information 312 via media posts 332/358.

Figure 46:
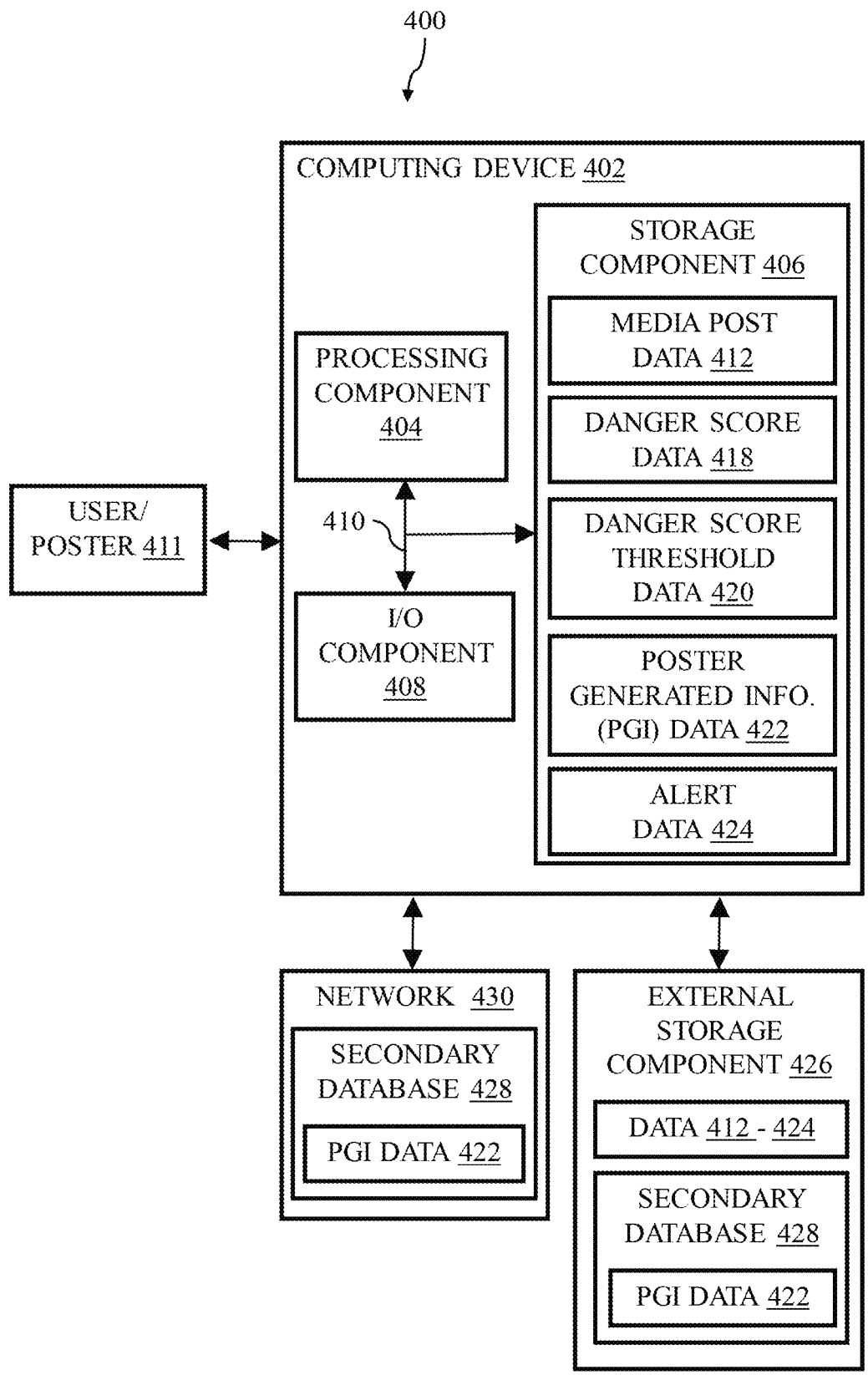
FIG. 46 shows a schematic view of a computing system configured to prevent the dissemination of sensitive information via media posts, according to embodiments of the disclosure.

FIG. 46 depicts a schematic view of a computing environment or system 400 (hereafter, "computing system 400"), and the various components included within computing system 400. In the non-limiting example shown in FIG. 46, computing system 400 may include at least one computing device 402 that may be configured to prevent the dissemination of sensitive information via media posts by performing the processes P1-P8 discussed herein with respect to FIG. 31. It is understood that similarly numbered and/or named components may function in a substantially similar fashion. Redundant explanation of these components has been omitted for clarity.

It is understood that computing device(s) 402 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 400 may include any type of computing device(s) 402 and for example includes at least one processor or processing component(s) 404, storage component 406, input/output (I/O) component(s) 408 (including a keyboard, touchscreen, or monitor display), and a communications pathway 410. In general, processing component(s) 404 execute program code which is at least partially fixed or stored in storage component 406. While executing program code, processing component(s) 404 can process data, which can result in reading and/or writing transformed data from/to storage component 406 and/or I/O component(s) 408 for further processing. The pathway 410 provides a communications link between each of the components in computing device(s) 402. I/O component 408 can comprise one or more human I/O devices, which enables user/poster 411 to interact with computing device(s) 402 to analyze media posts and prevent the dissemination of sensitive information over the internet, as discussed herein. Computing device(s) 402 may also be implemented in a distributed manner such that different components reside in different physical locations.

Storage component 406 may also include modules, data and/or electronic information relating to various other aspects of computing system 400. Specifically, operational modules, electronic information, and/or data relating to media post data 412, danger score data 418, danger score threshold data 420, poster generated information (PGI) data 422, and alert data 424. The operational modules, information, and/or data may include the required information and/or may allow computing system 400, and specifically computing device 402, to perform the processes discussed herein for preventing the dissemination of sensitive information via media posts.

Computing system 400, and specifically computing device 402 of computing system 400, may also be in communication with external storage component 426. External storage component 426 may be configured to store various modules, data and/or electronic information relating to various other aspects of computing system 400, similar to storage component 406 of computing device(s) 402. Additionally, external storage component 426 may be configured to share (e.g., send and receive) data and/or electronic information with computing device(s) 402 of computing system 400. In the non-limiting example shown in FIG. 46, external storage component 426 may include any or all of the operational modules and/or data shown to be stored on storage component 406 (e.g., data 412-424). Additionally, external storage component 426 may also include a secondary database 428 that poster 411 may interact with, provide information/data to, and/or may include information/data relating to poster 411 (e.g., PGI data 422). In a non-limiting example, external storage component 126 may be a cloud-based storage component or system.

In a non-limiting example shown in FIG. 46, computing device(s) 402 may be in communication with and/or may be configured to share (e.g., send and receive) data and/or electronic information over a network 430. Network may represent a closed network, such as a local area network (LAN) or may include the internet. During operation of computing device 402, the media posts created by poster 411 may be disseminated over network 430. Additionally as shown, network 430 may also include secondary database 428 including PGI data 422. In a non-limiting example, computing device 402 may interact and/or communicate with secondary database 428 and PGI data 422 included therein to perform the processes for preventing the dissemination of sensitive information, as discussed herein.

Furthermore, it is understood that computing device(s) 402 of computing system 400 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, and then install the proxy server code on the proxy computer. The components will be transmitted to the proxy server and then it will be stored on the proxy server.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method, comprising:
   presenting, by a computing system comprising at least one processor, and via a user device associated with a user, a user interface associated with a social media simulation executed by the computing system;
   associating, by the computing system, the user with a role within the social media simulation, wherein the role is:
      a poster role associated with simulated dissemination of a simulated social media post within the social media simulation, or
      a thief role associated with simulated discovery of sensitive information within the social media simulation;
   receiving, by the computing system, from the user via the user interface, user input defining a simulated action within the social media simulation that is associated with the role; and
   updating, by the computing system, and based on the simulated action, at least one metric associated with the user within the social media simulation.

2. The computer-implemented method of claim 1, wherein the user is associated with the poster role, and updating the at least one metric comprises:
   determining, by the computing system, a sensitive information exposure risk associated with the simulated action; and
   adjusting, by the computing system, a danger score associated with the user within the social media simulation, based on the sensitive information exposure risk.

3. The computer-implemented method of claim 2, wherein:
   the user input indicates a selection, by the user, of a selected social media post from among a plurality of social media posts, and
   the sensitive information exposure risk is determined based on at least one of content of the selected social media post or a visibility characteristic defining an audience of the selected social media post.

4. The computer-implemented method of claim 2, further comprising:
   identifying, by the computing system, a security event associated with the user within the social media simulation; and
   adjusting, by the computing system, the at least one metric based on the security event.

5. The computer-implemented method of claim 4, wherein adjusting the danger score, based on the sensitive information exposure risk, increases a likelihood of the security event.

6. The computer-implemented method of claim 4, wherein the security event is a result of a second simulated action performed by a second user, associated with the thief role, within the social media simulation.

7. The computer-implemented method of claim 2, wherein:
   the sensitive information exposure risk is based on exposure of the sensitive information, within the social media simulation, via the simulated action, and
   the sensitive information comprises at least one of:
      simulated user data assigned to the user within the social media simulation, or
      information indicative of simulated user credentials associated with the user.

8. The computer-implemented method of claim 1, wherein the user is associated with the poster role, and the at least one metric comprises one or more of:
   a ranking of the user among a plurality of users within the social media simulation, or
   an audience score associated with simulated social media posts disseminated by the user within the social media simulation.

9. The computer-implemented method of claim 2, wherein the user is associated with the poster role, and the simulated action is a selection of a response to a simulated mail message within the social media simulation.

10. The computer-implemented method of claim 1, wherein the user is associated with the thief role, and the simulated action comprises at least one of:
    an interaction with a social media post disseminated by a poster within the social media simulation, or a simulated message sent by the user to the poster within the social media simulation.

11. The computer-implemented method of claim 10, wherein the at least one metric is a number of data fields, within the sensitive information associated with the poster, that the social media simulation determines the user has discovered based on the simulated action.

12. The computer-implemented method of claim 10, wherein the poster is a second user of the social media simulation who is assigned the poster role.

13. The computer-implemented method of claim 10, wherein:
    the simulated action increases a visibility level of the user into simulated social media posts disseminated by the poster within the social media simulation, and
    an increase in the visibility level increases a likelihood of the user discovering the sensitive information from at least one of the poster or the simulated social media posts disseminated by the poster.

14. The computer-implemented method of claim 10, wherein:
    the simulated action is a security event that obtains at least a portion of the sensitive information from at least one of the poster, the simulated social media post disseminated by the poster, or an additional simulated social media post disseminated by the poster within the social media simulation, and
    adjusting the at least one metric comprising increasing a number of thief points, associated with the user within the social media simulation, based on the security event.

15. A computing system, comprising:
    a processor; and
    memory storing computer-executable instructions that, when executed by the processor, cause the computing system to:
       execute an interactive social media simulation for one or more users;

associate a user, of the one or more users, with a role within the interactive social media simulation, wherein the role is:
- a poster role associated with simulated dissemination of a simulated social media post within the interactive social media simulation, or
- a thief role associated with simulated discovery of sensitive information within the interactive social media simulation;

receive user input, associated with the user, defining a simulated action within the interactive social media simulation that is associated with the role; and update, based on the simulated action, at least one metric associated with the user within the interactive social media simulation.

16. The computing system of claim 15, wherein the computer-executable instructions cause the computing system to associate one or more first users with instances of the poster role, and one or more second users with instances of the thief role.

17. The computing system of claim 16, wherein:
the user is associated with the poster role,
the simulated action results in the interactive social media simulation indicating, to a second user associated with the thief role, that the second user has discovered at least a portion of the sensitive information associated with the user within the interactive social media simulation, and
updating the at least one metric comprises decreasing a first metric associated with the user and correspondingly increasing a second metric associated with the second user.

18. One or more non-transitory computer-readable media storing computer-executable instructions associated with a social media simulation that, when executed by one or more processors of a computing system, cause the one or more processors to:

execute the social media simulation for one or more users;
associate a user, of the one or more users, with a role within the social media simulation, wherein the role is:
- a poster role associated with simulated dissemination of a simulated social media post within the social media simulation, or
- a thief role associated with simulated discovery of sensitive information within the social media simulation;

receive user input, associated with the user, defining a simulated action within the social media simulation that is associated with the role; and update, based on the simulated action, at least one metric associated with the user within the social media simulation.

19. The one or more non-transitory computer-readable media of claim 18, wherein:
the user is associated with the poster role,
the simulated action is a selection, from a set of predefined social media posts, of the simulated social media post, and
updating of the at least one metric is based on a sensitive information exposure risk associated with the simulated social media post selected by the user.

20. The one or more non-transitory computer-readable media of claim 18, wherein:
the user is associated with the thief role,
the simulated action is at least one of:
- an interaction with a social media post disseminated by a poster within the social media simulation, or
- a simulated message sent by the user to the poster within the social media simulation, and the simulated action causes the social media simulation to indicate that the user has discovered at least a portion of the sensitive information associated with the poster.

* * * * *